(12) United States Patent
Yoshida et al.

(10) Patent No.: US 8,325,354 B2
(45) Date of Patent: Dec. 4, 2012

(54) IMAGE DATA PROCESSING APPARATUS AND IMAGE FORMING APPARATUS DISPLAYING, CONTROLLING JOB ICONS INDICATIVE OF THE PRESENCE OF A RECEIVED JOB

(75) Inventors: Kenzoh Yoshida, Ikoma (JP); Kouki Fukuda, Nara (JP); Shinichiro Ota, Nara (JP); Shunsuke Yajima, Nara (JP); Syoichiro Yoshiura, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 1309 days.

(21) Appl. No.: 12/073,442

(22) Filed: Mar. 5, 2008

(65) Prior Publication Data

US 2009/0296131 A1 Dec. 3, 2009

(30) Foreign Application Priority Data

Mar. 9, 2007 (JP) ................................. 2007-061078
Mar. 9, 2007 (JP) ................................. 2007-061079
Mar. 9, 2007 (JP) ................................. 2007-061080

(51) Int. Cl.
*G06F 3/12* (2006.01)
(52) U.S. Cl. ..................... 358/1.13; 358/1.15; 358/1.18; 358/1.1
(58) Field of Classification Search ................. 358/1.13, 358/1.14, 1.15, 1.1
See application file for complete search history.

(56) References Cited

U.S. PATENT DOCUMENTS

| | | | | |
|---|---|---|---|---|
| 5,422,993 | A | * | 6/1995 | Fleming ........................ 715/835 |
| 5,950,045 | A | | 9/1999 | Nomura et al. |
| 6,421,509 | B1 | | 7/2002 | Nomura et al. |
| 2002/0171681 | A1 | | 11/2002 | Nomura et al. |
| 2007/0182986 | A1 | * | 8/2007 | Ciriza et al. .................. 358/1.15 |

FOREIGN PATENT DOCUMENTS

| | | |
|---|---|---|
| JP | 04-296965 | 10/1992 |
| JP | 11-231729 | 8/1999 |
| JP | 2000-092257 | 3/2000 |
| JP | 2001-154773 | 6/2001 |
| JP | 2002-344682 | 11/2002 |
| JP | 2003-032413 A | 1/2003 |
| JP | 2003-308195 | 10/2003 |
| JP | 2005-045370 | 2/2005 |
| JP | 2005-102044 | 4/2005 |

* cited by examiner

*Primary Examiner* — Benny Q Tieu
*Assistant Examiner* — Martin Mushambo
(74) *Attorney, Agent, or Firm* — Edwards Wildman Palmer LLP; David G. Conlin; David A. Tucker

(57) ABSTRACT

In the image data processing apparatus of the present invention, one or more job icons each of which is indicative of the presence of a received job are displayed in a screen of a touch panel, and when any one of the displayed job icons is operated, an information window disclosing detail information concerning the operated job icon is additionally displayed. As a result, a limited display area of the touch panel can be effectively utilized, so that this enables the user to easily find not only a processing status of the received job but also detail information of the job.

20 Claims, 39 Drawing Sheets

FIG. 15

| DATE | TIME | RECEPTION ROUTE | FUNCTION INFORMATION | SENDING END | SIZE | SHEET NUMBER | COPY NUMBER |
|---|---|---|---|---|---|---|---|
| 2006.9.27 | 10:30'05" | COMMUNICATION SECTION | PRINTER | PC No. 1 | A4 | 6 sheets | 1 copy |
| 2006.9.27 | 10:30'07" | COMMUNICATION SECTION | iFAX | xxx@xxx.ne.jp | A4 | 7 sheets | 1 copy |
| 2006.9.27 | 10:30'15" | FAX MODEM | PRINTER | 06-63xxxxxx | A4 | 3 sheets | 1 copy |
| 2006.9.27 | 10:30'30" | COMMUNICATION INTERFACE | USB | USB MEMORY xxx | A4 | 3 sheets | 1 copy |
| | | | | | | | |

FIG. 38

| DATE | TIME | INPUT ROUTE | FUNCTION INFORMATION | SENDING END | RECEIVING END | SIZE | SHEET NUMBER | COPY NUMBER |
|---|---|---|---|---|---|---|---|---|
| 2006.9.27 | 10:30′05″ | COMMUNICATION SECTION | PRINTER | PC No. 1 | | A4 | 6 sheets | 1 copy |
| 2006.9.27 | 10:30′07″ | COMMUNICATION SECTION | iFAX | xxx@xxx.ne.jp | | A4 | 7 sheets | 1 copy |
| 2006.9.27 | 10:30′15″ | FAX MODEM | FAX | 06-63xxxxxx | | A4 | 3 sheets | 1 copy |
| 2006.9.27 | 10:30′30″ | COMMUNICATION INTERFACE | USB | USB MEMORY xxx | | A4 | 3 sheets | 1 copy |
| 2006.9.27 | 10:30′55″ | IMAGE SCANNING SECTION | COPY | SCANNER xxx | | A4 | 10 sheets | 2 copies |
| 2006.9.27 | 10:31′00″ | IMAGE SCANNING SECTION | SEND | SCANNER xxx | 06-63xxxxox | A4 | 5 sheets | 1 copy |
| 2006.9.27 | 10:31′10″ | COMMUNICATION SECTION | SEND | PC No. 1 | xxx@····ne.jp | A4 | 3 sheets | 1 copy |

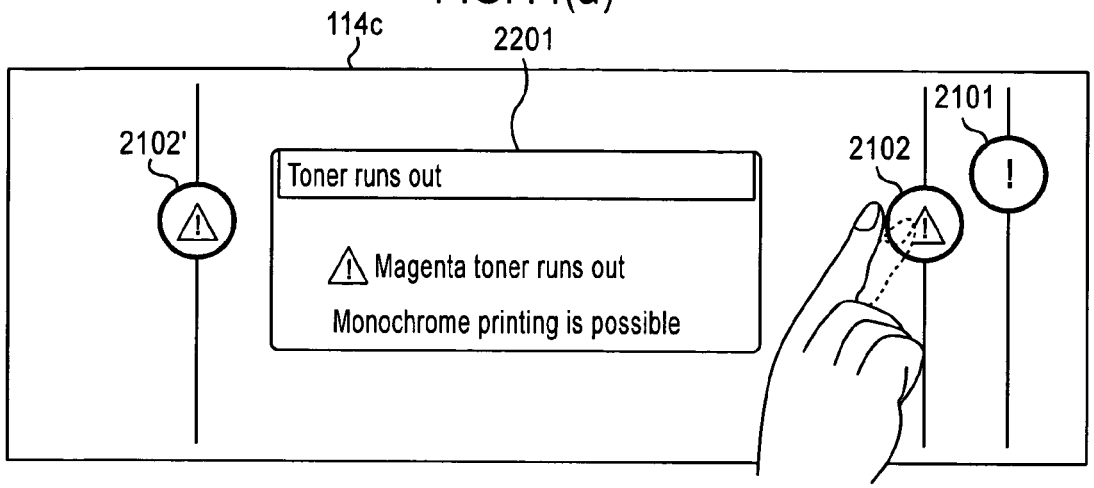
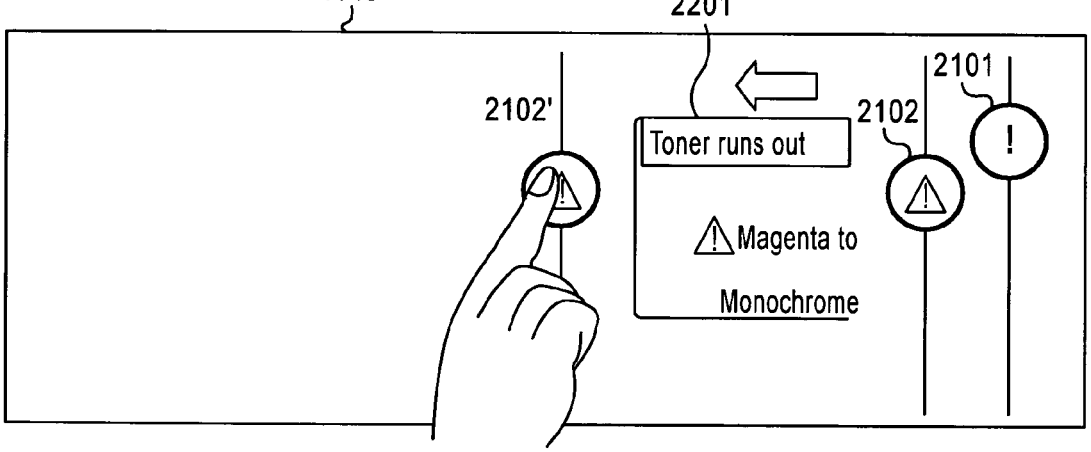
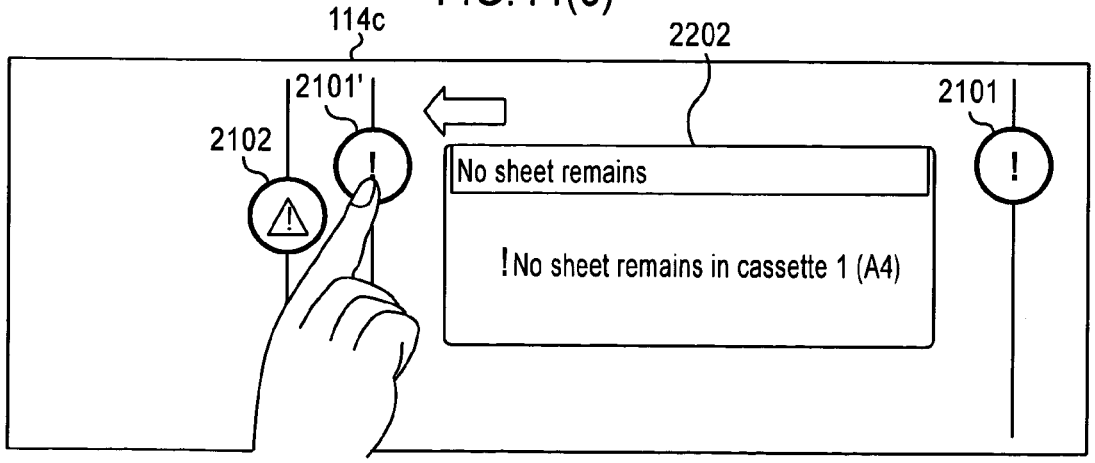

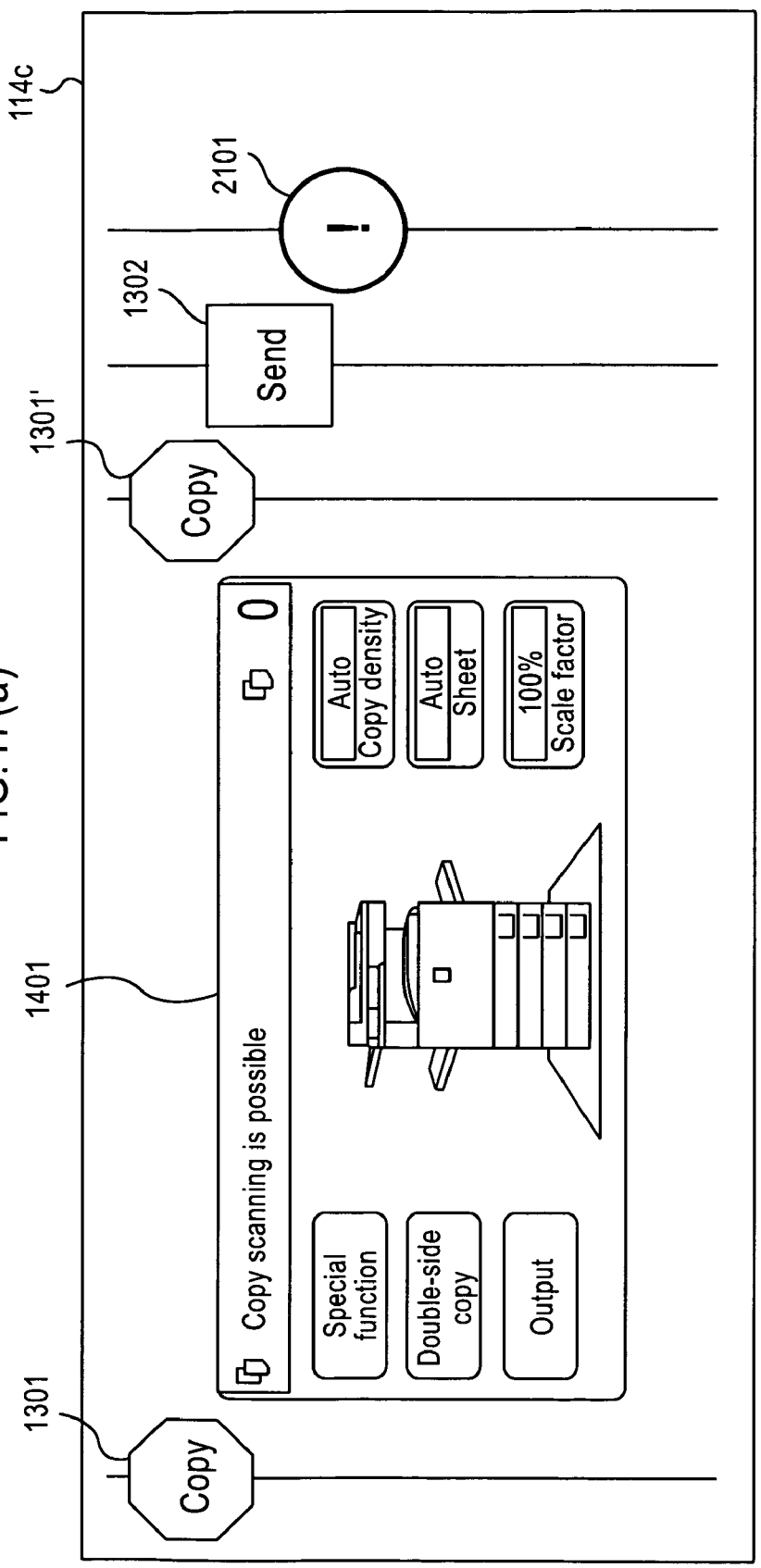

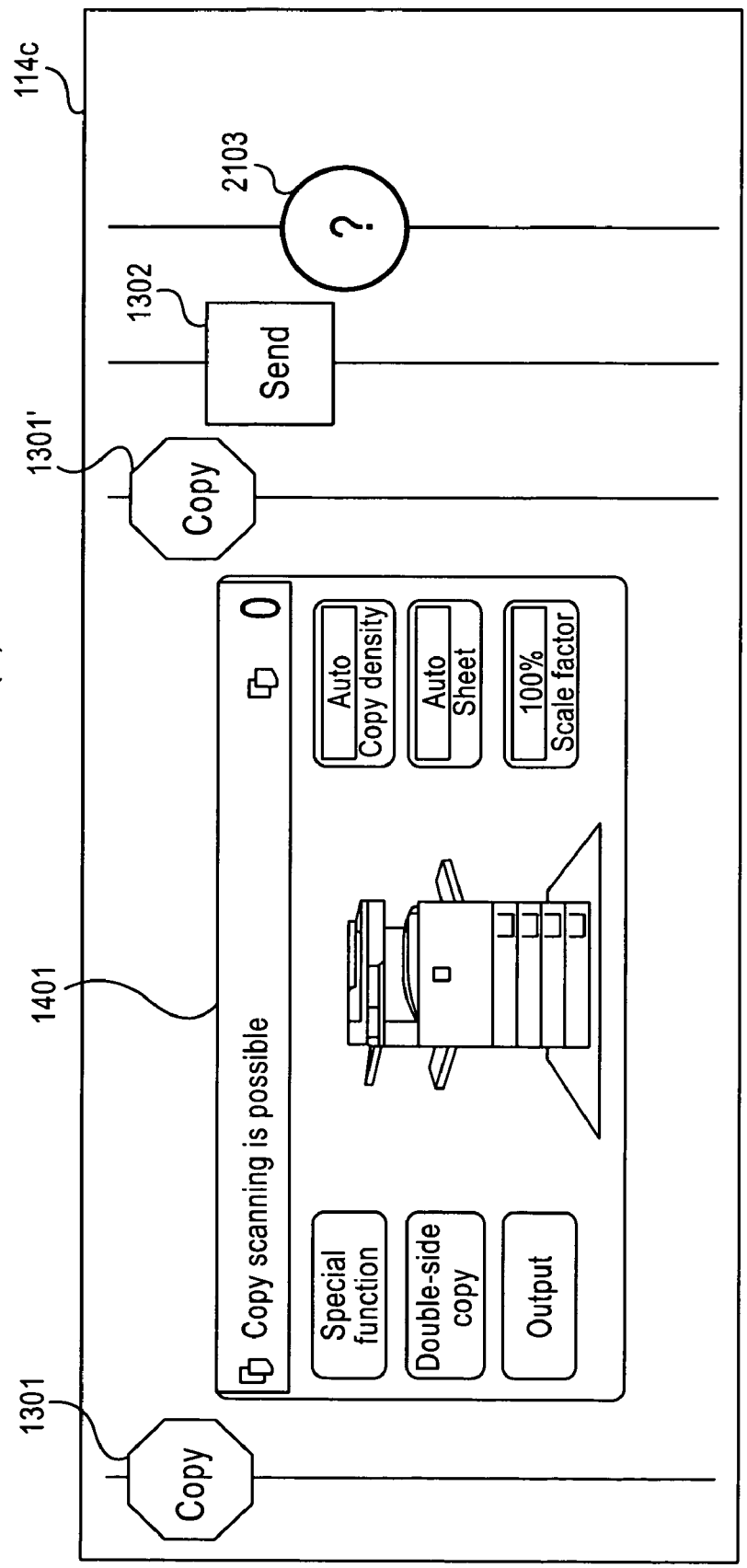

IMAGE DATA PROCESSING APPARATUS AND IMAGE FORMING APPARATUS DISPLAYING, CONTROLLING JOB ICONS INDICATIVE OF THE PRESENCE OF A RECEIVED JOB

This Nonprovisional application claims priority under 35 U.S.C. §119(a) on Patent Application No. 061079/2007 filed in Japan on Mar. 9, 2007, Patent Application No. 061078/2007 filed in Japan on Mar. 9, 2007, and Patent Application No. 061080/2007 filed in Japan on Mar. 9, 2007, the entire contents of which are hereby incorporated by reference.

FIELD OF THE INVENTION

The first present invention relates to an image data processing apparatus which receives image data through communication with an external device and carries out a process such as a printing process with respect to the received image data.

Further, the second present invention relates to an image data processing apparatus which receives and processes image data from an external device and generates image data by scanning a document or carrying out a similar process so as to process the thus generated image data.

Furthermore, the third present invention relates to an image forming apparatus which records a plurality of image data sets of a copying machine, a facsimile, a printer, and the like, onto recording materials respectively.

BACKGROUND OF THE INVENTION

A printing apparatus, one of image data processing apparatuses, receives image data, with control data used to print the image data, so as to carry out a printing process. Such a printing apparatus can carry out a process in response to a printing request from each of plural users (client terminals) in being provided in a network. However, the printing apparatus cannot carry out a plurality of printing processes at the same time, so that the printing apparatus receives the plural printing requests as reservations and carries out the processes in an order corresponding to an order in which requests are received.

Hereinafter, a processing operation in which the printing apparatus receives image data and control data required in processing the image data and executes the printing process is referred to as "job". Further, data constituted of the image data received by the printing apparatus and the control data is referred to as "job data".

However, in case where a single printing apparatus receives a plurality of jobs as reservations, it is difficult to find how many jobs the printing apparatus receives and in what order the printing apparatus is to processes the jobs. Thus, the job requesting side cannot easily find a timing at which the requested job is to be processed.

While, a digital multifunctional device, one of image data processing apparatuses, includes not only a function for printing (copying) document image data scanned by an image scanning device such as a scanner or the like but also various functions such as (i) a function for sending image data scanned by the scanning device to an external receiving end (external device), (ii) a function for, inversely, receiving image data from the external device via a communication line so as to print the image data, and (iii) a function for forwarding the received image data via the communication line.

The jobs which can be processed by the multifunctional device are roughly categorized into a printing job in which image data is printed out and a forwarding job in which image data is forwarded. The job means that a job processing section of the multifunctional device processes scanned image data or received image data. If the job is received from the external device, not only image data but also control data for the job processing section to process the image data are sent.

Further, also the multifunctional device cannot process a plurality of printing jobs at the same time and cannot process a plurality of sending jobs at the same time as in the printing apparatus, so that the multifunctional device receives the jobs as reservations and processes the jobs in an order corresponding to an order in which the job are received.

Thus, also in the multifunctional device, it is difficult to find how many jobs the multifunctional device receives and in what order the multifunctional device processes the jobs, as in the printing apparatus. Thus, the job requesting side cannot find a timing at which the requested job is to be processed.

Incidentally, as to the multifunctional device, there is conventionally proposed such an environment that: there is provided a function for displaying a confirmation image indicative of a list of received jobs, and a user requests for display of the list of the received jobs as necessary so as to cause an operation panel of the multifunctional device to display the list of the reserved jobs.

A specific example of such a technique is an image forming apparatus, disclosed in Patent Document 1, which can change priority of jobs. According to this technique, the user operates buttons on the operation panel so as to cause the operation panel to display a priority changing window indicative of a job in process and jobs on standby. The user can find a status, in which jobs are processed, from the priority changing window.

Further, Patent Document 2 discloses a copying machine equipped with a display area indicative of a status in which reserved jobs displayed in a standby window are executed. According to this technique, it is possible to find the status, in which the reserved jobs are executed, from the standby window.

Further, the applicant previously filed a patent application, and Patent Document 3 which is a publication of the patent application discloses an image forming apparatus arranged so that: a job status window indicative of a list of reserved jobs partially appears behind a basic window which is preferentially displayed, and the partially appearing area briefly displays a list of process statuses of reserved jobs.

Patent Document 1: Japanese Unexamined Patent Publication No. 102044/2005 (Tokukai 2005-102044)
Patent Document 2: Japanese Unexamined Patent Publication No. 92257/2000 (Tokukai 2000-92257)
Patent Document 3: Japanese Unexamined Patent Publication No. 154773/2001 (Tokukai 2001-154773)

However, most of the conventional printing apparatuses do not have display sections for displaying information, and even if a conventional printing apparatus has the display section, the display section merely displays simple information, so that the conventional printing apparatus does not allow for such operation that the user causes the printing apparatus to display the list of reserved jobs as necessary.

The reason is as follows. In case of the printing apparatus, a printing apparatus engine is installed on an image data sending side such as a personal computer (hereinafter, referred to as PC) or the like, so that the printing apparatus itself does not require any input operation carried out through the display section. Note that, in case where the image forming apparatus is installed as the multifunctional device, it is necessary to carry out an input operation through the display section in carrying out a copying operation, but an operation panel having a display section provided on a scanner device is used in this case.

Thus, the applicant conceived such an arrangement that: the function for causing the list of reserved jobs to be displayed as disclosed in the aforementioned Patent Documents 1 to 3 is installed also on the printing apparatus so that the user can find processing statuses of printing jobs having been received and the user can find a timing at which a requested printing job is to be processed.

However, it was found that the installation of the printing apparatus without any modification raises the following problem. That is, Patent Documents 1 and 2 are based on the multifunctional device equipped with not only the printing apparatus function but also the copying function and the facsimile function, so that information displayed in a limited display area is complicate, and it is difficult for the user to understand the content of the operation window. Therefore, this technique is not sufficient in view of such point that the processing statuses of the received jobs are clearly displayed.

Further, according to the arrangements of Patent Document 1 and 2, if the user is confirming detail information (content) of each job with the list of reserved jobs displayed, detail information of a job selected after transition of the display window is displayed. Thus, this may raise some troubles in returning to the original window.

Further, according to the arrangement of Patent Document 3 previously proposed by the applicant, a brief list indicative of contents of processes of jobs is displayed in a partially appearing area of the job status window behind the basic window, so that it is easier to find the processing statuses of the jobs than Patent Document 1 and 2. However, this technique is based on the multifunctional device, so that the technique is not sufficient in view of such a point that the processing statuses of received jobs is clearly displayed.

Further, also as to the multifunctional device, each of the arrangements of Patent Documents 1 to 3 has the following problem or has to be improved as follows.

That is, according to the arrangement of Patent Document 1, the display window transits from the standby window to the job list display window at the time when display of the list of reserved job is requested, so that the user becomes confused.

Further, according to the arrangement of Patent Document 2, the display area indicative of execution statuses of reserved jobs is provided on the standby window so that reception statuses or execution statuses of jobs can be found in the standby window, but the displayed information is complicate, so that the content of the operation window is hard for the user to understand.

Further, according to each of the arrangements of Patent Documents 1 and 2, when the user is confirming detail information (content) of a reserved job received via the operation panel, the display window further transits which causes difficulty in displaying the detail information of the reserved job. In case of obtaining the detail information in this manner, the display window has many windows thereon, so that this results in some troubles as in the case of returning to the original display window.

While, according to the arrangement of Patent Document 3 previously proposed by the applicant, the brief list indicative of contents of processes carried out with respect to reserved jobs is displayed in the partially appearing area of the job status window behind the basic window, so that it is possible to easily find the reception status and the execution status of jobs even in the standby window. However, the standby window is preferentially displayed in the standby window, so that a user who is not familiar with the operation cannot clearly recognize the status. Thus, this technique requires improvement.

Incidentally, the multifunctional device which is one of image forming apparatuses uses a display window for displaying a guidance for the user to confirm an operation status for each mode and an operation panel having an input device used to receive an instruction from the user.

Further, the operation panel is used also to allow the user to recognize an abnormal state in case where any trouble or the like occurs in the apparatus. An example thereof is a technique disclosed in Patent Document 4.

According to the technique, upon detecting an abnormal state of the apparatus, a trouble icon is displayed in the screen of the operation panel so as not to overlap other display key of the displayed basic window so that the user recognizes the abnormal state, and an information window which allows the user to recognize a content of the trouble is preferentially displayed in the center of the screen when the user operates the trouble icon.

Patent Document 4: Japanese Unexamined Patent Publication No. 344682/2002 (Tokukai 2002-344682)

However, according to the arrangement of Patent Document 4, the trouble icon is displayed in the basic window. Thus, in case of a user who is not familiar with the operation, he or she may keep on carrying out the job reservation by using keys which remain displayed on the basic window without operating the trouble icon. The machine has been already in trouble, so that the trouble which prevents execution of the job reserved by the user makes it impossible to receive the reservation of the job. Thus, the user who is not familiar with the operation may be confused without finding a reason for which the reservation of the job cannot be executed.

SUMMARY OF THE INVENTION

An object of the first present invention is to provide an image data processing apparatus which effectively uses a limited display area of an operation panel so that the user can easily find a status, in which a job received by the apparatus is processed, as well as detail information of the job.

In order to achieve the foregoing object, an image data processing apparatus of the first present invention, in which a job receiving section communicates with an external device and receives image data and control data for carrying out a job processing with respect to the image data so as to receive a job and a job processing section executes the job received by the job receiving section, said image data processing apparatus comprising: a display input section for displaying information in a screen and for allowing the screen to be operated so as to input an instruction; and a job information display control section for causing the screen of the display input section to display an icon indicative of a presence of the job having been received and for causing the screen to additionally display an information window disclosing information concerning the job corresponding to the icon when the screen is operated with the icon displayed.

Herein, the display input section is constituted of a touch panel or the like for example, and allows information to be displayed in the screen and allows an instruction to be inputted via the screen.

According to the arrangement, the job information display control section displays an icon indicative of the presence of the received job in the screen of the display input section. By displaying the icon in this manner, it is possible to allow the user to easily find a status, in which jobs are received by the apparatus, though the display area of the operation panel is limited.

Moreover, when the screen is operated with the icon displayed, the job information display control section additionally displays the information window disclosing information concerning the job corresponding to the displayed icon. The information window allows the user to confirm detail information of the job in the screen displaying the icon without transition into another window.

Thus, the limited display area of the operation panel is effectively used, so that the user can easily find processing statuses of jobs received by the apparatus as well as detail information of each job.

An object of the second present invention is to provide an image data processing apparatus which maximizes the display ability of the limited display area of the operation panel and carries out such display that the user is not confused by much information concerning jobs.

In order to achieve the foregoing object, an image data processing apparatus of the second present invention is arranged so that: a job receiving section communicates with an external device and receives image data and control data for carrying out a job processing with respect to the image data so as to receive a job, and an image data generation section generates image data, and a control data generation section generates control data for carrying out a job processing with respect to the image data so as to generate a job in the image data processing apparatus, and a job processing section executes the job received from the external device and the job generated in the image data processing apparatus, said image data processing apparatus comprising: a display input section for displaying information in a screen and for allowing the screen to be operated so as to input an instruction; and a display control section for causing the screen of the display input section to display one or more startup icons each of which activates the image data generation section and one or more job icons each of which is indicative of a presence of the job having been received by the job receiving section.

Herein, the display input section is constituted of a touch panel or the like for example, and allows information to be displayed in the screen and allows an instruction to be inputted via the screen.

According to the arrangement, a basic window for allowing an instruction concerning a job which can be generated in the apparatus to be inputted is not displayed at all, and the display control section causes the display input section to display a startup icon for activating the image data generation section and causes the display input section to display a job icon indicative of the presence of a received job in case where the job receiving section 131 receives the job.

Thus, the user can find a function for image data, which can be used in the image data processing apparatus, by referring to the displayed startup icon, and the user can confirm information of the job, which has been received from the external device and should be processed, by confirming the job icon.

As a result, unlike a conventional image data processing apparatus arranged so that the basic window concerning the job which can be generated in the apparatus is always displayed, the limited display area of the operation panel is effectively used, so that it is possible to exhibit such an effect that much information concerning the job can be displayed without causing the user to be confused.

An object of the third present invention is to provide an image forming apparatus which effectively uses the limited display area of the operation panel so as to allow the user to be easily find a trouble, request for maintenance, display of an advice, or a similar status, as well as contents thereof.

In order to achieve the foregoing object, an image forming apparatus of the third present invention forms an image based on image data onto a recording material, said image forming apparatus comprising: a status detection section for detecting that the image forming apparatus is in a status where it should report an information concerning its status; a display input section for displaying information in a screen and for allowing a user to operate the screen so as to input an instruction; and a display control section for causing the display input section to display a status icon indicating that the status detection section detects the status and for causing the display input section to additionally display an information window, disclosing information concerning the status indicated by the status icon, when the screen is operated with the status icon displayed.

Herein, the display input section is constituted of a touch panel or the like for example, and allows information to be displayed in the screen and allows an instruction to be inputted via the screen.

According to the arrangement, the status detection section detects that the image forming apparatus is in a status where it should report an information concerning its status. Examples of the status which should be informed include: a status in which toner scarcely remains or completely runs out; a status in which recording materials stored in a recording material cassette scarcely remain or completely run out; a status in which jam of the recording materials occurs; a status in which the apparatus is out of order; and a similar status. Another example is a status which requires notification of advice information or help information.

When the status detection section detects that the apparatus is in the status which should be informed, the display control section causes the display input section to display a status icon indicating that the status detection section detects the status and causes the display input section to additionally display an information window, disclosing information concerning the status indicated by the status icon, when the screen is operated with the status icon displayed.

Thus, the display window of the status icon is set as a standby window or a window for executing a job for example, so that the user first finds that any trouble occurs or it is necessary to request for maintenance or that any advice is given from the apparatus by watching the displayed status icon. For example, this is a case where any trouble occurs or it is necessary to request for maintenance or any advice is given from the apparatus.

Further, the status icon is operated so as to display the information window, thereby obtaining useful information such as a message or the like concerning the status indicated by the status icon. The information window is additionally displayed and does not transit to another window, so that the user can keep on operating without any trouble even when the information window is displayed.

Further, the basic window or the like is not displayed in the screen where the status icon is displayed, so that it is possible to prevent the user from carrying out an unnecessary operation without noticing occurrence of a trouble.

As a result, the limited display area of the operation panel is effectively used, so that it is possible to exhibit such effect that the user can easily find a status of the apparatus, e.g., a trouble, request for maintenance, and display of an advice.

Additional objects, features, and strengths of the present invention will be made clear by the description below. Further, the advantages of the present invention will be evident from the following explanation in reference to the drawings.

BRIEF DESCRIPTION OF THE DRAWINGS

FIG. 15 is a drawing illustrating a content of a management table of a job management section of the printing apparatus.

FIG. 38 is a drawing illustrating a content of a management table of a job management section of the multifunctional device.

FIGS. 44(a) to 44(c) are drawings each of which illustrates an information display function of a display control section of the multifunctional device as an embodiment of the third present invention.

FIGS. 47(a) to 47(c) are drawings each of which illustrates an information display function of a display control section of the multifunctional device of another embodiment of the third present invention.

DESCRIPTION OF THE EMBODIMENTS

[Embodiment According to a First Present Invention]

The following describes an embodiment according to the first present invention with reference to FIG. 1 to FIG. 17. Note that, the present invention is not limited to this.

Figure 2:
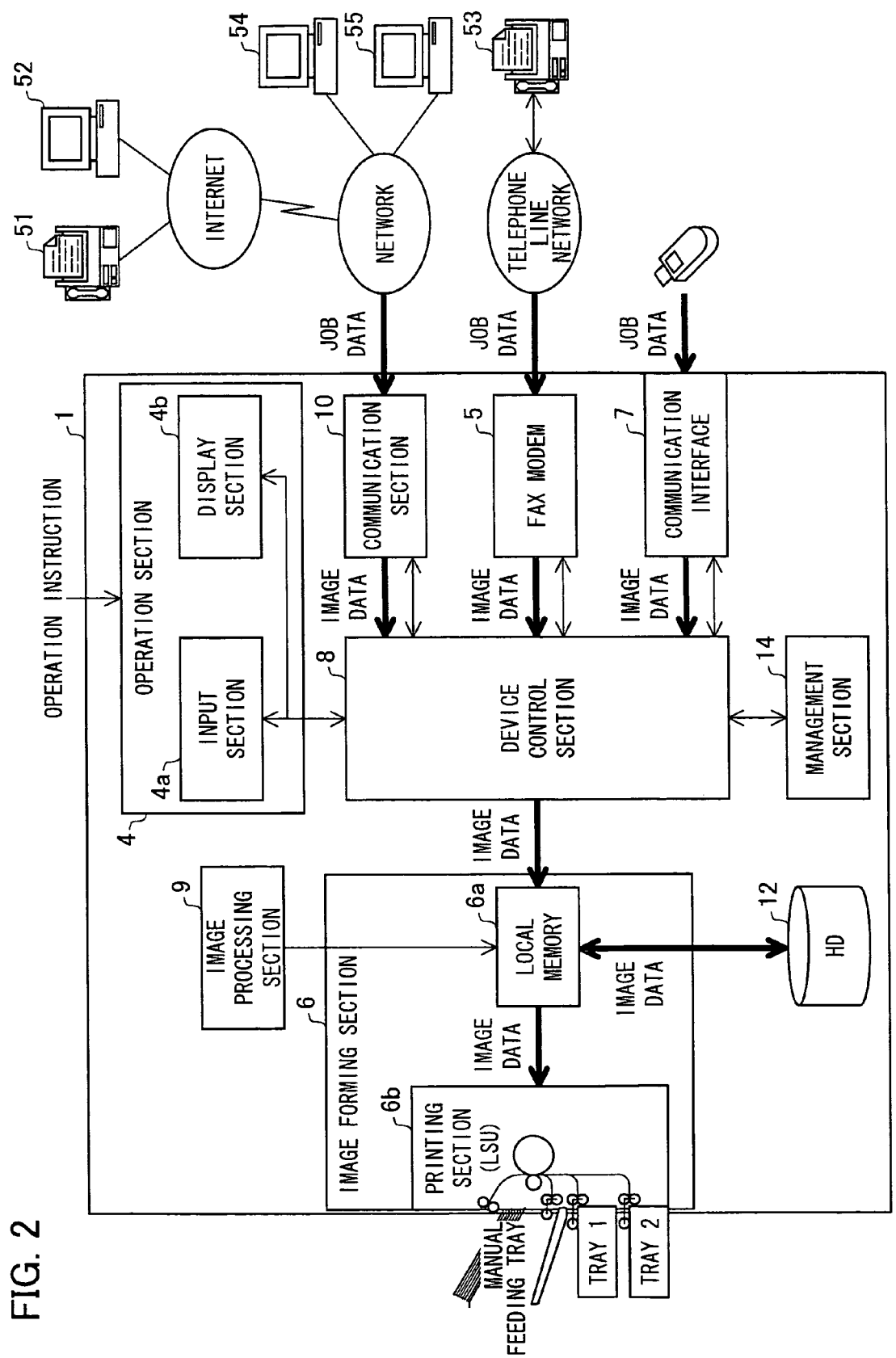
FIG. 2 is a functional block diagram illustrating an entire arrangement of the printing apparatus.

First, with reference to FIG. 2, an entire arrangement of a printing apparatus (an image data processing apparatus, an image forming apparatus) 1 of the present embodiment is described as follows. FIG. 2 is a functional block diagram illustrating the entire arrangement of the present printing apparatus 1.

As illustrated in FIG. 2, the printing apparatus 1 is provided so as to be capable of communicating with an external device. Further, in response to job data from the external device, the printing apparatus 1 receives a job and executes a printing process based on image data included in the job data. The job data includes the image data and control data used to carry out a job process (printing process) based on the image data.

The printing apparatus 1 includes: an operation section (display input section) 4 which allows the user to input data; an image forming section (job processing section) 6 for carrying out the printing process based on the image data; an image processing section 9 for processing the image data; a hard disk device 12 for storing the image data therein; a communication section 10 constituting communication means for allowing communication with the external device; a FAX modem 5; a communication interface 7; a management section 14 for storing control information, setting information, and the like of the entire apparatus, therein; and a device control section 8 for entirely controlling the apparatus.

Figure 3:
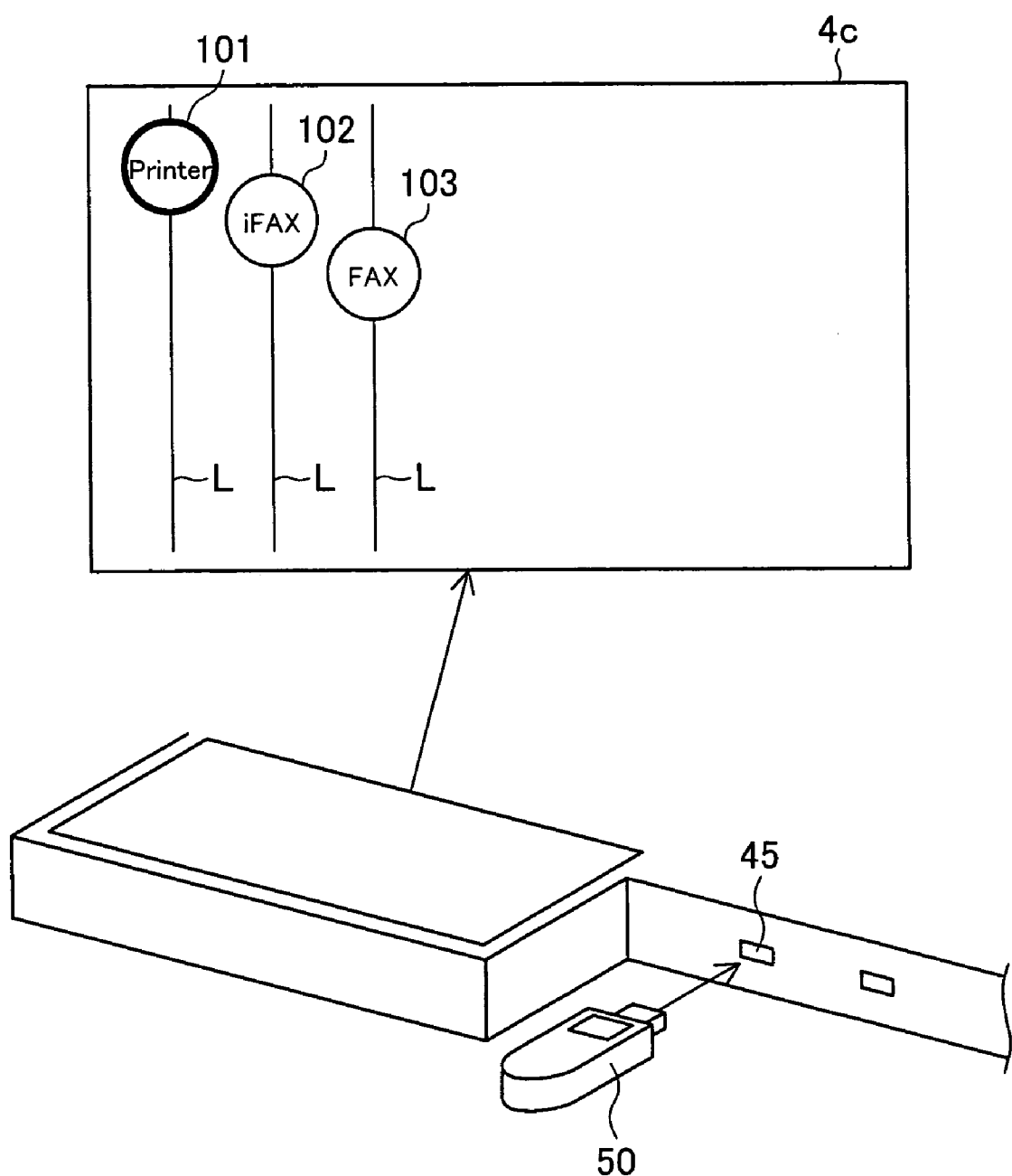
FIG. 3 is a drawing illustrating how a job information display control section of the printing apparatus displays job information.

The operation section 4 includes an input section 4a and a display section 4b, and allows operations and various settings of the entire apparatus to be inputted, so as to display the inputted contents and an operation status of the entire apparatus. Although not shown particularly, the input section 4b includes a key group disposed in the vicinity of the display section 4b and a touch screen disposed on the display section 4b. The touch screen and the display section 4b constitute a touch panel 4c which allows the user to touch its window so as to input his or her instruction. The display section 4b is constituted of a liquid crystal panel or the like for example. In the present printing apparatus 1, as illustrated in FIG. 3, the display section 4b has a horizontally long rectangular shape with respect to a user who faces the operation section 4.

The image forming section 6 prints an image based on the image data onto a recording sheet. The image forming section 6 includes a local memory 6a in which the image data is stored and a printing section 6b equipped with a laser scanning unit or the like. The printing section 6b prints an image, based on the image data stored in the local memory 6a, onto a recording sheet fed from a sheet feeding section (not shown).

The image processing section 9 carries out an image processing, such as compression, extension, modification, and the like, with respect to the image data stored in the local memory 6a. The image data having been processed is outputted from the local memory 6a to the printing section 6b or the hard disk device 12. The hard disk device 12 temporarily stores the image data to be processed.

The communication section 10 receives image data from information processing devices 54 and 55 in the network and receives job data from an external information processing device 52 via the Internet or from an Internet facsimile device 51. The communication section 10 is connected to a network constituted of information processing devices 54 and 55 such as a PC, a server, and the like, connected to a router, a switching hub, or the like via a LAN cable. Further, the network is connected to the Internet via a communication line such as a telephone line network, an optical fiber, or the like.

The FAX modem 5 is connected to the telephone line network via a telephone line, and carries out a facsimile communication with an external facsimile device 53 so as to receive job data from the facsimile device 53.

In the communication interface 7, a USB memory 50 is connected to an external connector 45 (see FIG. 3), so that the communication interface 7 carries out a communication with the USB memory 50 so as to receive job data stored in the USB memory 50. As will be detailed later, the printing apparatus 1 carries out a communication directly with the USB memory 50 not via a PC or the like so as to receive a job, thereby carrying out a printing process of the image data stored in the USB memory 50.

If any data is inputted from the operation section 4 or job data is inputted via the communication section 10, the FAX modem 5, and the communication interface 7, the device control section 8 controls respective sections of the apparatus in accordance with the information stored in the management section 14 so as to send the inputted image data to the image forming section 6, thereby carrying out the printing process.

In the printing apparatus 1 arranged in this manner, (i) image data received by the communication section 10 from the information processing devices 54, 55, and 52 or the image data received by the communication section 10 from the internet facsimile device 51, (ii) image data received by the FAX modem 5 from the facsimile device 53, and (iii) image data received by the communication interface 7 from the USB memory are inputted to the image forming section 6.

The device control section 8 sends the inputted image data to the local memory 6a of the image forming section 6 so as to cause the image processing section 9 to carry out an image processing. The image data having been subjected to the image processing is developed as "image data to be outputted" for each page and is temporarily stored in the hard disk device 12, and then the thus-developed image data sets are sequentially read out at a suitable timing so as to be sent to the local memory 6a again. The image data in the local memory 6a is forwarded to the printing section 6b so as to correspond to a timing at which the image data is written into the printing section 6b.

This is applicable also to the case of printing a plurality of images based on the image data, and the image data for each page is stored in the hard disk device 12 and is sent from the hard disk device 12 to the local memory 6a so as to correspond to an output mode. The image data in the local memory 6a is forwarded to the printing section 6b, so as to correspond to a timing at which the image data is written into the printing section 6b, with this operation repeated so as to correspond to the number of the images to be outputted.

Incidentally, in case where jobs from external devices are concentrated, these jobs cannot be processed at the same time by a single image forming section, so that the jobs are received as reservations so as to be sequentially processed. According to the arrangement of the conventional printing apparatus, the number of the received jobs, an order in which the jobs are to be processed, and a similar condition cannot be easily confirmed. Thus, the job requesting side cannot easily find a timing at which the requested job is to be processed or similar information.

In contrast, the printing apparatus 1 of the present embodiment includes a job information display function which effectively uses a limited display area of the touch panel 4c so as to display information concerning jobs which information allows a processing order and the like of the received jobs to be confirmed (hereinafter, this information is referred to as "job information").

Next, the job information display function of the present printing apparatus 1 is detailed as follows. Upon receiving job data as a job to be processed, the present printing apparatus 1 displays a job icon indicative of a presence of the received job in the touch panel 4c. If the touch panel 4c is operated with the job icon displayed, an information window which discloses information concerning the job of the displayed job icon is additionally displayed.

Figure 1:
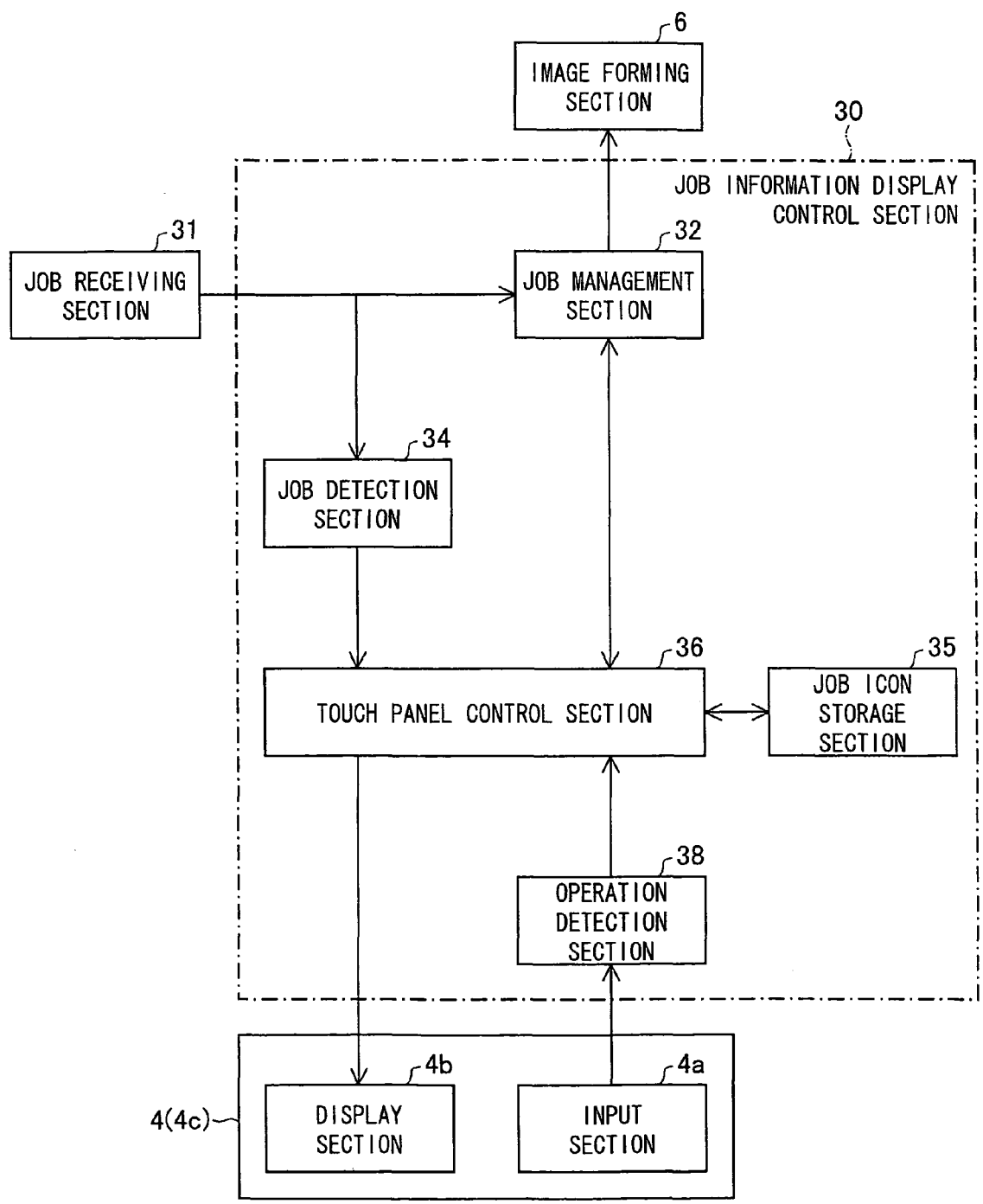
FIG. 1, showing an embodiment of the first present invention, is a functional block diagram of essential portions for realizing a job information display function of a printing apparatus.

The job information display function is realized by the operation section 4 and the job information display control section 30 which are illustrated in FIG. 1. FIG. 1 is a functional block diagram illustrating essential portions for realizing the job information display function of the present printing apparatus 1.

In FIG. 1, the job receiving section 31 receives job data, sent from the outside, as a job to be processed. The job receiving section 31 includes the communication section 10, the FAX modem 5, and the communication interface 7 which are illustrated in FIG. 2.

As described above, the job data includes not only image data but also control data required in carrying out the printing process with respect to the image data, and the control data includes information such as sending end information, recording sheet size information, sheet number information, copy number information, and the like, for example. The thus received job data is sent to the job information display control section 30 with the job data including information indicative of a reception date or a reception route and similar information.

The job information display control section 30 causes the touch panel 4c to display the job icon indicative of the presence of the job received by the job receiving section 31. If the job information display control section 30 is operated with the job icon displayed in the touch panel 4c, an information window concerning a printing job of the displayed job icon is additionally displayed. The job information display control section 30 includes the management section 14 and the device control section 8 which are illustrated in FIG. 1.

The job information display control section 30 includes a job management section 32, a job detection section 34, a touch panel control section 36, a job icon storage section 35, and an operation detection section 38.

The job management section 32 manages a processing status of the job received by the job receiving section 31. Via the job receiving section 31, not only the job data but also information indicative of a reception date or a reception route and similar information are inputted. The job management section 32 manages the processing status so that jobs are to be processed in an reception order.

The job management section 32 includes a management table as illustrated in FIG. 15 for example, and information such as the reception date, the reception route, the image data sending end, the recording sheet size, the sheet number, the copy number, and the like are stored in the management table for each job. In case where the job data sending end is a PC or a USB memory, also a file name and a user name are stored.

Further, in the present printing apparatus 1, the job management section 32 allocates function information to each job in accordance with a route via which the job has been received.

For example, function information "FAX" indicating that the printing apparatus 1 serves as a FAX device is allocated to a job having been received via the FAX modem 5.

Further, function information "iFAX" indicating that the printing apparatus 1 serves as the internet facsimile device 51 or function information "printing apparatus" indicating that the printing apparatus 1 serves as a printing apparatus for processing a job from other PC or the like is allocated to a job having been received via the communication section 10. Note that, as to a difference between the "iFAX" and the "printing apparatus", received data having a mail address as in an e-mail is determined as "iFAX", and received data in a PDL (Page Description Language) format is determined as "printing apparatus".

Further, as described above, the present printing apparatus 1 has a function for causing the communication interface 7 to communicate directly with a USB memory so as to receive a job, so that function information "USB" indicating that the printing apparatus 1 serves as such a special printing apparatus is allocated to a job having been received via the communication interface 7.

Upon receiving job data from the job receiving section 31, the job detection section 34 detects occurrence of the job and sends the detection to the touch panel control 36.

The touch panel control section 36 controls the display section 4b so as to display a job icon indicative of the presence of the job having been received by the printing apparatus 1. In the present embodiment, only a job icon of a job which is being processed or is to be processed out of received jobs is displayed. Further, as will be detailed later, in the printing apparatus 1, the job icon is determined for each function information.

Upon detecting occurrence of a new job through detection carried out by the job detection section 34, the touch panel control section 36 refers to a management content of the job management section 32 so as to obtain function information of the job having been newly received. Further, a job icon corresponding to the thus obtained function information is extracted from the job icon storage section 35 so as to display the job icon in the touch panel 4c. In the job icon storage section 35, data sets respectively having various job icon shapes to be displayed in the touch panel 4c are stored.

The touch panel control section 36 keeps on displaying the job icon of the job until the job is completed. Upon confirming the completion of the job, the touch panel control section 36 ends the display so as to delete the displayed job icon from the screen. Such a processing status of the job is determined with reference to the management content of the job management section 32.

Further, in displaying a plurality of job icons in the screen, the touch panel control section 36 carries out various operations, e.g., displays the job icons along a diagonal line of the screen in a reception order, or displays the job icons so that the job icons do not overlap each other, or changes a display manner so as to correspond to a processing status of the job. This will be described later.

Further, if the screen is operated with the job icon displayed in the touch panel 4c, the touch panel control section 36 additionally displays an information window concerning the job of the displayed job icon. A content of the information displayed in the information window is determined for each function information. Also this will be described later.

In the present printing apparatus 1, when the job icon is operated, the touch panel control section 36 displays, in the vicinity of the operated job icon, an information window concerning a printing job of the operated job icon. Note that, hereinafter, "to display the information window" is sometimes expressed as "to open the information window", and "to cause the information window not to be displayed" is sometimes expressed as "to close the window".

The operation detection section 38 specifies an operated job icon in accordance with a signal inputted from the touch panel 4c, and detects a manner in which the job icon has been operated, so as to send this detection result to the touch panel control section 36. In the printing apparatus 1, as the job icon operation manner for displaying the information window, there are two types of manners: a sliding operation and a touching operation.

Figure 5:
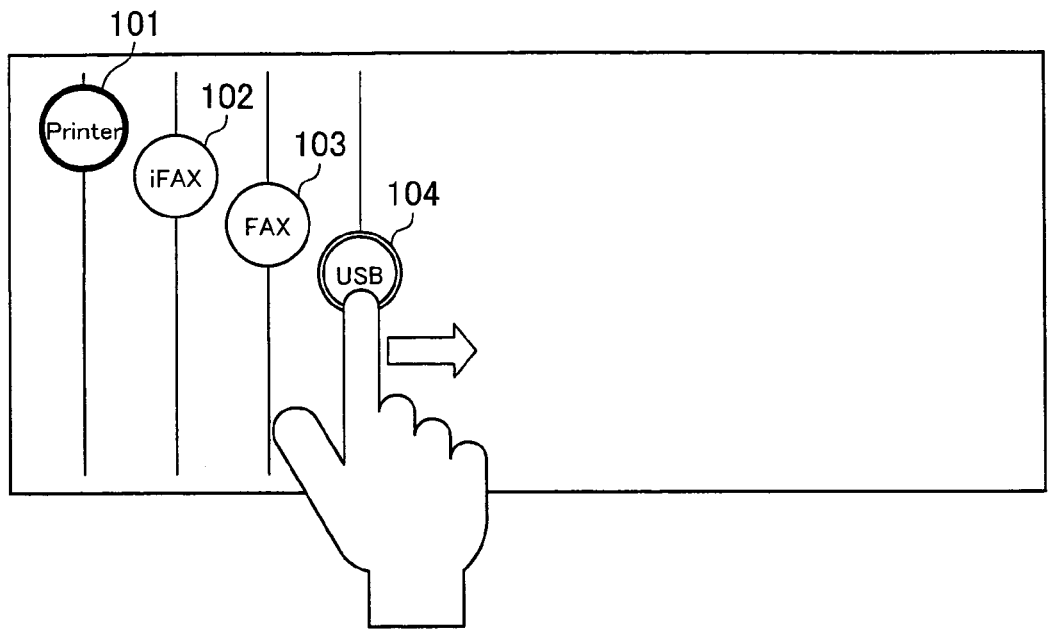
FIG. 5 is a drawing illustrating how the job information display control section of the printing apparatus displays job information.

As in an operation carried out with respect to a job icon 104 in FIG. 5, the sliding operation is such that the job icon 104 is moved in parallel with its pushed. While, the touching operation is such that the job icon 104 is pushed and is released right after the pushing as in an operation carried out with respect to the job icon 104 in FIG. 8. In case of the sliding operation, also an operation trail is sent to the touch panel control section 36.

With reference to FIGS. 3 to 14, the following explains how the job information display control section 30 displays job information.

First, display of the job icon is described. The touch panel 4c illustrated in FIG. 4 shows a state in which the printing apparatus 1 has received four jobs respectively indicated by function information "printing apparatus", "iFAX", "FAX", and "USB".

Figure 4:
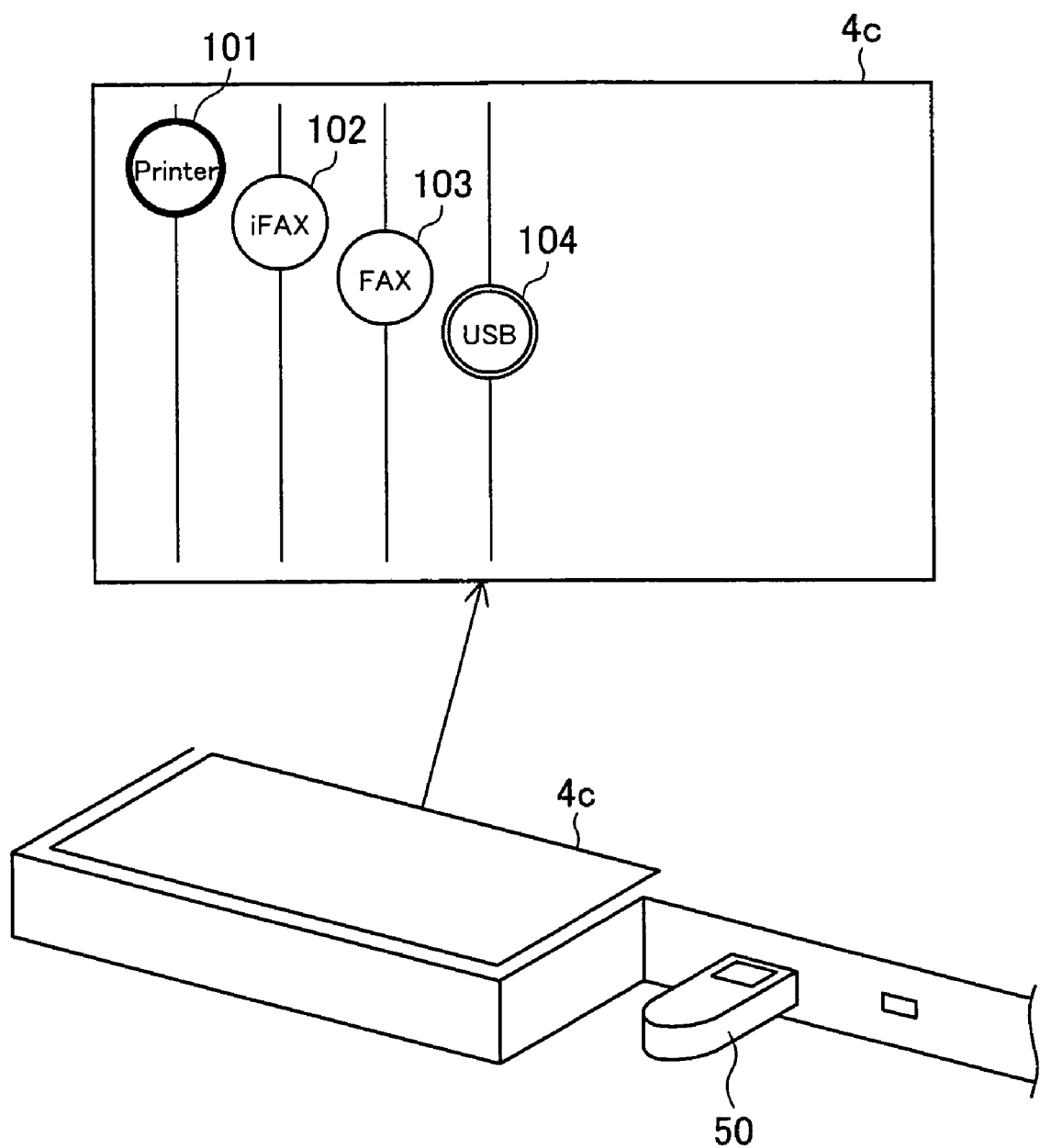
FIG. 4 is a drawing illustrating how the job information display control section of the printing apparatus displays job information.

In FIG. 4, a job icon whose reference numeral is 101 indicates the presence of a job corresponding to the function information "printer". This is a circle-shaped icon in which "Printer" is indicated. A job icon whose reference numeral is 102 indicates the presence of a job corresponding to the function information "iFAX". This is a circle-shaped icon in which "iFAX" is indicated.

A job icon whose reference numeral is 103 indicates the presence of a job corresponding to the function information "FAX". This is a circle-shaped icon in which "FAX" is indicated. A job icon whose reference numeral is 104 indicates the presence of a job corresponding to the function information "USB". This is a circle-shaped icon in which "USB" is indicated.

The display manner of the job icon is changed in accordance with the function information in this manner, so that the user can easily find what kind of job (which function information) has been received at the present stage merely by watching the touch panel 4c.

Note that, the foregoing shapes and display manners of the job icons 101 to 104 based on the function information are mere examples, so that the shapes and display manners may be variously changed. However, it is preferable to shape each icon so that a characteristic thereof allows the function information to be specified.

As illustrated in FIG. 4, these plural job icons 101 to 104 are disposed diagonally from the upper left of the screen of the touch panel 4c, herein, disposed along a substantially diagonal line of the screen in a reception order. The processes are carried out in the reception order, so that a job indicated by the job icon 101 positioned at the upper left of the touch panel 4c, out of the four job icons 101 to 104, is to be most preferentially processed. Further, a job indicated by the job icon 102 is to be processed subsequently to the process of the job icon 101, then a job indicated by the job icon 103 and a job indicated by the job icon 104 are to be sequentially processed thereafter.

The job icons displayed in this manner allow the user to instantly and clearly confirm not only the number of jobs having been received at the present stage but also an order in which the printing jobs are to be processed.

Further, in displaying a plurality of job icons, it is important also to display the job icons so that the job icons do not overlap each other. If the job icons overlap each other, it is impossible to instantly and clearly find the number of jobs having been received, and this also results in a trouble at the time of an operation for displaying the information window.

In case of displaying the job icons so that the job icons do not overlap each other, the circle-shaped job icons 101 to 104 are advantageous also in that the circle-shaped icons can be positioned nearer to each other in a horizontal direction (longer-side direction) and a vertical direction (shorter-side direction) of the screen than cornered icons such as a square icon and a triangle icon. In case where the number of icons is larger, an interval of the job icons adjacent to each other may be made shorter in being displayed.

Further, as illustrated in FIG. 4, there are displayed not only the job icons 101 to 104 but also line sections L each of which vertically extends in the screen from each job icon. The line sections L emphasize a manner in which the job icons 101 to 104 are disposed, thereby allowing the user to watch the screen more easily.

Further, out of the job icons 101 to 104, the job icon 101 indicative of the function information "Printer" is circled with a thicker line than those of the job icons 102 and 103 each of which is indicative of a standby job. This shows that the job indicated by the job icon 101 is currently processed.

The display manner of the job icon concerning the currently processed job is made different from those of job icons each of which is indicative of a standby job in this manner, so that the user can easily recognize that the job indicated by the job icon 101 is being processed.

Likewise, the job icon 104 indicative of the function information "USB" in FIG. 4 is double-circled unlike the job icons 102 and 103 each of which is single-circled and is indicative of a standby job, thereby emphasizing the display manner of the job icon 104. This shows that a job indicated by the job icon 104 is a newly received job.

The job icon 104 indicative of the newly received job is additionally displayed by connecting the USB memory 50 to the external connector 45 of the communication interface 7 with the job icons 101, 102, and 103 displayed as illustrated in FIG. 3, so that the displayed image changes as illustrated in FIG. 4.

The display manner of the job icon concerning the newly received job is made different from those of the job icons each of which is indicative of a standby job, so that the user can easily recognize that the job icon indicates a newly received job.

When a predetermined period passes, the display manner of the job icon concerning the newly received job becomes a normal display manner which shows that the job icon is indicative of a standby job. As a result, it is possible to avoid such disadvantage that a job icon indicative of a lastly received job is kept displayed as a newly received job icon until a next job is received.

Further, as to the job icon whose function information "USB" indicates that the USB memory has been connected, data which should be processed is selected by using the information window as will be described later, and the indication returns to a normal standby state at the time when the information window is closed.

Note that, how to change the display manner of the job icon is mere an example, and the job icon may be made to flicker, or may be reversed, or may be rotated. Further, a color of the job icon may be changed or the job icon itself or a surrounding of the job icon or a surrounding line of the job icon may be illuminated or these portions may be entirely illuminated as long as the display section 4b of the touch panel 4c allows color display.

Figure 14:
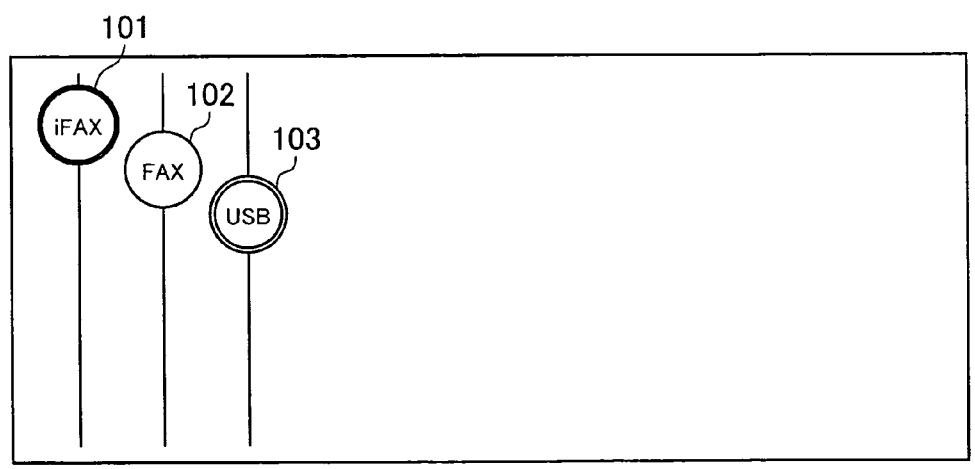
FIG. 14 is a drawing illustrating how the job information display control section of the printing apparatus displays job information.

While, the job icon displayed in the screen is deleted when the processing of the job is completed. However, if the job concerning the job icon 101 is finished under such condition that the window illustrated in FIG. 4 is displayed for example, the display manner of the touch panel 4c changes as exemplified in FIG. 14. That is, as illustrated in FIG. 14, when the job icon 101 is deleted from the screen, subsequent job icons 102 ... diagonally shift toward the upper left at the same time, so that the job icon 102 is redisplayed at the top.

Such display causes the job icons to be always displayed in a processing order from the upper left of the screen, so that the user can more easily find the processing status of the printing job than the arrangement in which the job icon concerning the completed job is merely deleted from the screen.

Next, how to display the information window is explained as follows. As described above, in the printing apparatus 1, the job icon displayed in the screen is operated, so that the information window of the operated job icon can be displayed. The information displayed in the information window is predetermined in accordance with the function information of the printing job. This will be detailed later.

Figure 6:
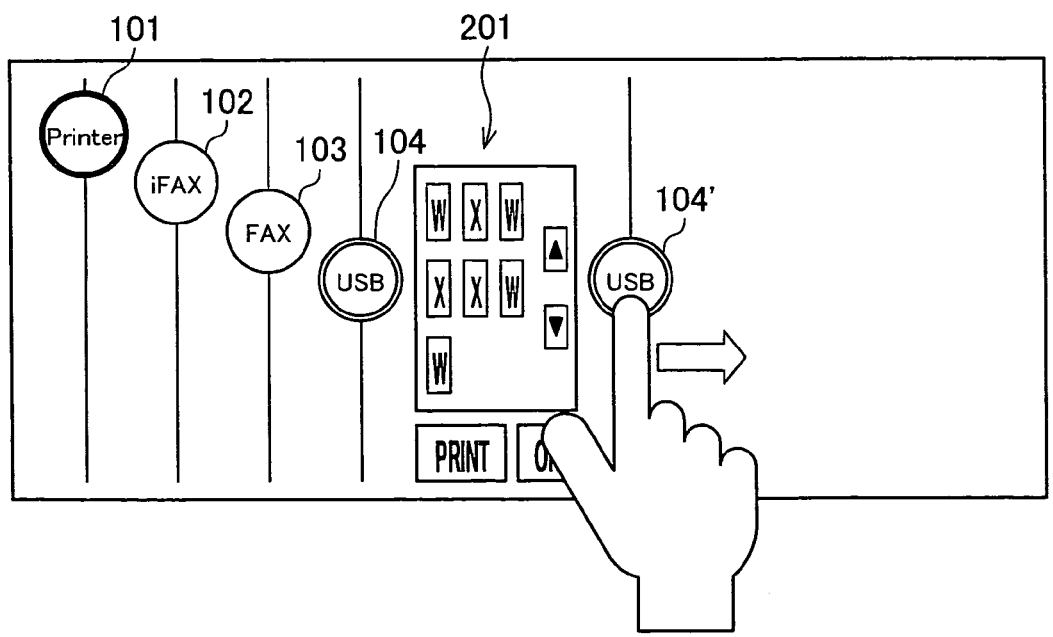
FIG. 6 is a drawing illustrating how the job information display control section of the printing apparatus displays job information.
Figure 7:
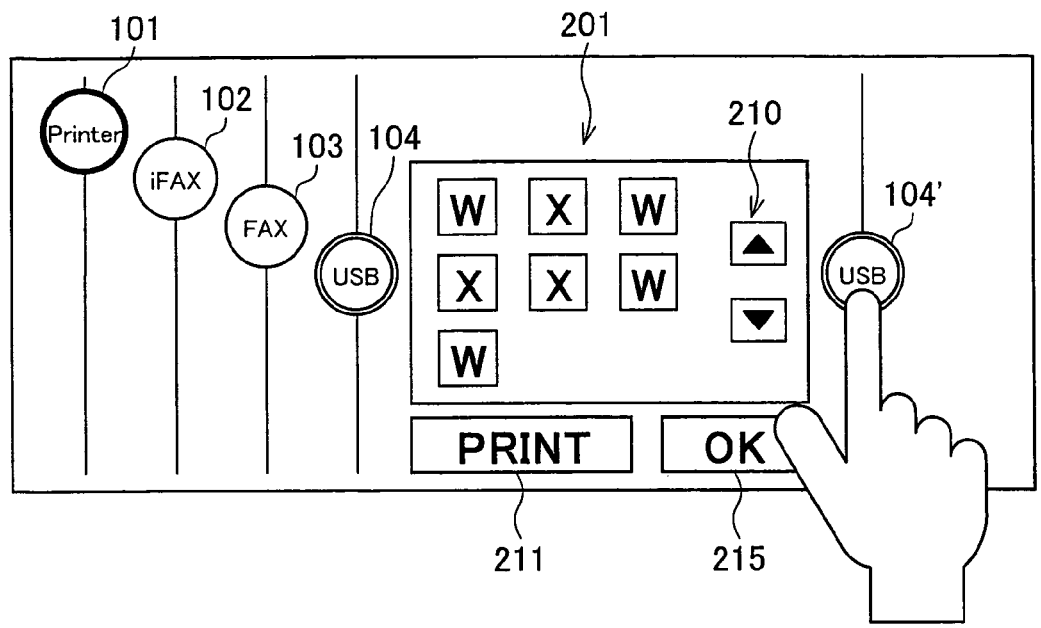
FIG. 7 is a drawing illustrating how the job information display control section of the printing apparatus displays job information.

As illustrated in FIG. 5 for example, if the job icon indicative of "USB" is operated, an information window 201 is displayed so as to follow the sliding operation as illustrated in FIG. 6 and FIG. 7. The information window 201 is an information window indicative of the functional information "USB".

More specifically, a satellite icon 104' having the same shape as that of the job icon 104 is displayed in parallel to the job icon 104 as a pair so as to follow the sliding operation, and the information window 201 is displayed between the two icons 104 and 104'.

At this time, in case where a job icon indicative of the presence of a subsequent printing job exists on the right side of the job icon 104, the subsequent job icon horizontally moves to the right side of the screen.

In the sliding operation, a size of a space between the two icons 104 and 104' which space serves as a display region of the information window 201 changes according to an amount of the operation. Thus, also a display size of the information window 201 is adjusted so as to be horizontally increased or decreased so that the display size corresponds to the region.

Herein, in moving the satellite icon 104', it is preferable that a maximum display size of the information window 201 is set and the movement of the satellite icon 104' is restricted at a position which allows for display corresponding to the maximum display size.

The maximum size of the information window 201 may be fixed, but in case where the number of displayed job icons is large or in a similar case, all the job icons cannot be displayed when the information window 201 is opened with its maximum size. Thus, in such case, the maximum size may be made smaller. Adversely, the maximum size may be fixed and a job icon interval may be made narrower.

Figure 8:
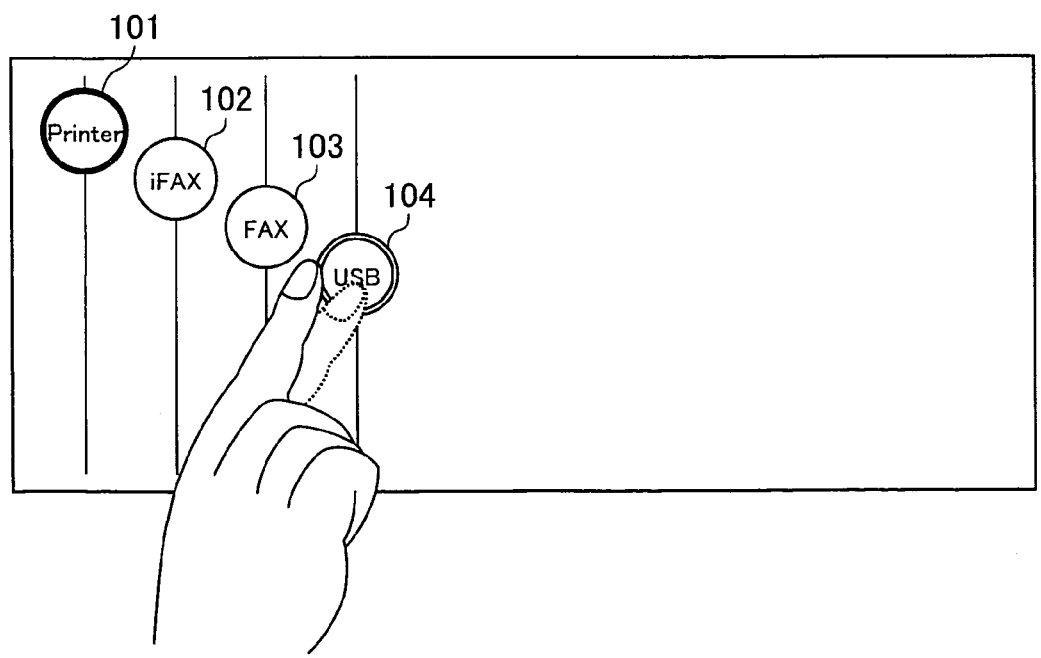
FIG. 8 is a drawing illustrating how the job information display control section of the printing apparatus displays job information.
Figure 9:
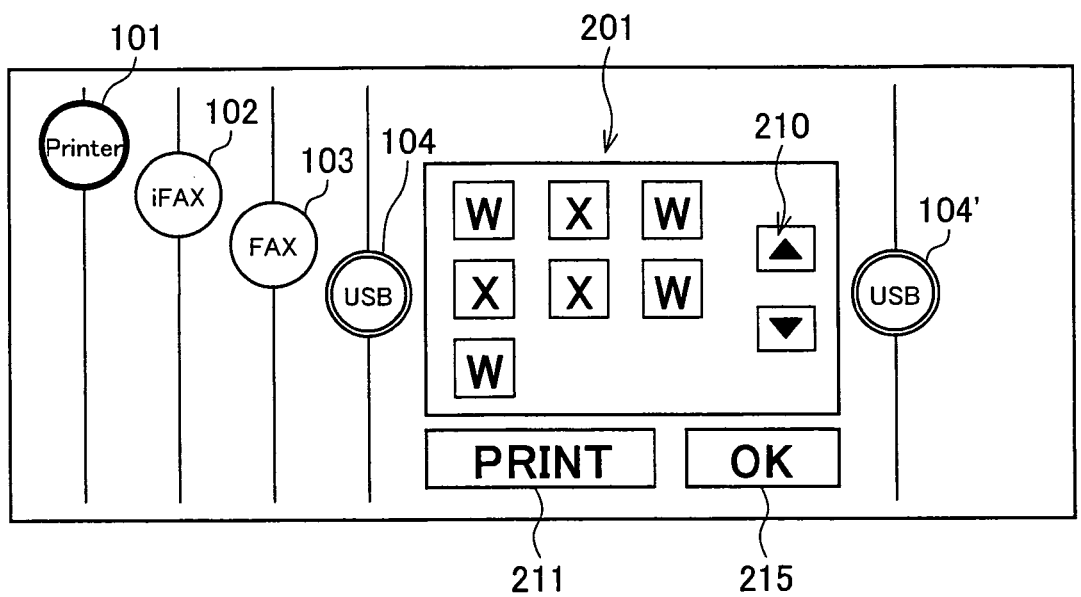
FIG. 9 is a drawing illustrating how the job information display control section of the printing apparatus displays job information.

Further, as illustrated in FIG. 8, the information window 201 is displayed also by carrying out the touching operation with respect to the job icon 104. In the case of the touching operation, as illustrated in FIG. 9, an information window having a predetermined size which facilitates confirmation of a content thereof at the same time as the operation. Also in this case, the information window 201 is displayed between the operated job icon 104 and the satellite icon 104' having the same shape as that of the job icon 104.

The displayed information window 201 is deleted by carrying out the touching operation with respect to any one of the icons 104 and 104' positioned at both sides of the information window 201. With the deletion of the information window, also the second job icon 104' is deleted.

Further, a sliding operation is carried out so that the satellite icon 104' overlaps the original job icon 104, thereby deleting the information window 201. In this case, the information window 201 becomes smaller corresponding to an amount of the sliding operation and gradually disappears.

Further, even if the operation for deleting the information window 201 is not carried out, the information window 201 is deleted when a predetermined time period passes after the information window 201 is displayed. Further, the information window is automatically deleted also in case where a processing of a job concerning the displayed information window is completed.

At the same time as deletion of the information window or subsequently to the deletion of the information window, other job icon having been displayed on the right side of the screen moves to the left side of the screen and is displayed at its original position in order to secure the display region of the information window 201.

Figure 10:
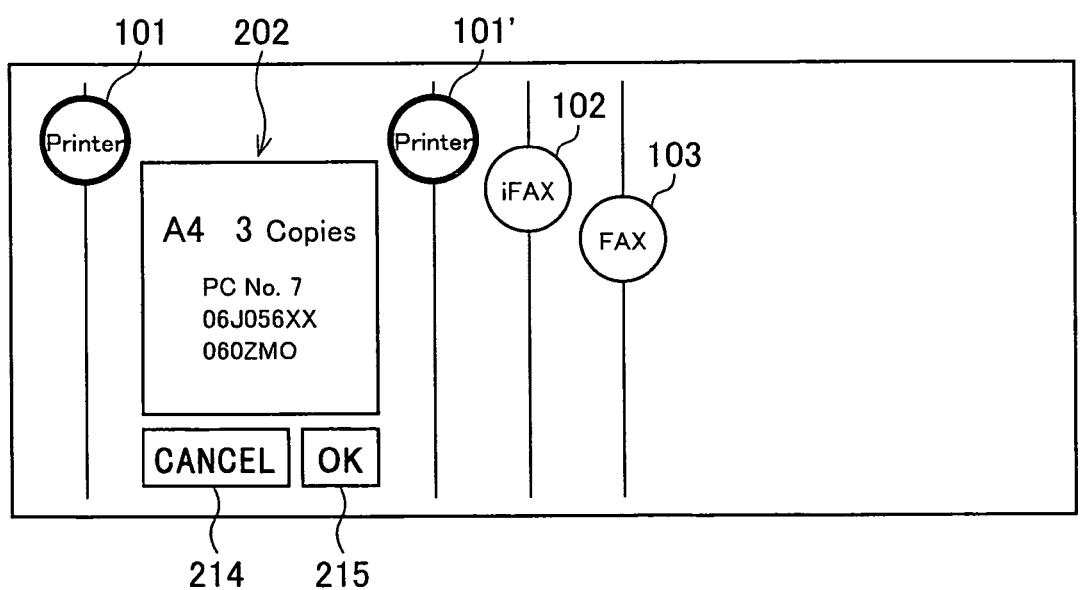
FIG. 10 is a drawing illustrating how the job information display control section of the printing apparatus displays job information.
Figure 11:
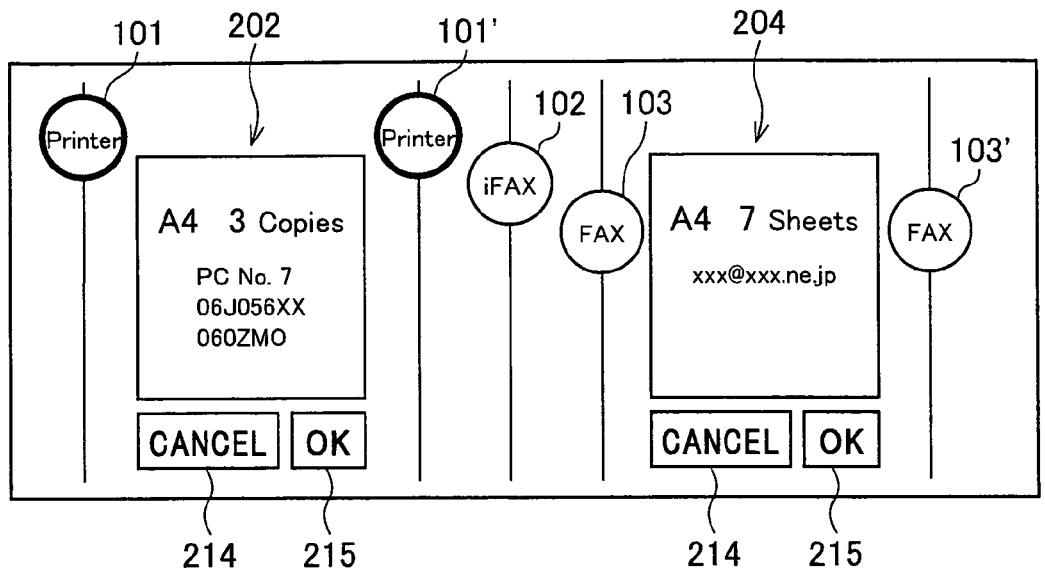
FIG. 11 is a drawing illustrating how the job information display control section of the printing apparatus displays job information.

In case where a plurality of job icons are operated, information windows concerning the operated job icons are displayed in parallel. As illustrated in FIG. 10 for example, if the job icon 103 indicative of "FAX" is operated with an information window 202 displayed, a new information window 204 is additionally displayed as illustrated in FIG. 11.

Herein, the information window whose reference numeral is 202 is an information window indicative of function information "Printer" which information window is displayed by operating the job icon 101 indicative of "Printer". Further, an information window whose reference numeral is 204 is an information window indicative of function information "FAX" which information window is displayed by operating the job icon 103 indicative of "FAX".

If the display size is changed by carrying out the sliding operation with respect to a job icon concerning any information window with plural information windows displayed in this manner, a display size of other information window accordingly changes.

Figure 12:
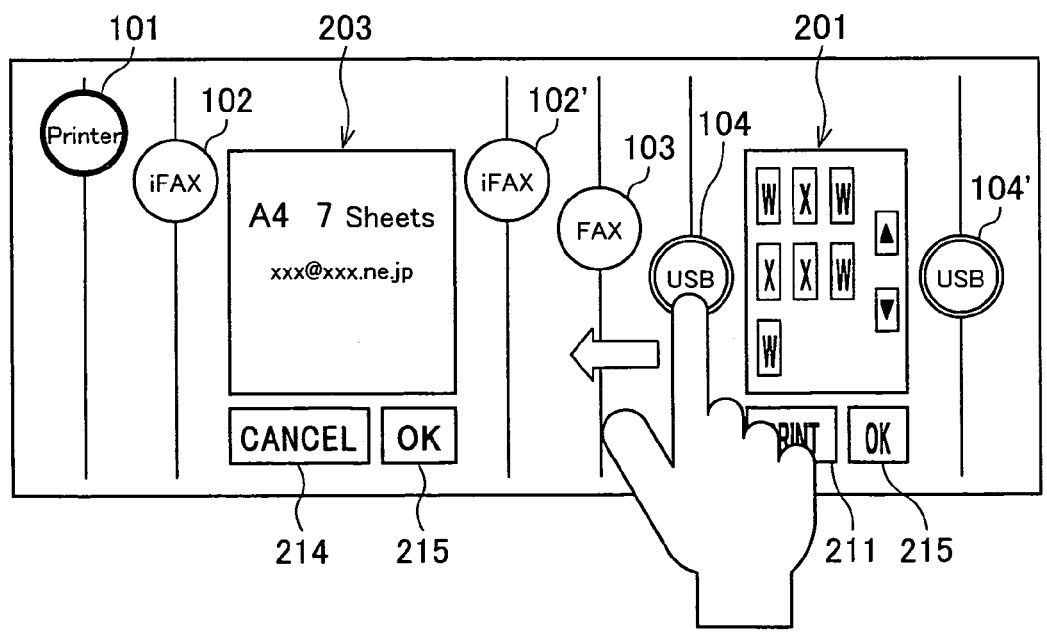
FIG. 12 is a drawing illustrating how the job information display control section of the printing apparatus displays job information.
Figure 13:
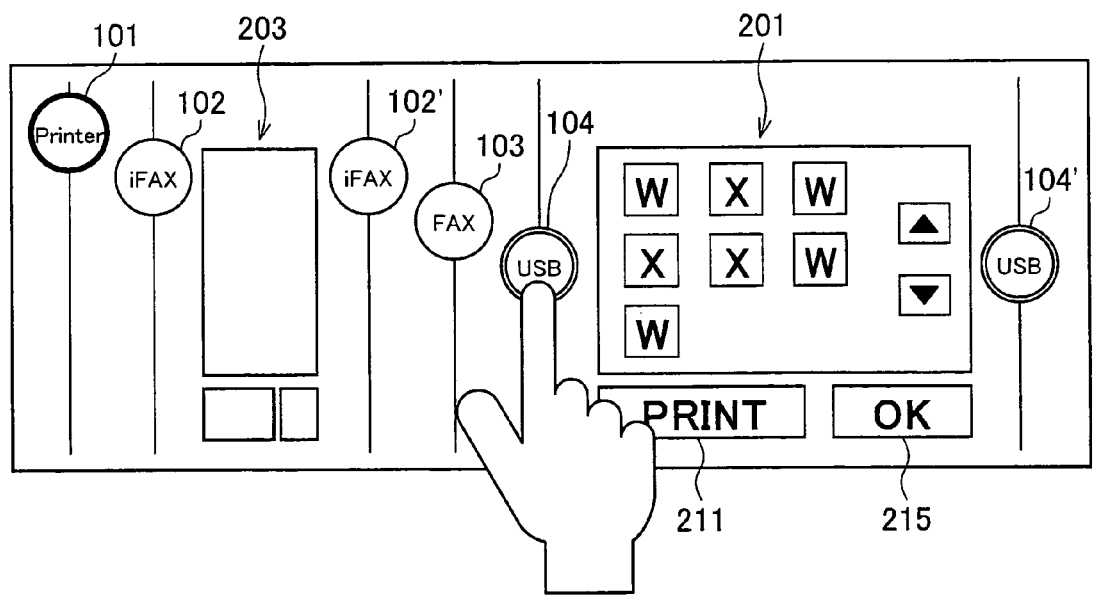
FIG. 13 is a drawing illustrating how the job information display control section of the printing apparatus displays job information.

This is illustrated in each of FIG. 12 and FIG. 13. FIG. 12 illustrates a state in which a plurality of information windows 203 and 201 are disposed. Herein, an information window whose reference numeral is 203 is an information window indicative of function information "iFAX" which information window is displayed by operating the job icon 102.

If a sliding operation is carried out with respect to the job icon 104 indicative of "USB" under the condition illustrated in FIG. 12, the display region of the information window 201 concerning the job icon 104 becomes wider and the display size of the information window 201 becomes larger, and the display region of the information window 203 becomes narrower and the display size of the information window 203 becomes smaller, as illustrated in FIG. 13.

The information window 203 becomes smaller to a predetermined minimum size, and also the job icon 104 can be slid toward the left side as long as the size of the information window 203 is not the minimum size.

Next, an information window having been predetermined according to function information of a printing job is described as follows.

As illustrated in FIG. 9 (FIG. 7), information sets indicative of file names "W1, W2, . . . , X1, X2, . . . " of all files stored in the connected USB memory 50 are displayed in the information window 201 concerning the job indicative of the function information "USB". Further, direction keys 210, a print key 211, an OK key 215, and the like are displayed therein.

Each of the direction keys 210 is used in selecting a file. The key 210 is operated so as to select one from the "W1, W2, . . . , X1, X2, . . . ". The print key 211 is used to specify a printing process. If the print key 211 is operated with a certain file selected, a printing instruction is inputted. The OK key 215 is used to input completion of the selection. The OK key 215 is operated subsequently to the operation of the print key 211 so as to validate the printing instruction.

In case of giving an instruction to carry out printing processes with respect to plural files, file selection using the direction keys and subsequent operations of the print key 211 and the OK key 251 are repeated so as to correspond to the number of the selected files.

Further, as illustrated in FIG. 10, (i) recording sheet size information "A4", (ii) copy number information "three copies", (iii) image data sending end information "PC No. 7", (iv) image data file name information "06J056XX", (v) user name information "06OZMO", and the like, all of which are specified in the printing job, are displayed in the information window 202 concerning the job indicated by the function information "Printer".

Further, also a cancel key 214 and an OK key 215 are displayed in the information window 202. The cancel key 214 is a key used to cancel the printing process carried out as the job in the image forming section 6. Further, the OK key 215 is a key used to finish inputting the instruction via the information window 202. In case of the information window 202, the OK key 215 is operated after operating the cancel key 214, so that the cancellation instruction is validated.

Further, as illustrated in FIG. 11, not only the cancel key 214 and the OK key 215 but also (i) recording sheet size information "A4", copy number information "3 copies", sending end telephone number information, and the like, all of which are specified in the printing job, are displayed in the information window 204 concerning the job indicated by the function information "FAX".

Further, as illustrated in FIG. 12, not only the cancel key 214 and the OK key 215 but also (i) recording sheet size information "A4", (ii) sheet number information "seven sheets", (iii) image data sending end mail address information, and the like, all of which are specified in the printing job, are displayed in the information window 203 concerning the job indicated by the function information "iFAX".

Figure 16:
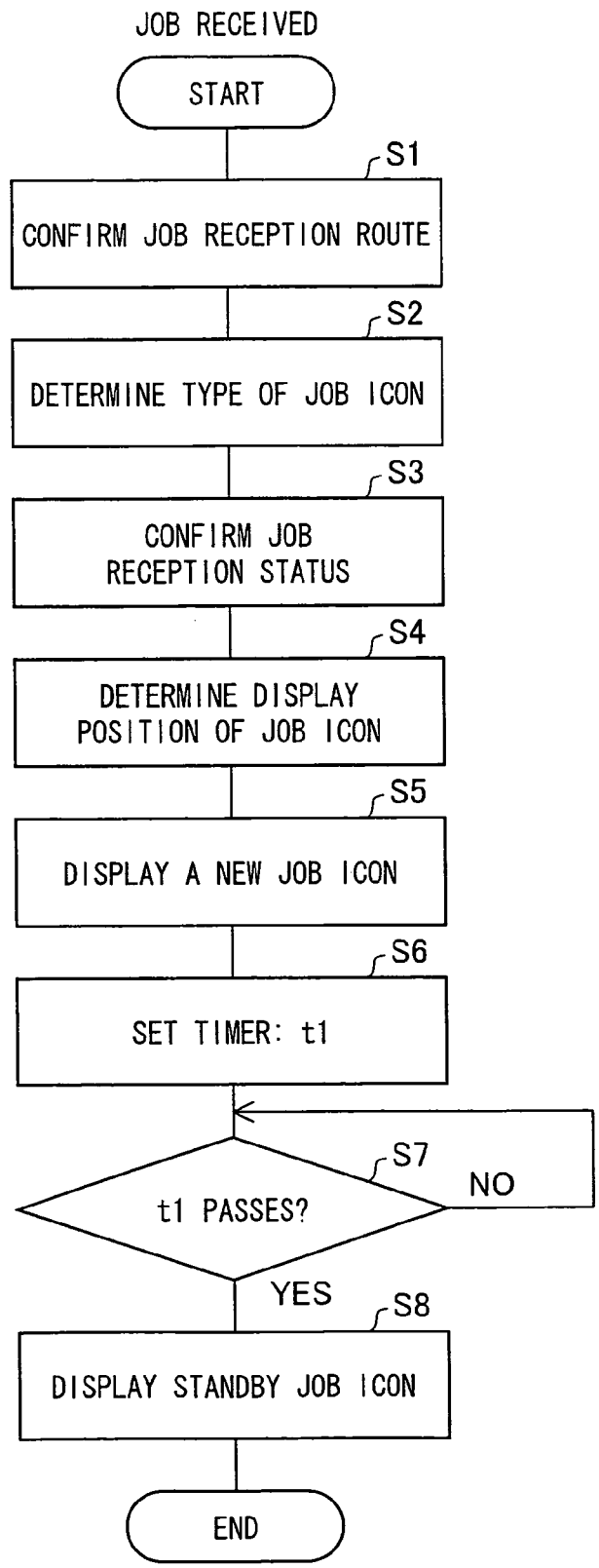
FIG. 16 is a flowchart illustrating a procedure in which the job information display control section of the printing apparatus displays a job icon indicative of new reception for a certain period in case where a job is newly received.

With reference to the flowchart of FIG. 16, the following describes a procedure in which a job icon is displayed as a newly received job only for a predetermined period in case of newly receiving the job.

The job receiving section 31 receives job data as a job to be processed, and the job detection section 34 detects reception of the new job. Upon detecting the reception of the new job, the job detection section 34 informs the touch panel control section 36 of this. While, the job management section 32 confirms a job reception route through which the job has been newly received (S1) so as to allocate function information.

With reference to the job management section 32, the touch panel control section 36 obtains the function information allocated to the newly received job and determines a job icon having a shape (type) based on the function information (S2).

Next, with reference to the job management section 32, the touch panel control section 36 confirms a job reception status (S3) and determines a display position of the job icon concerning the newly received job (S4).

When the type of the job icon to be displayed is determined in this manner, the touch panel control section 36 displays the job icon as a newly received job (S5) and subsequently sets a timer (S7). Thereafter, when a predetermined time period t1 passes, the display manner of the job icon is changed to a display manner indicative of a normal standby state (S8).

Figure 17:
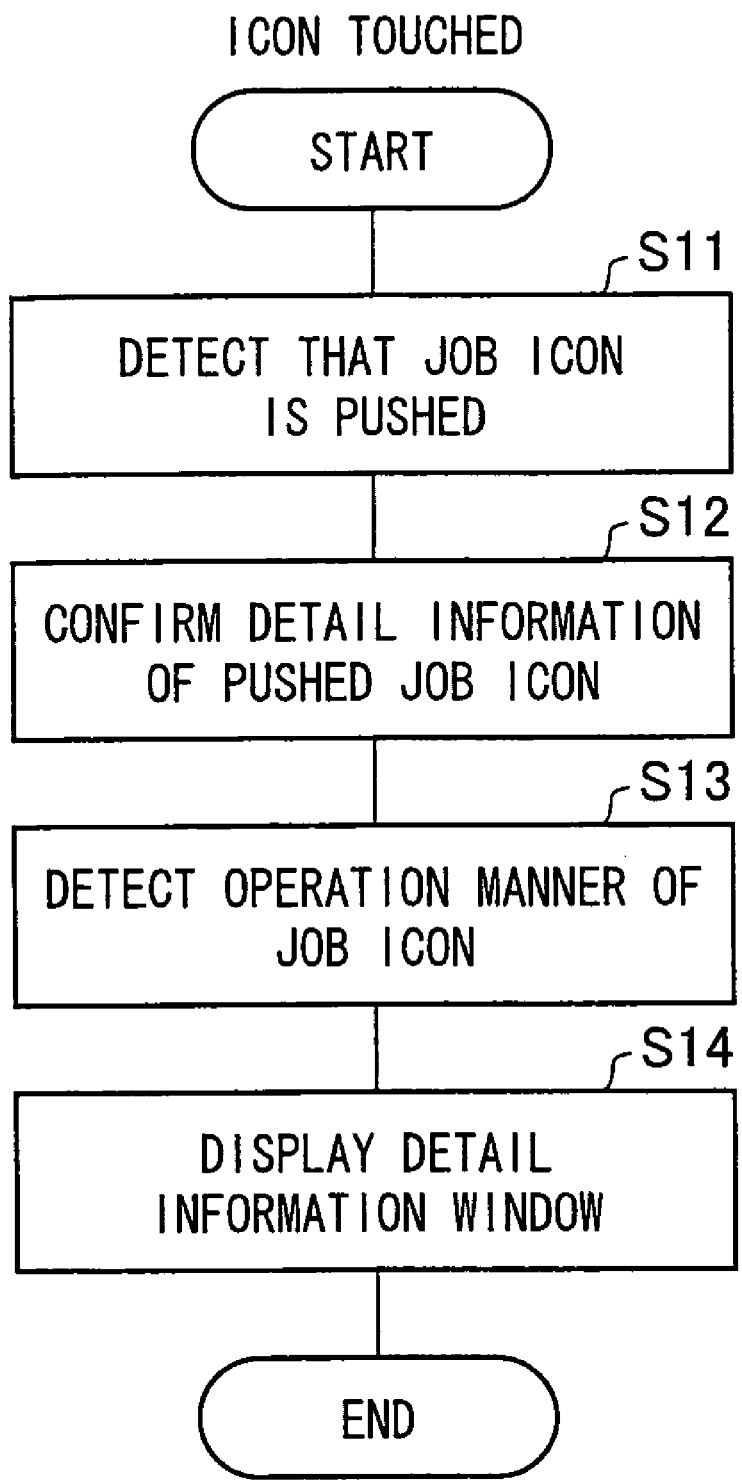
FIG. 17 is a flowchart illustrating a procedure in which the job information display control section of the printing apparatus displays an information window.

With reference to the flowchart of FIG. 17, a procedure in which an information window is displayed. If the operation detection section 38 detects that the job icon is pushed with the job icon displayed in the touch panel 4c, the operation detection section 38 specifies the pushed job icon and informs the touch panel control section 36 of the specified job icon (S1).

With reference to the job management section 32, the touch panel control section 36 confirms detail information of the job icon having been pushed (S12). The operation detection section 38 subsequently detects whether an operation having been carried out is a sliding operation or a touching operation and sends the detection result to the touch panel control section 36 (S13). The touch panel control section 36 displays an information window of the operated job icon in accordance with the operation so as to provide detail information.

As described above, the printing apparatus of the present embodiment is arranged so that: a job icon indicative of the presence of a job having been received by the apparatus is displayed in a screen of the touch panel 4c, and an operation carried out with respect to the screen with the job icon displayed causes an information window concerning the displayed job icon to be additionally displayed.

Thus, the user can easily find a job reception status of the printing apparatus 1 even in a limited display area of the touch panel 4c, and the user can confirm detail information of the received job by watching the screen displaying the job icon without transiting to other window.

As a result, the user can easily find a processing status of the job received by the printing apparatus 1, as well as detail information of the job, by effectively using the limited display area of the touch panel 4c.

Note that, it may be so arranged that: information disclosed in the information window, a time taken to automatically delete the information window after displaying the information window, a time taken to change the display manner indicative of the new reception into a display manner indicative of a normal standby state or similar information can be changed as required by the user.

As described above, an image data processing apparatus of the first present invention, in which a job receiving section communicates with an external device and receives image data and control data for carrying out a job processing with respect to the image data so as to receive a job and a job processing section executes the job received by the job receiving section, said image data processing apparatus comprising: a display input section for displaying information in a screen and for allowing the screen to be operated so as to input an instruction; and a job information display control section for causing the screen of the display input section to display an icon indicative of a presence of the job having been received and for causing the screen to additionally display an information window disclosing information concerning the job corresponding to the icon when the screen is operated with the icon displayed.

Thus, the limited display area of the operation panel is effectively used, so that the user can easily find processing statuses of jobs received by the apparatus.

It is preferable to arrange the image data processing apparatus so that: in case of displaying a plurality of icons, the job information display control section displays the icons so that the icons do not overlap each other.

As a result, the user can instantly and clearly find the job, having been received by the apparatus, merely by watching the icon display window. Further, also in case of operating the icon, the user can surely operate the icon which should be operated.

It is preferable to arrange the image data processing apparatus so that: in case of displaying a plurality of icons, the job information display control section displays the icons so that the icons are disposed along a diagonal line of the screen in an order corresponding to an order in which jobs are received.

As a result, with reference to the arrangement of icons, the user can instantly and clearly find the order, in which jobs are received, merely by watching the icon display window.

It is preferable to arrange the image data processing apparatus so that: the job information display control section displays an icon corresponding to a newly received job in a display manner different from a display manner of the icon corresponding to the job having been received.

As a result, the user can instantly and clearly find that a new job has been received by the apparatus merely by watching the icon display window.

It is preferable to arrange the image data processing apparatus so that: when a predetermined period passes, the job information display section causes the display manner of the icon corresponding to the newly received job to be the same as the display manner of the icon corresponding to the job having been received.

As a result, for example, unlike such an arrangement that a display manner indicative of new reception is continued until next job reception, it is possible to accurately inform the user that the job is such a new job that little time has passed after receiving the job.

It is preferable to arrange the image data processing apparatus of the first present invention so that: the job information display control section causes a display manner of an icon corresponding to a job being processed to be different from a display manner of an icon corresponding to a standby job.

As a result, merely by watching the display window of the icon, the user can instantly and clearly find which job is being processed.

It is preferable to arrange the image data processing apparatus of the first present invention so that: the job receiving section includes a plurality of job data receiving routes, and the job information display control section displays an icon corresponding to each of the job data receiving routes.

It is possible to allocate a job function in accordance with the job receiving route. For example, if the present apparatus is a printer apparatus, the image data processing apparatus functions as a FAX apparatus with respect to a job received by a FAX modem, so that the job function can be set as a FAX. Further, with respect to a job received by the communication section, the image data processing apparatus functions as a printer which processes a job from a PC or the like, so that the job function can be set as a printer.

A shape or the like of the icon is varied according to the receiving route in this manner, so that the user can instantly and clearly find a function (type) of a received job merely by watching the icon display window.

It is preferable to arrange the image data processing apparatus of the first present invention so that: when the icon displayed in the screen is operated, the job information display control section displays an information window concerning the job corresponding to the icon having been operated.

As a result, the icon is directly operated so as to display an information window of a job indicated by the icon, so that it is possible to display the information window more easily.

It is preferable to arrange the image data processing apparatus of the first present invention so that the job information display control section displays the information window in a vicinity of the icon having been operated.

As a result, unlike such an arrangement that the information window is displayed separately from the operated icon, the user can easily find a relation between the icon and the information window.

In displaying the information window in the vicinity of the icon, for example, it may be so arranged that the job information display control section displays an icon having the same shape as the icon having been operated and displays the information window between these two icons. If the information window is displayed in this manner, the user can more easily find the relation between the icon and the information window.

Further, in displaying the information window, for example, it may be so arranged that: when any one of the icons respectively displayed at both sides of the information window is touched so as to be operated with the information window displayed in the screen, the job information display control section deletes the information window.

Further, in displaying the information window, for example, it may be so arranged that: when the icon displayed in the screen is slid so as to be operated, the job information display control section displays an icon having the same shape as the icon having been operated, so as to follow the sliding, and the job information display control section displays an information window in an area, which is provided between the two icons and whose width is changeable, so that the information window corresponds to the width.

If the information window is displayed in this manner, the user can more easily find the relation between the icon and the information window, and the user can change the size of the information window by herself/himself. For example, in case of opening a plurality of information windows or a similar case, a display size of each information window can be adjusted.

It is preferable to arrange the image data processing apparatus of the first present invention so that: when a predetermined period passes after displaying the information window, the job information display control section deletes the information window.

As a result, even if the user forgets to close (delete) the information window, the information window is automatically deleted when a certain time period passes, and the screen changes into the previous icon display window, so that it is possible to prevent interruption in the icon display window.

It is preferable to arrange the image data processing apparatus of the first present invention so that: when the job processing section completes the job processing, the job information display control section deletes the icon corresponding to the job having been processed, and the job information display control section deletes also the information window in case where the information window has been displayed.

As a result, an icon concerning a job having been processed is deleted from the screen, so that the icon display window displays only icons concerning jobs in process or jobs on standby. Thus, the user can instantly and clearly find current processing statuses of jobs.

It may be so arranged that the image data processing apparatus of the present invention further includes as the job processing section an image forming section for forming an image based on image data onto a recording sheet.

(Embodiment of a Second Present Invention)

With reference to FIG. 18 to FIG. 40, the following description will explain an embodiment of the second present invention.

Figure 19:
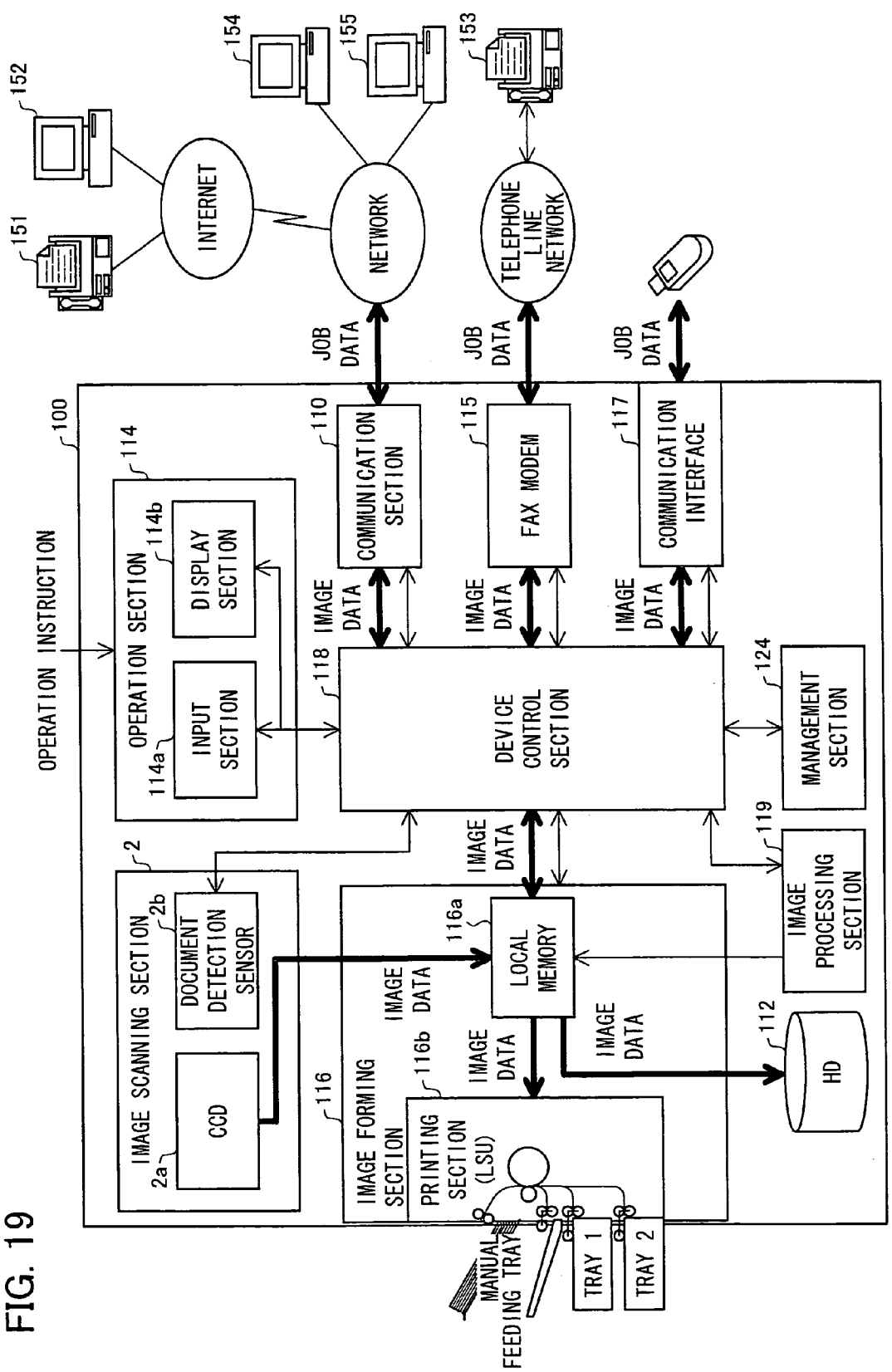
FIG. 19 is a functional block diagram illustrating an entire arrangement of the multifunctional device.

First, with reference to FIG. 19, an entire arrangement of a digital multifunctional device (image data processing apparatus) 100 is described as the present embodiment. FIG. 19 is a block diagram illustrating the entire arrangement of the present multifunctional device 100.

The multifunctional device 100 includes a copy mode, a printer mode, a scanner mode, and a facsimile mode. The multifunctional device 100 includes: an image scanning section 2 for scanning a document so as to input image data; an operation section 114 for allowing the user to input data; an image forming section 116 for printing the image data; a hard disk device 112 for saving the image data; a communication section 110 for communicating with an external device; a FAX modem 115 for communicating with a facsimile device; a communication interface 117 for communicating with a USB memory; a management section 124 in which control information, setting information, and the like of the entire apparatus are stored; and a device control section 118 for controlling the entire apparatus.

The image scanning section 2 is an image data generation section for generating image data and includes an imaging element such as a CCD 2a and a document detection sensor 2b for detecting a document having been set on a document tray or an automatic document feeder (ADF). The image data scanned by the CCD 2a is outputted to the image forming section 116.

Figure 20:
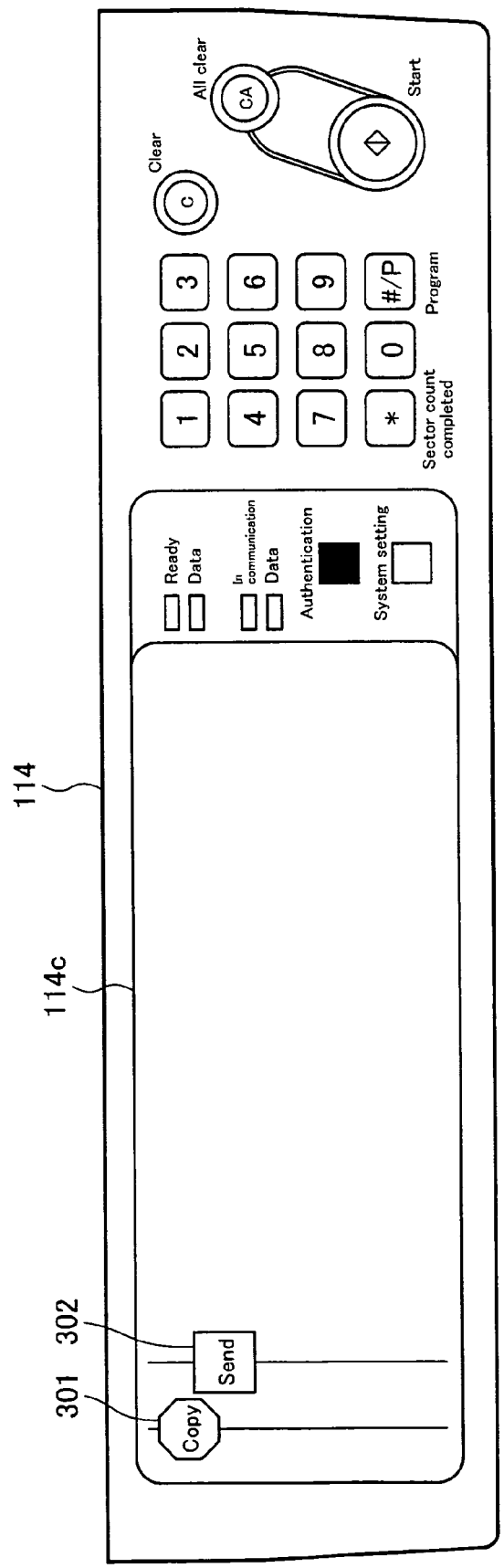
FIG. 20 is a drawing illustrating an operation panel provided on the multifunctional device.

The operation section 114 includes an input section 114a and a display section 114b, and allows the entire apparatus to be operated and allows various settings to be inputted to the apparatus, and displays inputted contents and an operation status of the entire apparatus. FIG. 20 is a plan view illustrating the operation section 114. As illustrated in FIG. 20, the input section 114a has a key group disposed in the vicinity of the display section 114b and a touch screen disposed on the display section 114b. The touch screen and the display section 114b constitute a touch panel 114c which allows the user to touch its screen so as to input his or her instruction. The display section 114b is constituted of a liquid crystal panel or the like for example. In the present multifunctional device 100, as illustrated in FIG. 20, the display section has a horizontally long rectangular shape with respect to a user who faces the operation section 114.

The image forming section 116 includes a local memory 116a in which the image data is stored and a printing section 116b equipped with a laser scanning unit or the like. The printing section 116b prints an image, based on the image data stored in the local memory 116a, onto a recording sheet fed from a sheet feeding section (not shown). The image processing section 119 carries out an image processing, such as compression, extension, modification, and the like, with respect to the image data stored in the local memory 116a. The image data having been processed is outputted from the local memory 116a to the printing section 116b, the hard disk device 112, or the device control section 118.

The communication section 110 sends or receives data to or from information processing devices 154 and 155 in the network and to or from an information processing device 152 via the Internet or to or from an Internet facsimile device 151. The sent or received data includes job data. The communication section 110 is connected to a network constituted of the information processing devices 154 and 155 such as a PC, a server, and the like, connected to a router, a switching hub, or the like via a LAN cable. Further, the network is connected to the Internet via a communication line such as a telephone line network, an optical fiber, or the like.

The FAX modem 115 is connected to the telephone line network via a telephone line, and carries out a facsimile communication with an external facsimile device so as to send or receive job data to or from the facsimile device 153. The sent or received data includes job data.

In the communication interface 117, a USB memory is connected to an external connector 145 (see FIG. 27), so that the communication interface 117 carries out a communication with the USB memory 150 so as to send or receive data to or from the USB memory 150. The sent or received data includes job data. The multifunctional device 100 carries out a communication directly with the USB memory 150 not via a PC or the like so as to receive a job, thereby carrying out a printing process of the image data stored in the USB memory 150 or storing the job data into the USB memory.

If any data is inputted from the operation section or data is inputted from the external device, the device control section 118 controls respective sections of the apparatus in accordance with the information stored in the management section 124 so as to execute any one of the copy mode, the printer mode, the scanner mode, and the facsimile mode.

Specifically, the device control section 118 sends image data, having been inputted from the external device, to the local memory 116a of the image forming section 116 in the printer mode or in a reception mode of the facsimile mode. The image data is processed by the image processing section 119. In the copy mode, the image data is sent from the image scanning section 2 to the local memory 116a of the image forming section 116.

The image data having been processed is developed as "image data to be outputted" for each page and is temporarily stored in the hard disk device 112, and then the thus developed image data sets are sequentially read out from the hard disk device 112 at a suitable timing so as to be sent to the local memory 116a again. The image data in the local memory 116a is forwarded to the printing section 116b so as to correspond to a timing at which the image data is written into the printing section 116b.

This is applicable also to the case of printing a plurality of images based on the image data, and the image data for each page is stored in the hard disk device 112 and is sent from the hard disk device 112 to the local memory 116a so as to correspond to an output mode. The image data in the local memory 116a is forwarded to the printing section 116b, so as to correspond to a timing at which the image data is written into the printing section 116b, with this operation repeated so as to correspond to the number of the images to be outputted.

Further, in a sending mode of the facsimile mode and in the scanner mode, the device control section 118 causes the image processing section 119 to process the image data, having been sent from the image scanning section 2 to the local memory 116a of the image forming section 116, and then outputs the thus processed image data to the communication section 110, the FAX modem 115, or the communication interface 117, thereby sending the image data to the outside of the apparatus.

Incidentally, in case where printing jobs to be carried out by the image forming section 116 are concentrated in the multifunctional device 100, these jobs cannot be processed at the same time by the single image forming section 116. The same state takes place in a sending job for sending the job data from the communication section 110, the FAX modem 115, or the communication interface 117.

Thus, in the multifunctional device, the jobs are conventionally received as reservations so as to be sequentially processed. This is applicable also to the present multifunctional device 100. In case of receiving jobs as reservations, the problem is whether (i) the number of the received jobs, (ii) an order in which the jobs are to be processed, (iii) detail information of each job, and similar information can be easily confirmed or not.

The multifunctional device 100 of the present embodiment includes a job information display function which effectively uses a limited display area of the touch panel 14c so as to display information concerning jobs which information allows a processing order and the like of the received jobs to be confirmed (hereinafter, this information is referred to as "job information").

Next, the job information display function of the present multifunctional device 100 is detailed as follows. Upon receiving job data as a job to be processed, the present multifunctional device 100 displays a startup icon for starting up the image scanning section 2 in the touch panel 4c. In addition, If job data is received from the external device as a job to be processed, a job icon indicative of the presence of the received job is displayed.

Figure 18:
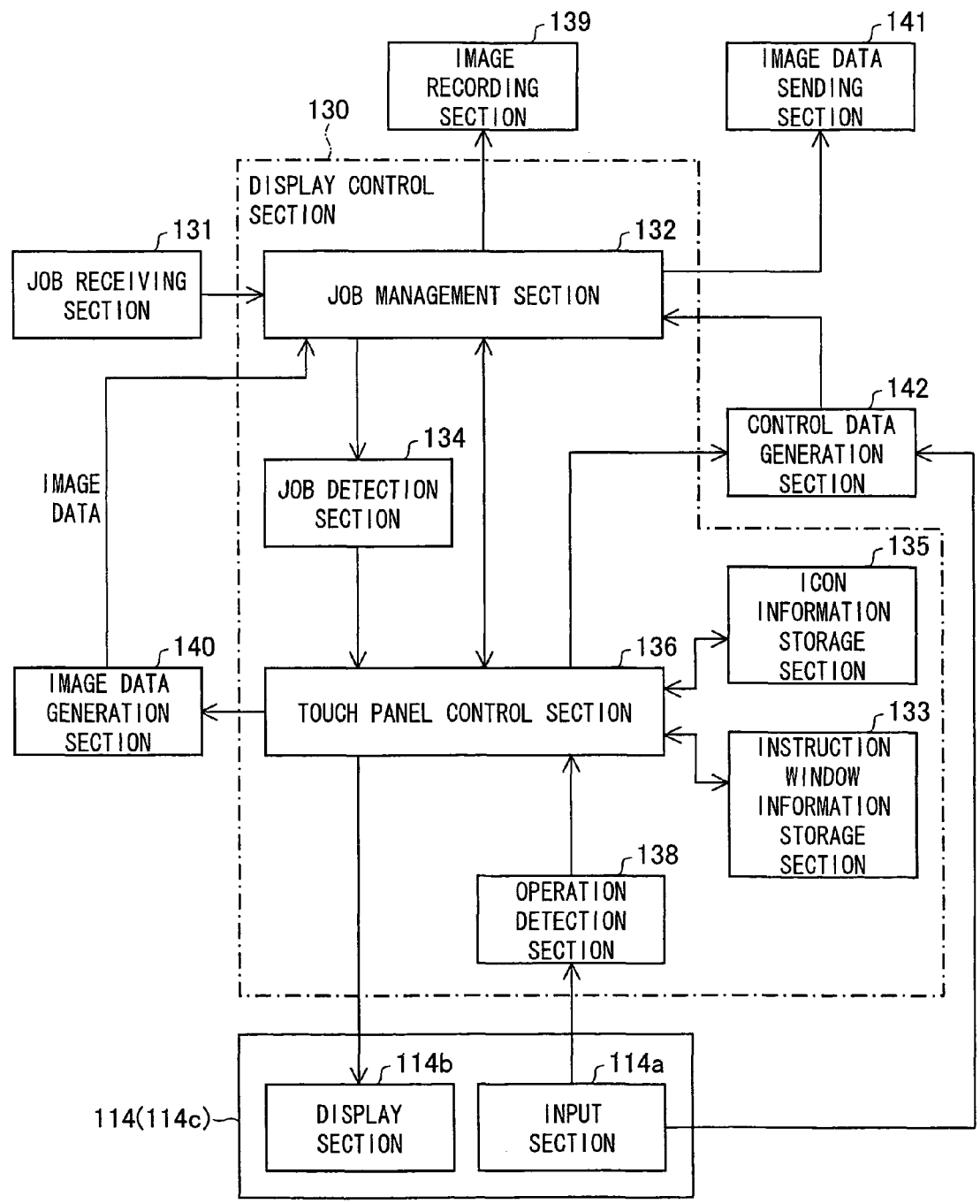
FIG. 18, showing an embodiment of the second present invention, is a functional block diagram illustrating essential portions for realizing an information display function of a multifunctional device.

The job information display function is realized by the operation section 114 and the job information display control section 130 which are illustrated in FIG. 18. FIG. 18 is a functional block diagram illustrating essential portions for realizing the display function of the present multifunctional device.

In FIG. 18, the job receiving section 131 receives job data, sent from the outside, as a job to be processed. The job receiving section 131 includes: the communication section 110; the FAX modem 115; the communication interface 117; the device control section 118 controlling these sections; and the management section 124, all of which are illustrated in FIG. 19.

An image recording section (job processing section) 139 forms an image based on the image data onto a recording material and is constituted of the image forming section 116, the device control section 118 controlling these sections, and the management section 124, all of which are illustrated in FIG. 19.

A data sending section Bob processing section) 141 sends the image data in the sending mode of the facsimile mode and in the sending mode of the scanner mode. The image data sending section 141 includes the communication section 110, the FAX modem 115, and the communication interface 141 which are illustrated in FIG. 19.

An image data generation section 140 generates the image data in the apparatus, and includes the image scanning section 2, the device control section 118 controlling these sections, and the management section 124.

In response to an instruction given from the operation section 114, a control data generation section 142 generates control data for carrying out a job process with respect to the image data scanned by the image data generation section 140. In the copy mode, the control data generation section 142 generates control data for carrying out a printing process with respect to the image data. In the sending mode of the facsimile mode and the sending mode of the scanner mode, the control data generation section 142 generates control data for carrying out a sending process with respect to the image data.

The control data generation section 142 includes the device control section 118 and the management section which are illustrated in FIG. 19. Note that, in FIG. 18, a signal input line from the touch panel control section 136 is used to transmit display information of a below-described instruction window displayed in the touch panel 114c. The control data is generated on the basis of the content of the instruction window. Further, an input signal line from the input section 114a is used to input an instruction given by operating any member other than the touch panel 114c, e.g., by operating a start key, an all clear key, or the like.

Further, a display control section 130 controls the touch panel 114c so as to display a startup icon, a job icon, an instruction window, and an information window. The display control section 130 includes a job management section 132, a job detection section 134, a touch panel control section 136, an icon information storage section 135, and an operation detection section 138.

The job management section 132 manages a processing status of the job requested from the outside and received by the job receiving section 131 and manages a processing status of a job which occurs in the multifunctional device 100. Via the job receiving section 131, not only the job data of the job received from the outside but also information indicative of a reception date or a reception route and similar information are inputted. Further, the image data having been scanned by the image scanning section 2 and the control data having been generated by the control data generation section 142 are inputted, and information indicative of a reception date (accrual date) and an input route or a similar information is inputted as job data of a job which occurs in the multifunctional device 100.

The job management section 132 manages a processing status so that jobs having been received from the outside and jobs which occurs in the multifunctional device 100 are processed in an order corresponding to an order in which the jobs are inputted to the job management section. The job management section 132 includes a management table as illustrated in FIG. 38 for example, and information such as the reception date, the reception route, the sending end, the receiving end, the recording sheet size, the sheet number, the copy number, and the like are stored in the management table for each job. In case where the job data sending end is a PC or a USB memory, also a file name and a user name are stored.

Further, in the present multifunctional device 100, the job management section 132 allocates function information to each job, having been received from the outside, in accordance with a route via which the job has been received. For example, function information "FAX" indicating that the multifunctional device 100 serves as a FAX device is allocated to a printing job having been received via the FAX modem 115 (a printing job in a receiving mode of the facsimile mode).

Further, function information "iFAX" indicating that the multifunctional device 100 serves as the internet facsimile device 151 or function information "Printer" indicating that the multifunctional device 100 serves as a printer for processing a printing job from other PC or the like is allocated to a printing job having been received via the communication section 110. Note that, as to a difference between the "iFAX" and the "Printer", received data having a mail address as in an e-mail is determined as "iFAX", and received data in a PDL (Page Description Language) format is determined as "Printer".

With respect to a sending job having been received via the communication section 110, function information "Send" is allocated. Note that, the function information can be further categorized into "iFAX" and "FAX" depending on a sending route.

Further, as described above, the multifunctional device 1 has a function for causing the communication interface 117 to communicate directly with a USB memory so as to receive a job, so that function information "USB" indicating that the multifunctional device 1 serves as such a special printer is allocated to a job having been received via the communication interface 117. Note that, it may be so arranged that function information allocated to the printing job and function information allocated to the sending job are made different from each other as "USB printing" and "USB sending".

Further, in the present multifunctional device 100, the job management section 132 allocates function information also to a job which is internally generated in accordance with a content of the job process. For example, function information "copy" is allocated to such a job that image data having been scanned by the image scanning section 2 is subjected to a printing process carried out by the image recording section 139. Further, function information "Send" is allocated to such a job that image data having been scanned by the image scanning section 2 is subjected to a sending process carried out by the image data sending section 141. The function information "Send" may be further divided into the following types. In case of sending data from the communication section 110, the function information "Send" is categorized into function information "iFAX". In case of sending data from the FAX modem 115, the function information "Send" is categorized into function information "FAX". In case of sending data from the communication interface 117, the function information "Send" is categorized into function information "USB".

If a new job occurs in the job management section 132, the job detection section 134 detects occurrence of the new job so as to send the detection to the touch panel control section 136.

The operation detection section 138 specifies an operated icon in accordance with a signal inputted via the touch panel 114c and detects the operation manner so as to send the detection result to the touch panel control section 136. In the present multifunctional device 100, there are two types of manners: a sliding operation and a touching operation.

Figure 29:
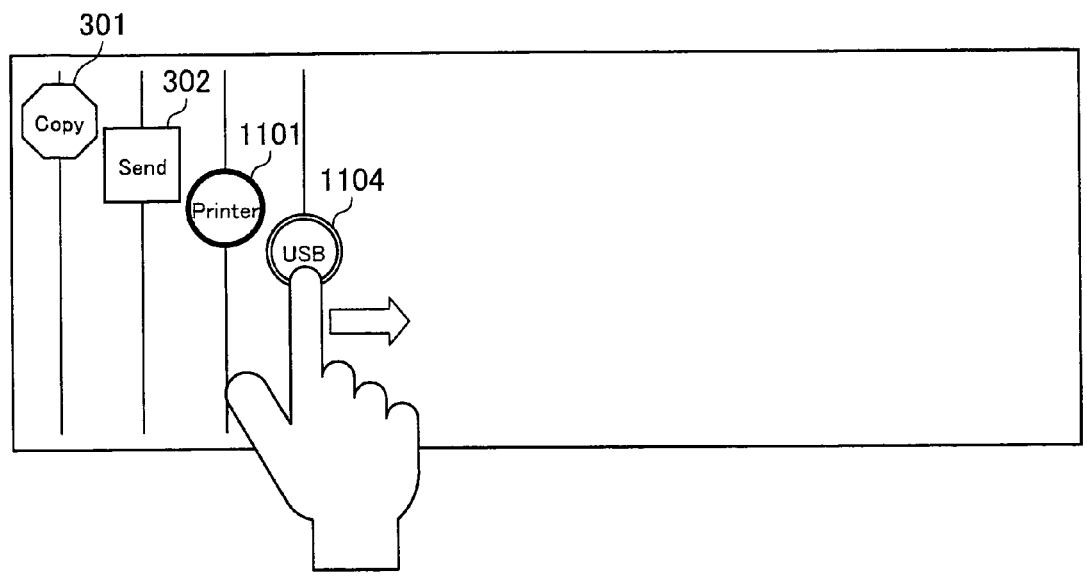
FIG. 29 is a drawing illustrating an information display function of the display control section of the multifunctional device.
Figure 30:
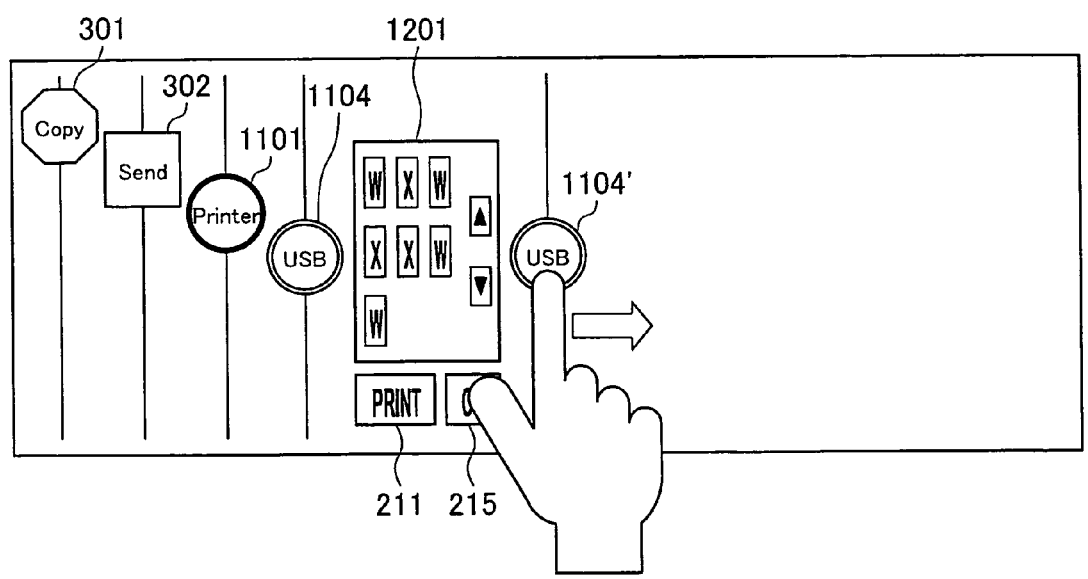
FIG. 30 is a drawing illustrating an information display function of the display control section of the multifunctional device.
Figure 31:
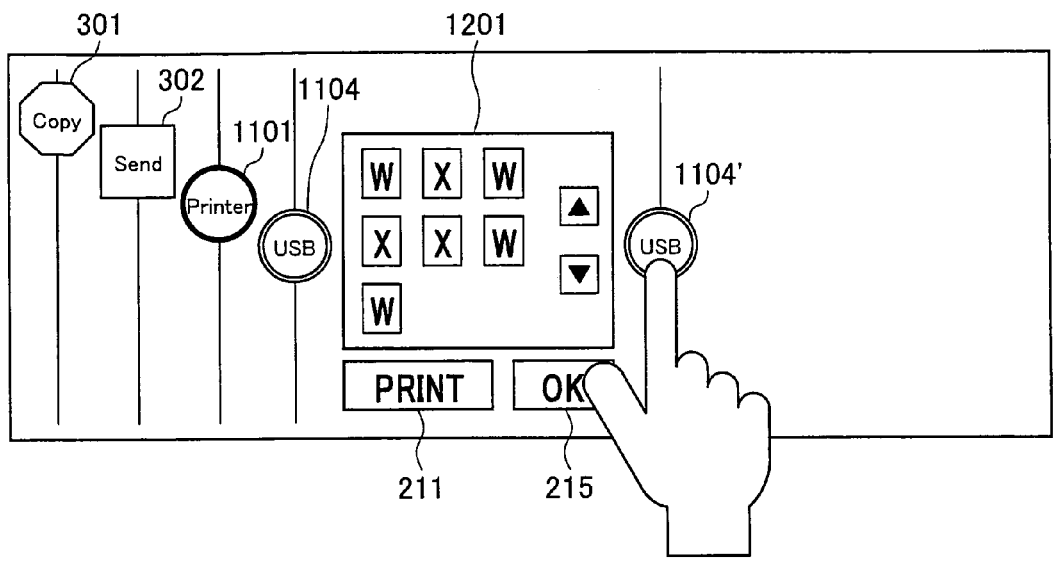
FIG. 31 is a drawing illustrating an information display function of the display control section of the multifunctional device.

As in an operation carried out with respect to a job icon 1104 in FIG. 29 to FIG. 31, the sliding operation is such that the job icon 1104 is moved in parallel with its pushed. While, the touching operation is such that the job icon 1104 is pushed and is released right after the pushing as in an operation carried out with respect to the job icon 1104 in FIG. 32. In case of the sliding operation, also an operation trail is sent to the touch panel control section 136.

Further, when an operation is carried out with respect to an instruction window with the instruction window displayed, the operation detection section 138 changes display information of the instruction window in accordance with a content of the operation. Note that, in operating the instruction window, the same function as in the conventional arrangement can be utilized.

With reference to the job management section 132, the icon information storage section 135, and the instruction window information storage section 133, the touch panel control section 136 causes the touch panel 114c to display a startup icon for activating the image data generation section 140 (image scanning section 2) and an instruction window thereof or a job icon indicative of the presence of a received job and an information window thereof, in accordance with an input signal from the operation detection section 138 and the job detection section 134.

Figure 21:
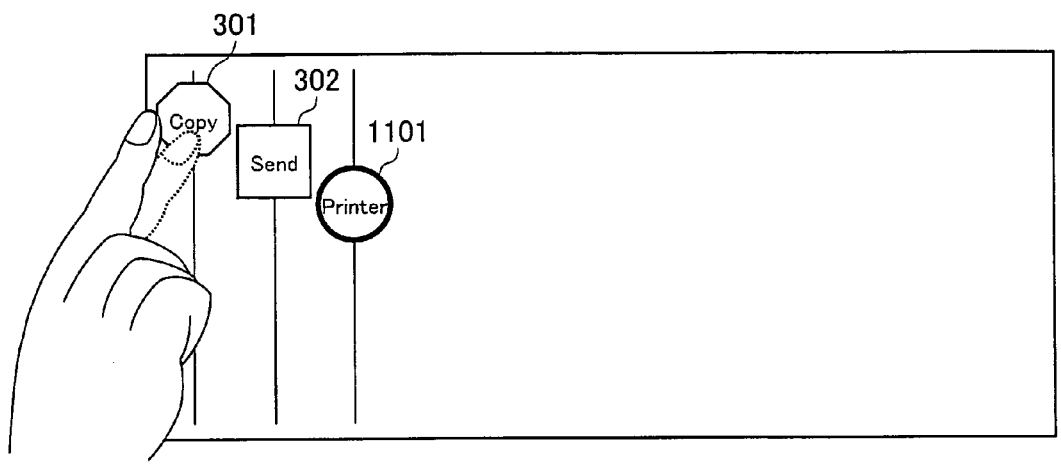
FIG. 21 is a drawing illustrating an information display function of a display control section of the multifunctional device.

FIG. 21 illustrates an example where the startup icon and the job icon are displayed. In FIG. 21, icons whose reference numerals are respectively 301 and 302 are startup icons, and an icon whose reference numeral is 1101 is a job icon indicative of the presence of a received job.

Herein, the startup icon 301 having a polygonal shape indicative of "Copy" shows that the present multifunctional device 100 has a copying function. Further, the startup icon 302 having a square shape indicative of "Send" shows that the present multifunctional device 100 has a sending function for scanning image data so as to send the scanned image data.

These startup icons 301 and 302 are always displayed as long as the multifunctional device 100 is in a condition under which the copying function and the sending function can be executed. That is, in the multifunctional device 100, the touch panel 114c displays only the startup icons 301 and 302, as illustrated in FIG. 20, in a standby state in which no job has been received.

The job icon 1101 having a circle shape indicative of "Printer" shows that a printing job has been received from the outside as a printer mode. The job icon indicative of the received job is determined for each function information.

Figure 22:
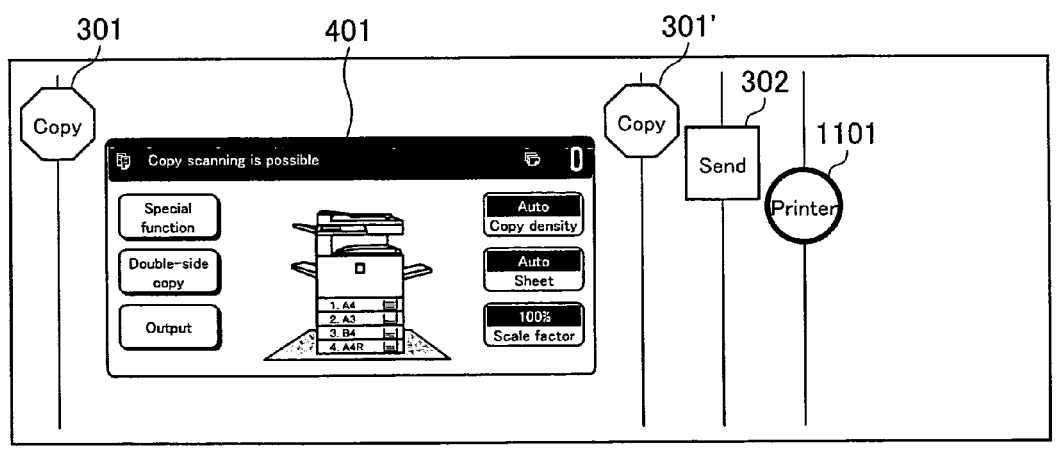
FIG. 22 is a drawing illustrating an information display function of the display control section of the multifunctional device.

When the user touches and operates the start icon 301 indicative of "copy" in the screen as illustrated in FIG. 21 and the operation detection section 138 detects the operation, the touch panel control section 136 extracts display data from the instruction window information storage section 133 as illustrated in FIG. 22 and causes an instruction window 401 in the copy mode to be additionally displayed. In the instruction window information storage section 133, display data of the instruction window 401 in the copy mode and display data of a below-described instruction window 402 in a sending mode are stored.

The instruction window 401 in the copy mode allows the user to input a detail instruction for carrying out a copy operation. In a conventional apparatus, the instruction window is generally displayed in a basic window in case where a copy mode is selected as a main mode. In the present embodiment, a satellite icon 301' having the same shape as that of the operated startup icon 301 is displayed in parallel to the startup icon 301 as a pair, and the information window 401 is displayed between the two icons 301 and 301'. At this time, in case where the startup icon 302 and the job icon 1101 which are positioned on the right side of the startup icon 301 are horizontally moved, in a direction in which the instruction window 401 is opened, with the arrangement of the icons kept.

When a start key of the operation section 114 illustrated in FIG. 20 is pushed with the instruction window 401 in the copy mode displayed, the image data generation section 140 scans image data, and the control data generation section 142 generates control data, so that a printing job in the copy mode occurs. The printing job is sent to the job management section 132 so as to be newly managed.

Figure 23:
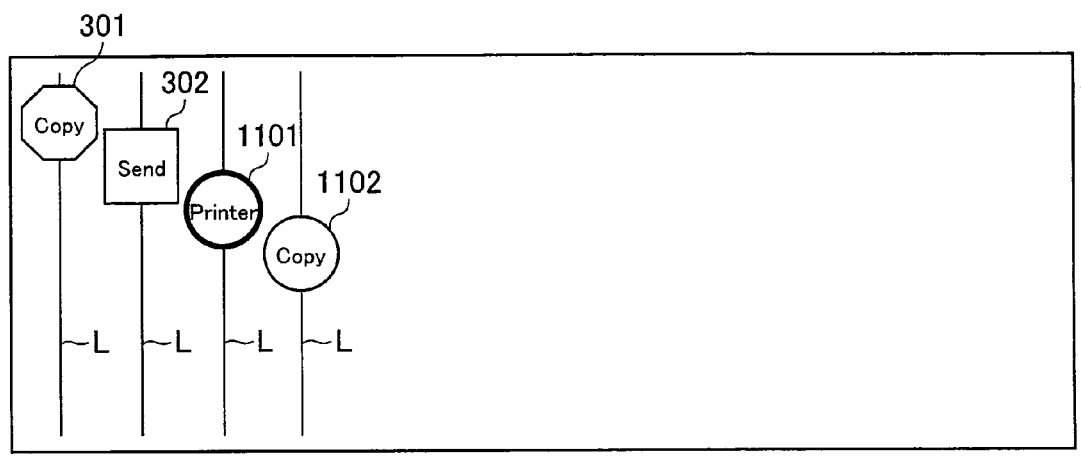
FIG. 23 is a drawing illustrating an information display function of the display control section of the multifunctional device.

The new job is stored in the job management section 132, so that the touch panel control section 136 deletes the instruction window 401 and the satellite icon 301' and returns the startup icon 302 and the job icon 1101, having been moved, to the previous positions, and then displays a job icon 1102 having a circled shape indicative of "Copy" diagonally below the icon 1101, as illustrated in FIG. 23.

Herein, the icon has the circled shape indicative of "Copy" and this manner is different from those of other icons, so that it is possible to easily recognize the difference between the startup icon 301 having a polygonal shape indicative of "Copy" and the copy job icon 1102.

Further, as apparent from comparison between the job icon 1101 and the job icon 1102, there is a difference in a thickness of a circle line of each icon. The difference makes it easier to recognize the difference of the externally received job and the job internally generated in the apparatus by the image data generation section 140.

Figure 24:
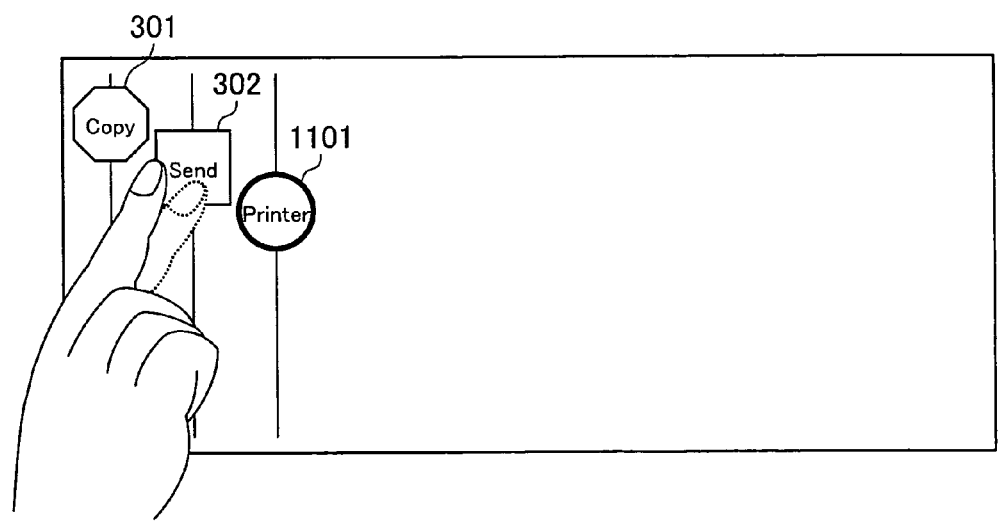
FIG. 24 is a drawing illustrating an information display function of the display control section of the multifunctional device.
Figure 25:
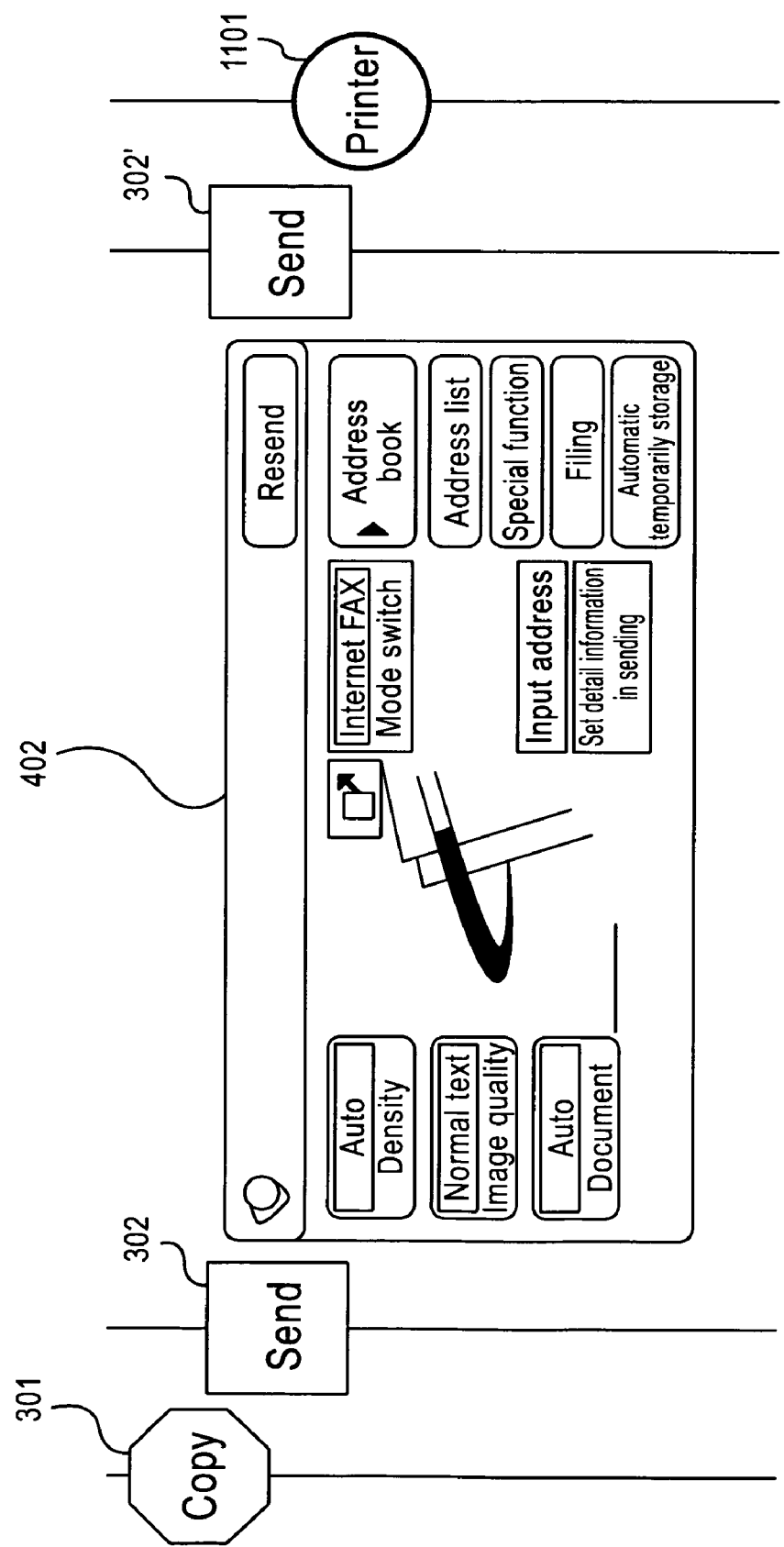
FIG. 25 is a drawing illustrating an information display function of the display control section of the multifunctional device.

While, in the same window as in FIG. 21, when the user touches and operates the startup icon 302 indicative of "Send" as illustrated in FIG. 24, the touch panel control section 136 causes the instruction window 402 in the sending mode to additionally display an instruction window 402 as illustrated in FIG. 25.

The instruction window 402 in the sending mode allows the user to input a detail instruction for carrying out a sending operation, and a conventional apparatus generally displays this instruction window in a basic window in case where the sending mode is selected as a main mode. For example, the user operates a mode switching key in the instruction window 402, so that a sending mode, e.g., an iFAX mode in which data is sent from the communication section 110, a FAX mode in which data is sent from the FAX modem 115, or a mode in which data is sent from the communication interface 117 to the connected USB, can be selected.

Note that, in the same manner as in the instruction window 401, the satellite icon 302' is displayed and the instruction window 402 is displayed between the startup icon 302 and the satellite icon 302'.

When the start key is pushed with the instruction window 402 in the sending mode displayed, the image scanning section 2 scans image data, and the control data generation section 142 generates control data, so that a sending job in a facsimile mode, a scanner mode, a USB mode, or the like occurs. The sending job is sent to the job management section 132 so as to be newly managed.

Figure 26:
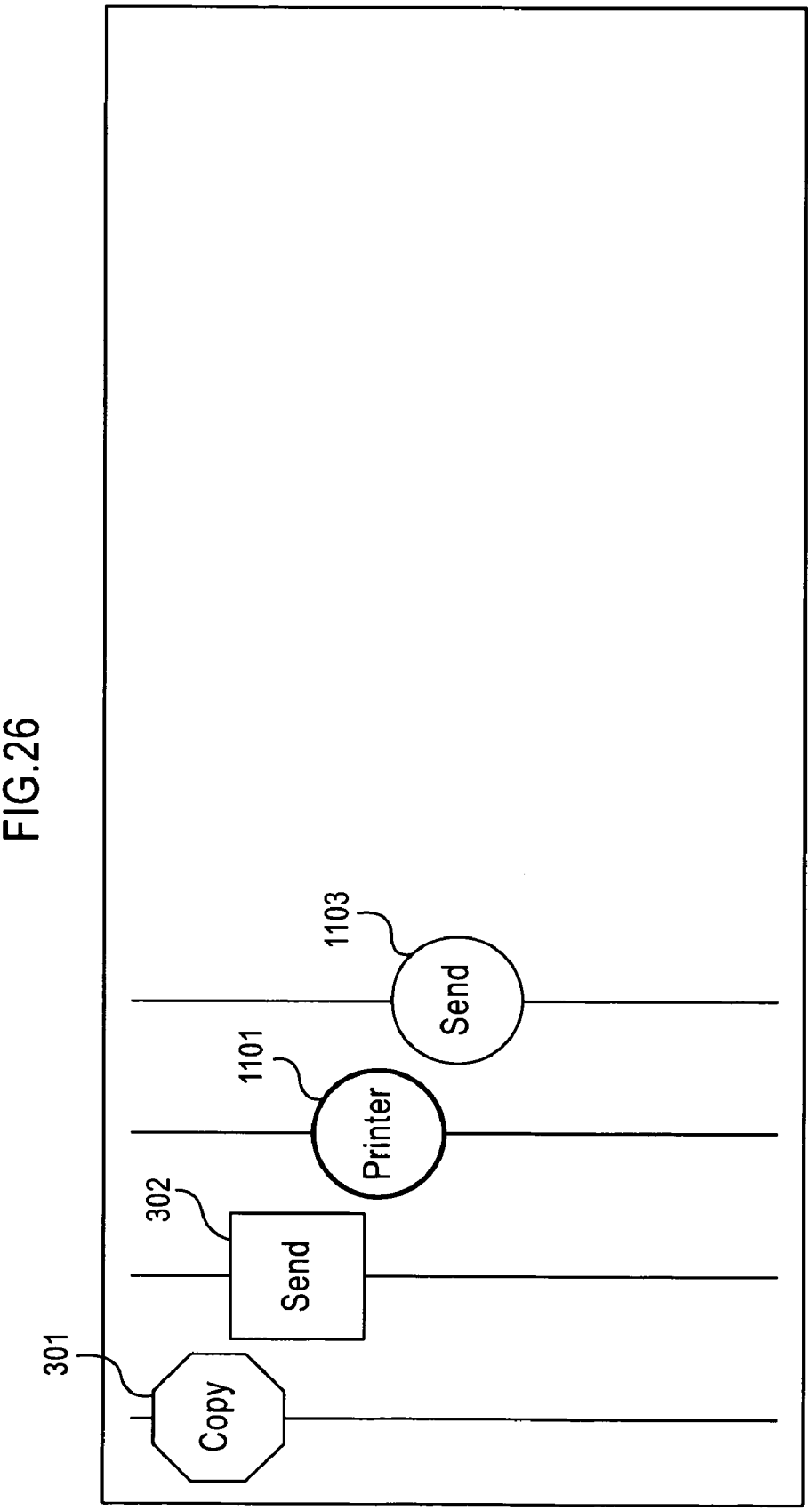
FIG. 26 is a drawing illustrating an information display function of the display control section of the multifunctional device.

As a result, the touch panel control section 136 deletes the sending instruction window 402 and the satellite icon 302' and returns the job icon 1101, having been moved, to the previous position, and displays a job icon 1103, having a circled shape indicative of "Send", diagonally below the icon 1101, as illustrated in FIG. 26.

When an all clear key of the operation section 114 illustrated in FIG. 20 is operated or when a certain time period passes after displaying the instruction windows 401 and 402, the instruction windows 401 and 402 are automatically deleted.

While, when job data to be newly processed is stored in the job management section 132 and this is detected by the job detection section, the touch panel control section 136 displays a job icon. Specifically, with reference to the management content of the job management section 132, the touch panel control section 136 obtains function information of the job newly received by the job management section 132 and information on whether the job has been externally received or has been internally generated in the apparatus, and extracts from the icon information storage section 135 data of a job icon whose shape has been predetermined, thereby displaying the job icon in the touch panel 114c. In the icon information storage section 135, shape data of various job icons to be displayed in the touch panel 114c are stored.

The touch panel control section 136 keeps on displaying the job icon of the job until the job has been completed. Upon confirming the completion of the job, the touch panel control section 136 ends the display so as to delete the job icon. The processing status of the job is determined with reference to the management content of the job management section 132.

Further, as illustrated in FIG. 23 and FIG. 26, the touch panel control section 136 displays a plurality of icons along a diagonal line of the screen so that they do not overlap each other regardless of types of icons, e.g., a startup icon or a job icon. Further, job icons are displayed in a reception order, and a manner in which each of the job icons is displayed is varied in accordance with a processing status of each job. These display variations will be described later with reference to the drawings.

Further, when the user operates a job icon with the job icon displayed in the touch panel 114c and this is detected by the operation detection section 138, the touch panel control section 136 causes an information window concerning a job of the displayed job icon to be additionally displayed. As will be described later, a content of information displayed in the information window is determined for each function information, and the touch panel control section 136 generates data of the information window with reference to the management content of the job management section.

It is preferable to position the information window in the vicinity of the operated job icon as in the instruction windows 401 and 402. Herein, as in the instruction windows 401 and 402, a satellite icon having the same shape as that of the operated job icon is displayed, and an information window is displayed therebwteen.

In the present multifunctional device 100, the instruction windows 401 and 402 are displayed by carrying out a touching operation, and the information window can be displayed by carrying out any one of a touching operation and a sliding operation. The instruction windows 401 and 402 are displayed in a basic window in a conventional apparatus, and it is preferable that they are entirely displayed at the same time upon operating the startup icon. However, the information window is used to confirm detail information of the job, so that its display area is adjusted through the sliding operation, thereby improving the usability. Note that, hereinafter, "to display the instruction windows 410 and 402 or the information window" is sometimes expressed as "to open the instruction windows 410 and 402 or the information window", and "to cause the instruction windows 410 and 402 or the information window not to be displayed" is sometimes expressed as "to close the window".

The following describes a manner in which the display control section 130 displays information with reference to FIG. 23, FIG. 27 to FIG. 37.

The touch panel 114c of FIG. 23 indicates that the multifunctional device 100 allows a copy mode and a sending mode to be adopted and a job whose functional information "Printer" is externally received and a job whose function information "Copy" is internally generated in the apparatus can be received.

Figure 36:
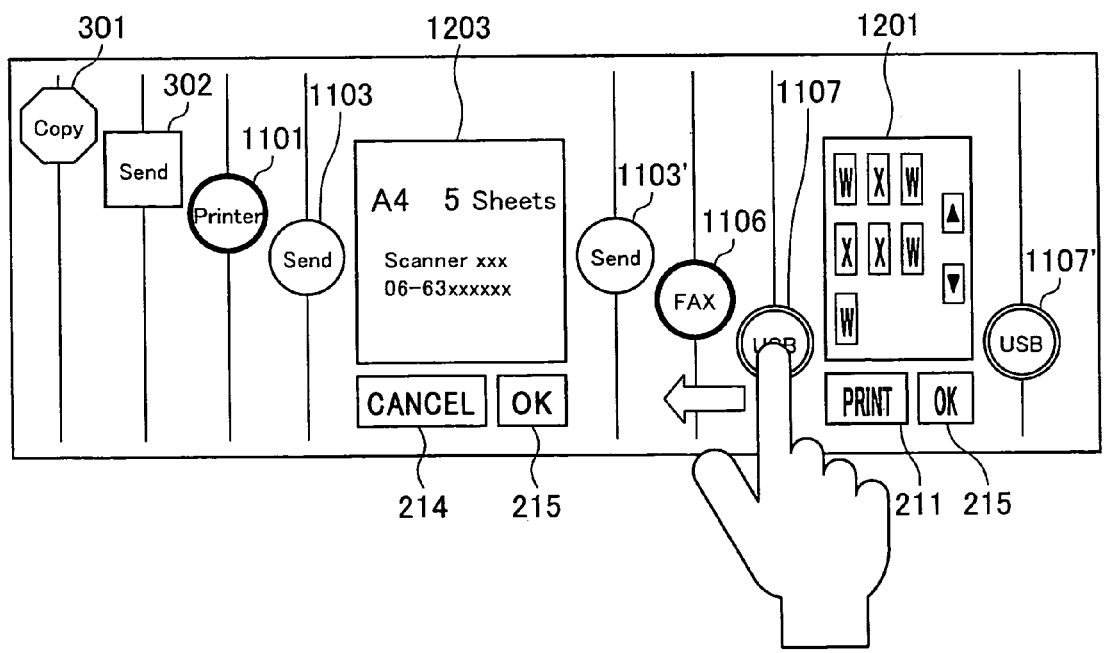
FIG. 36 is a drawing illustrating an information display function of the display control section of the multifunctional device.

In FIG. 23, the job icon 1101 having the function information "Printer" and the job icon 1102 having the function information "Copy" are displayed. However, if the received job has function information "FAX" for example, a job icon having a circled shape indicative of "FAX" as in a job icon whose reference numeral is 106 in FIG. 36 is displayed. Further, a thickness of the circle line is switched depending on whether the job has been externally received or has been internally generated.

The shape of each of the startup icon and the job icon is varied in accordance with function information in this manner, so that the user can easily find what kind of function the multifunctional device 100 can use and can easily find a type of a job which can be currently received, merely by watching the touch panel 114c.

Note that, the foregoing shapes and display manners of the startup icons and job icons are mere examples, so that the shapes and display manners may be variously changed. However, it is preferable to shape each icon so that a characteristic thereof allows the function information to be specified.

As illustrated in FIG. 23, the startup icons 301 and 302 and the job icons 1101 and 1102 are disposed diagonally from the upper left of the screen of the touch panel 114c, herein, disposed along a substantially diagonal line of the screen, and the job icons 1101 and 1102 are disposed in a reception order.

For example, in case of printing jobs which are to be processed by the image recording section 139, these jobs are executed in a reception order, so that a job whose presence is indicated by the job icon 1101 positioned at the upper left of the touch panel 114c is preferentially processed, and a job whose presence is indicated by the job icon 1102 is subsequently processed. These job icons are displayed in this manner, so that the user can instantly and clearly confirm not only the number of jobs having been received at the present stage but also an order in which the printing jobs are to be processed.

Further, in displaying a plurality of startup icons and a plurality of job icons, it is important also to display the icons so that the icons do not overlap each other. If the job icons overlap each other, it is impossible to instantly and clearly find the number of jobs having been received, and this also results in a trouble at the time of an operation for displaying the instruction window and the information window described later.

In case of displaying the icons so that the icons do not overlap each other, circle-shaped job icons such as the job icons 1101 and 1102 are advantageous also in that the circle-shaped icons can be positioned nearer to each other in a horizontal direction (longer-side direction) and a vertical direction (shorter-side direction) of the screen than cornered icons such as a square icon and a triangle icon. In case where the number of icons is larger, an interval of the job icons adjacent to each other may be made shorter in being displayed.

Further, as illustrated in FIG. 23, there are line sections L each of which vertically extends in the screen from each of the startup icons 310 and 302 and the job icons 1101 and 1102. The line sections L emphasize a manner in which the icons are disposed, thereby allowing the user to watch the screen more easily.

Figure 28:
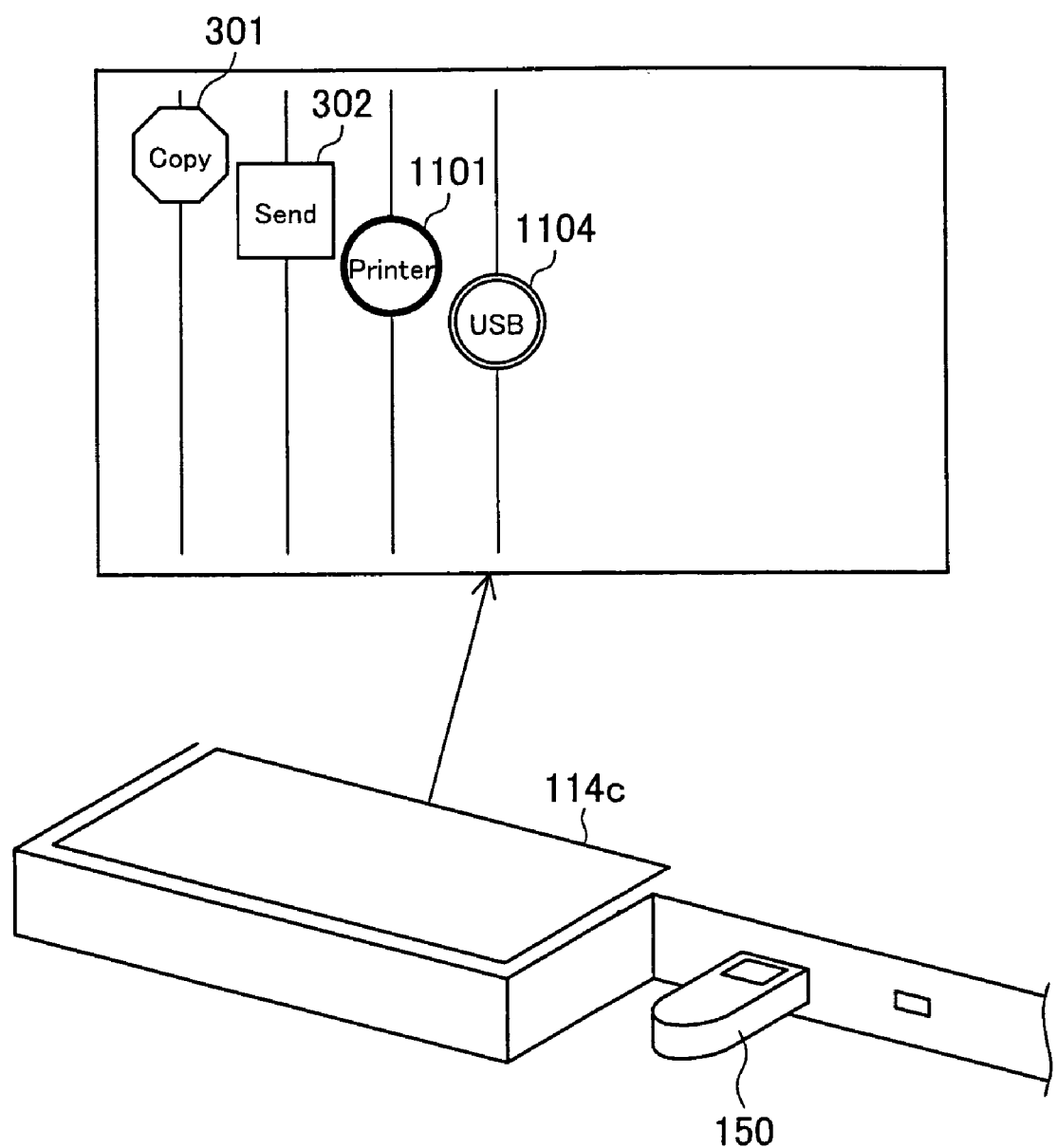
FIG. 28 is a drawing illustrating an information display function of the display control section of the multifunctional device.

Further, in the present embodiment, the manner in which the job icon concerning the newly received job is displayed is made different from the manner in which the job icon concerning the ion having been received. The job icon 1104 indicative of the function information "USB" in FIG. 28 is double-circled, thereby emphasizing the display manner of the job icon 1104. This shows that a job indicated by the job icon 1104 is a newly received job.

Figure 27:
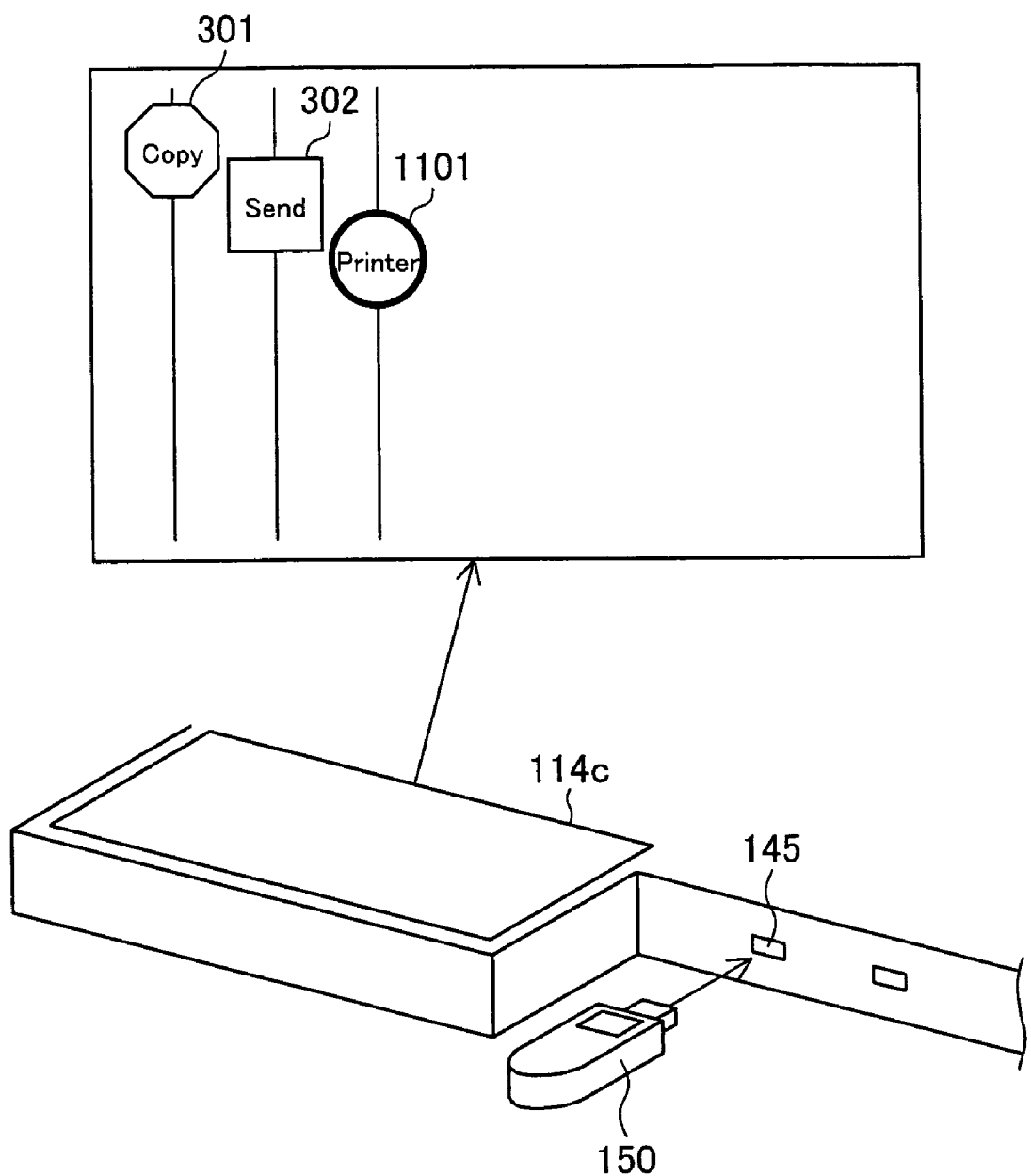
FIG. 27 is a drawing illustrating an information display function of the display control section of the multifunctional device.

The job icon 1104 indicative of the newly received job is additionally displayed by connecting the USB memory 150 to the external connector 145 of the communication interface 117 with the job icon 1101 displayed as illustrated in FIG. 27, and the displayed image changes as illustrated in FIG. 28.

The display manner of the job icon concerning the newly received job is made different from those of the job icons each of which is indicative of a standby job, so that the user can easily recognize that the job icon indicates a newly received job.

It is preferable that: when a predetermined period passes, the display manner of the job icon concerning the newly received job becomes a normal display manner which shows that the job icon is indicative of a standby job. As a result, it is possible to avoid such disadvantage that a job icon indicative of a lastly received job is kept displayed as a newly received job icon until a next job is received.

Further, as to the job icon whose function information "USB" indicates that the USB memory 150 has been connected, data which should be processed is selected by using the information window as will be described later, and the display manner changes into a normal display manner indicative of a standby state at the time when the information window is closed.

Note that, how to vary the display manner of the job icon is mere an example, and the job icon may be made to flicker, or may be reversed, or may be rotated. Further, a color of the job icon may be changed or the job icon itself or a surrounding of the job icon or a surrounding line of the job icon may be illuminated or these portions may be entirely illuminated as long as the display section 114b of the touch panel 114c allows color display.

Further, it may be so arranged that the display manner of the job icon concerning the currently processed job is made different from that of the job icon concerning the standby job though this arrangement is not adopted in the present embodiment. This makes it possible for the user to recognize the currently processed job easily.

While, the startup icons 301 and 302 are always displayed, but the job icon is deleted when the processing of the job is completed. In case where a plurality of job icons are displayed, when a job icon displayed in the upper left is deleted from the screen, subsequent job icons . . . diagonally shift toward the upper left at the same time.

Such display causes the job icons to be always displayed in a processing order from the upper left of the screen, so that the user can more easily find the processing status of the printing job than the arrangement in which the job icon concerning the completed job is merely deleted from the screen.

Next, how to display the information window is explained as follows. As described above, in the multifunctional device 100, the job icon displayed in the screen is operated, so that the information window of the operated job icon can be displayed. The information displayed in the information window is predetermined in accordance with the function information of the printing job.

As illustrated in FIG. 29 for example, if the job icon indicative of "USB" is slid, an information window is displayed so as to follow the sliding operation as illustrated in FIG. 30 and FIG. 31. The information window is an information window indicative of the function information "USB".

More specifically, a satellite icon 1104' having the same shape as that of the job icon 1104 is displayed in parallel to the job icon 1104 as a pair so as to follow the sliding operation, and the information window 1201 is displayed between the two icons 1104 and 1104'.

At this time, in case where a job icon indicative of the presence of a subsequent printing job exists on the right side of the job icon 1104, the subsequent job icon horizontally moves to the right side of the screen.

In the sliding operation, a size of a space between the two icons 1104 and 1104' which space serves as a display region of the information window 1201 changes according to an amount of the operation. Thus, also a display size of the information window 1201 is adjusted so as to be horizontally increased or decreased so that the display size corresponds to the region.

Herein, in moving the satellite icon 1104', it is preferable that a maximum display size of the information window 1201 is set and the movement of the satellite icon 1104' is restricted at a position which allows for display corresponding to the maximum display size.

The maximum size of the information window 1201 may be fixed, but in case where the number of displayed job icons is large or in a similar case, all the job icons cannot be displayed when the information window 1201 is opened with its maximum size. Thus, in such case, the maximum size may be made smaller. Adversely, the maximum size may be fixed and a job icon interval may be made narrower.

Figure 32:
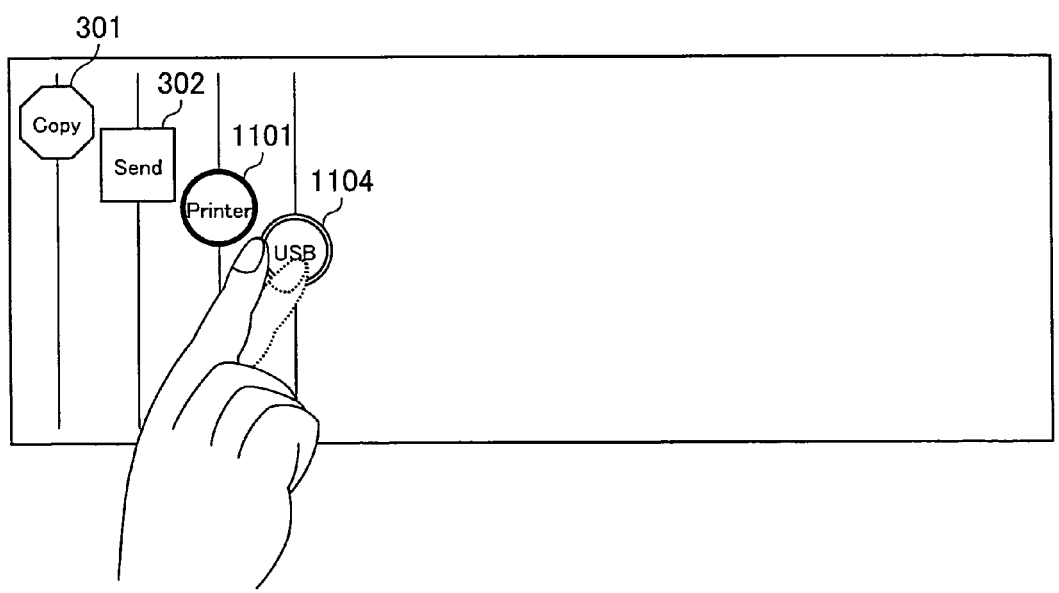
FIG. 32 is a drawing illustrating an information display function of the display control section of the multifunctional device.
Figure 33:
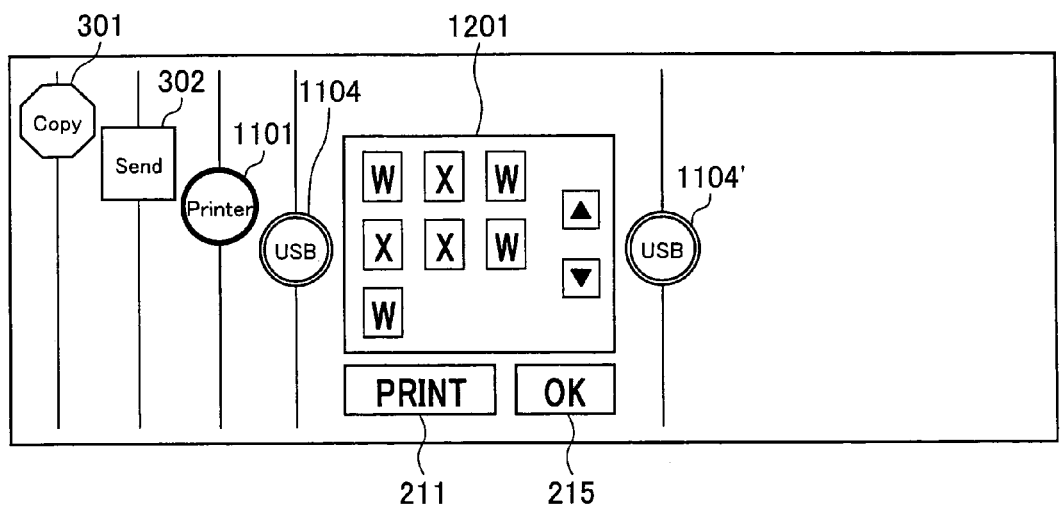
FIG. 33 is a drawing illustrating an information display function of the display control section of the multifunctional device.

Further, as illustrated in FIG. 32, the information window 1201 is displayed also by carrying out the touching operation with respect to the job icon 1104. In the case of the touching operation, as illustrated in FIG. 33, an information window having a predetermined size which facilitates confirmation of a content thereof is displayed at the same time as the operation. Also in this case, the information window 1201 is displayed between the operated job icon 1104 and the satellite icon 1104' having the same shape as that of the job icon 1104.

The displayed information window 1201 is deleted by carrying out the touching operation with respect to any one of the icons 1104 and 1104' positioned at both sides of the information window 1201. With the deletion of the information window, also the second job icon 1104' is deleted.

Further, a sliding operation is carried out so that the satellite icon 1104' overlaps the original job icon 1104, thereby deleting the information window 1201. In this case, the information window 1201 becomes smaller corresponding to an amount of the sliding operation and gradually disappears.

Further, even if the operation for deleting the information window 1201 is not carried out, the information window 1201 is deleted when a predetermined time period passes after the information window 1201 is displayed. Further, the information window is automatically deleted also in case where a processing of a job concerning the displayed information window is completed.

At the same time as deletion of the information window or subsequently to the deletion of the information window, other job icon having been displayed on the right side of the screen in order to secure the display region of the information window 1201 moves to the left side of the screen and is displayed at its original position.

Figure 34:
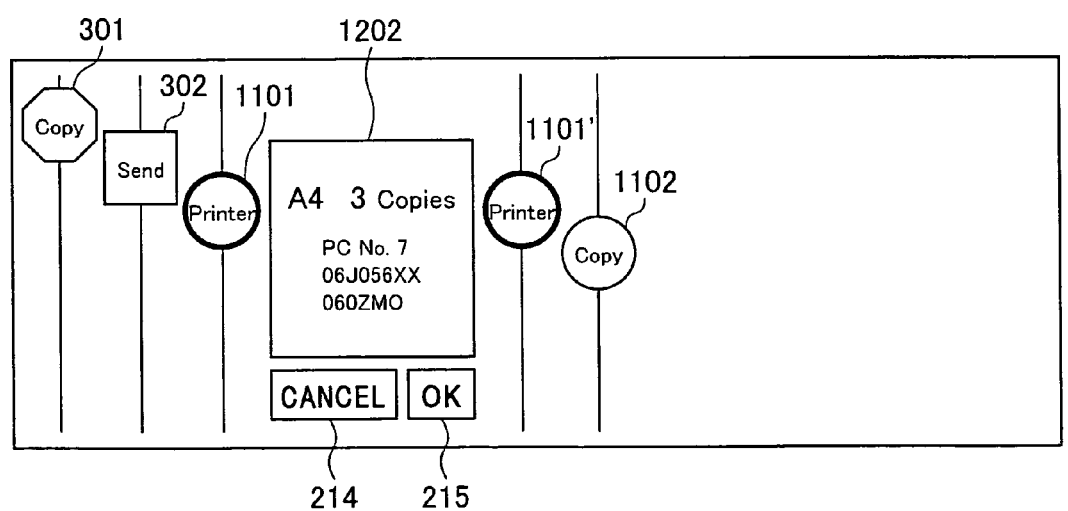
FIG. 34 is a drawing illustrating an information display function of the display control section of the multifunctional device.
Figure 35:
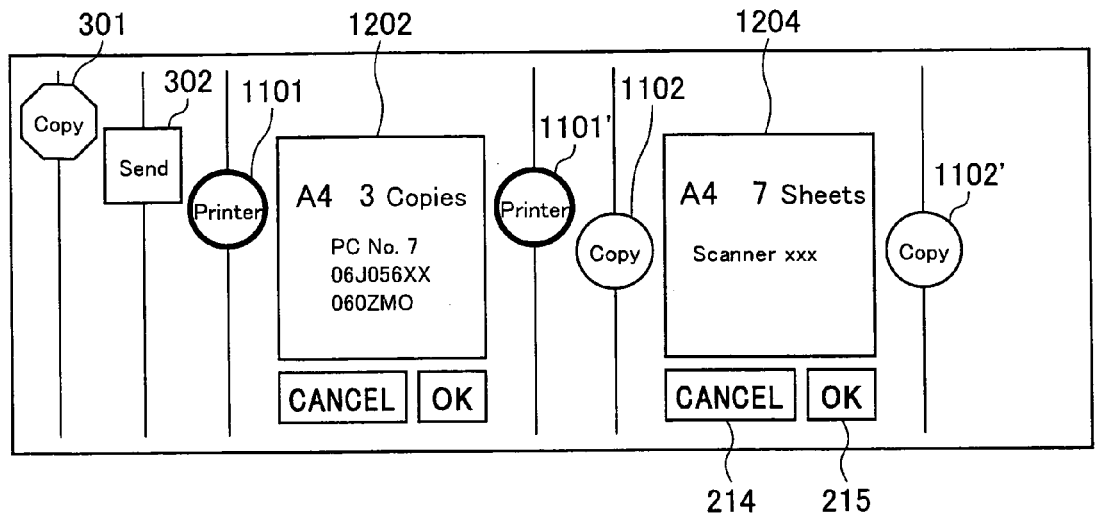
FIG. 35 is a drawing illustrating an information display function of the display control section of the multifunctional device.

In case where a plurality of job icons are operated, information windows concerning the operated job icons are displayed in parallel. As illustrated in FIG. 34 for example, if a job icon 1102 indicative of "Copy" is operated with an information window 1202 displayed, a new information window 1204 is additionally displayed as illustrated in FIG. 35.

Herein, the information window whose reference numeral is 1202 is an information window indicative of function information "Printer" which information window is displayed by operating the job icon 1101 indicative of "Printer". Further, an information window whose reference numeral is 1204 is an information window indicative of function information "Copy" which information window is displayed by operating the job icon 1102 indicative of "Copy".

If the display size is changed by carrying out the sliding operation with respect to a job icon concerning any information window with plural information windows displayed in this manner, a display size of other information window accordingly changes.

Figure 37:
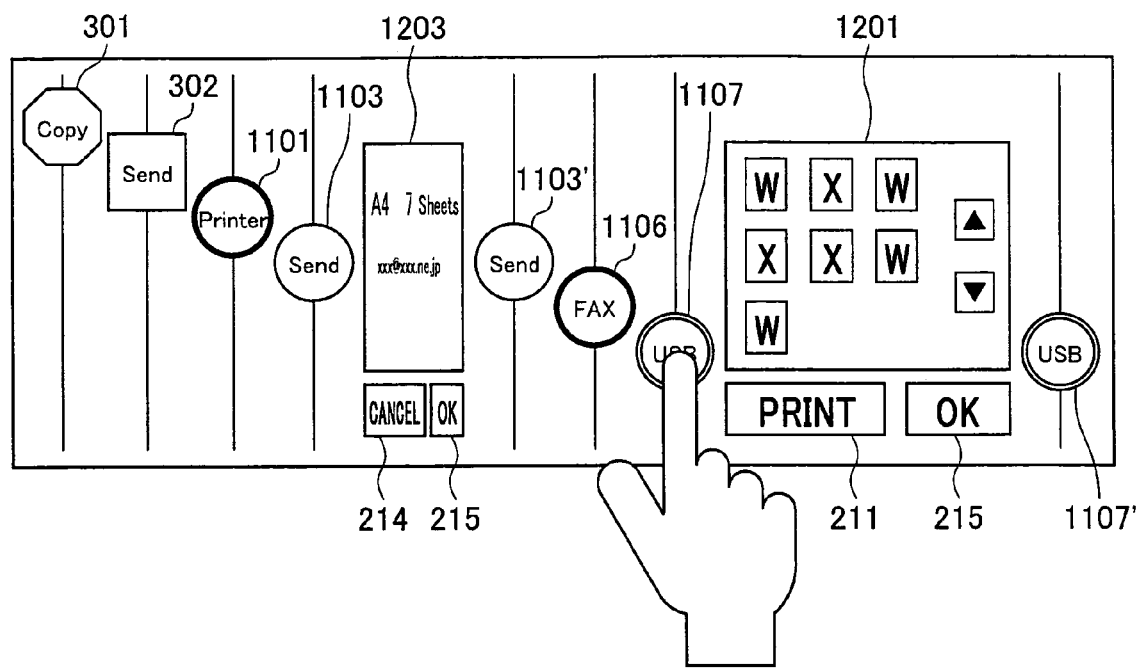
FIG. 37 is a drawing illustrating an information display function of the display control section of the multifunctional device.

This is illustrated in each of FIG. 36 and FIG. 37. FIG. 36 illustrates a state in which a plurality of information windows 1203 and 1201 are disposed. Herein, the information window whose reference numeral is 1203 is an information window indicative of function information "Send" which information window is displayed by operating a job icon 1103 indicative of the presence of a sending job, indicated as "Send", which internally occurs in the apparatus.

If a sliding operation is carried out with respect to a job icon 1107 indicative of "USB" under the condition illustrated in FIG. 36, the display region of the information window 1201 concerning the job icon 1107 becomes wider and the display size of the information window 1201 becomes larger, and the display region of the information window 1203 becomes narrower and the display size of the information window 1203 becomes smaller.

The information window 1203 becomes smaller to a predetermined minimum size, and also the job icon 1104 can be slid toward the left side until the size of the information window 1203 becomes minimum.

Next, an information window having been predetermined according to function information of a printing job is described as follows.

As illustrated in FIG. 33 (FIG. 31), information sets indicative of file names "W1, W2, . . . , X1, X2, . . . " of all files stored in the connected USB memory 150 are displayed in the information window 1201 concerning the job indicative of the function information "USB". Further, direction keys 210, a print key 211, an OK key 215, and the like are displayed therein.

Each of the direction keys 210 is used in selecting a file. The key 210 is operated so as to select one from the "W1, W2, . . . , X1, X2, . . . ". The print key 211 is used to specify a printing process. If the print key 211 is operated with a certain file selected, a printing instruction is inputted. The OK key 215 is used to input completion of the selection. The OK key 215 is operated subsequently to the operation of the print key 211 so as to validate the printing instruction.

In case of giving an instruction to carry out printing processes with respect to plural files, file selection using the direction keys and subsequent operations of the print key 211 and the OK key 251 are repeated so as to correspond to the number of the selected files.

Further, as illustrated in FIG. 35, (i) recording sheet size information "A4", (ii) copy number information "three copies", (iii) image data sending end information "PC No. 7", (iv) image data file name information "06J056XX", (v) user name information "060ZMO", and the like, all of which are specified in the printing job, are displayed in the information window 1202 concerning the job indicated by the function information "Printer".

Further, also a cancel key 214 and an OK key 215 are displayed in the information window 1202. The cancel key 214 is a key used to cancel the printing process carried out as the job in the image forming section 6. Further, the OK key 215 is a key used to finish inputting the instruction via the information window 202. In case of the information window 204, the OK key 215 is operated after operating the cancel key 214, so that the cancellation instruction is validated.

Further, (i) recording sheet size information "A4", (ii) copy number information "3 copies", (iii) image data sending end information "Scanner XXX" indicative of a scanner constituting the image scanning section 2, and the like, all of which are specified in the printing job, are displayed in the information window 24 concerning the job indicated by the function information "Copy".

Further, as illustrated in FIG. 36, not only the cancel key 214 and the OK key 215 but also (i) recording sheet size information "A4", (ii) sheet number information "3 sheets", (iii) image data sending end information "Scanner XXX" indicative of a scanner constituting the image scanning section 2, (iv) sending end telephone number information "06-63XXX", and the like, all of which are specified in the printing job, are displayed in the information window 1203 concerning the printing job which is internally generated in the apparatus and is indicated by the function information "Send".

Figure 39:
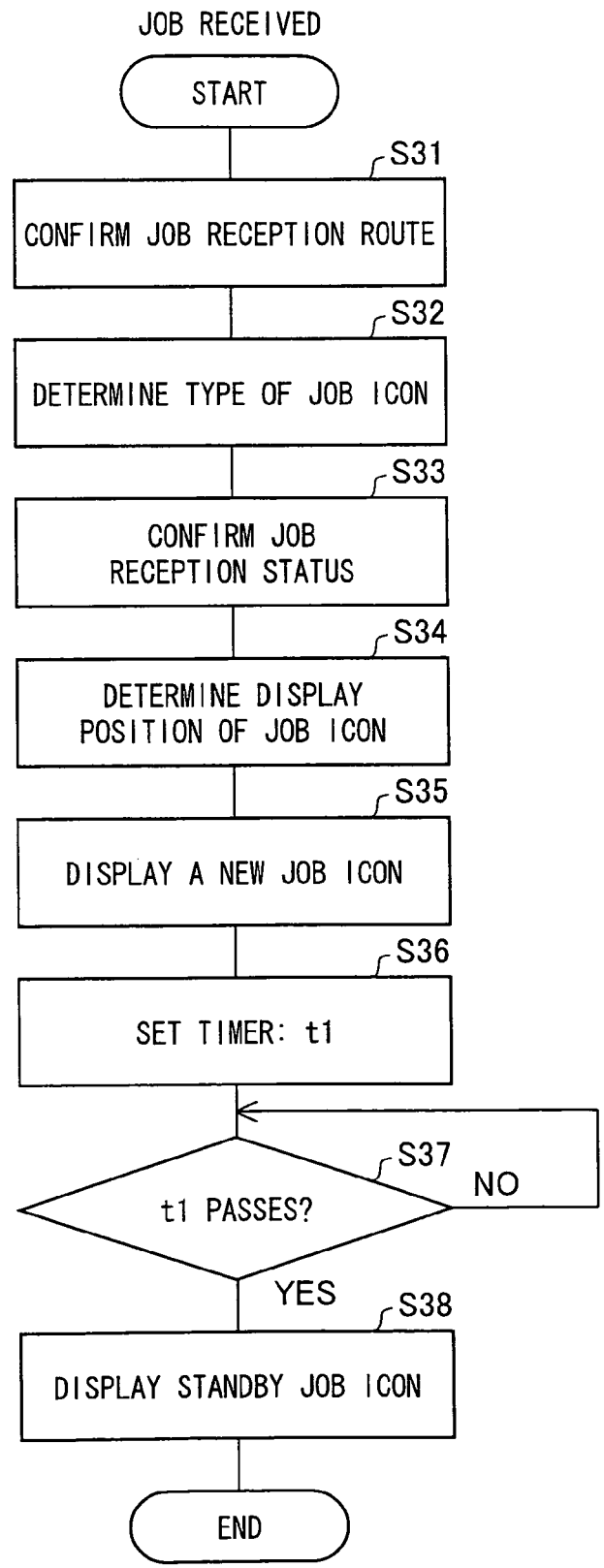
FIG. 39 is a flowchart illustrating a procedure in which a display control section of the multifunctional device displays a job icon indicative of new reception for a certain period in case where a job is newly received.

Next, with reference to the flowchart of FIG. 39, the following describes a procedure in which a job icon is displayed as a newly received job only for a predetermined period in case of newly receiving the job.

The job receiving section 131 receives job data as a job to be processed and the newly received job is stored in the job management section 132, so that the job detection section 134 detects reception of the new job. Upon detecting the reception of the new job, the job detection section 134 informs the touch panel control section 136 of this. While, the job management section 132 confirms a job reception route through which the job has been newly received (S31) so as to allocate function information.

With reference to the job management section 132, the touch panel control section 136 obtains the function information allocated to the newly received job and determines a job icon having a shape (type) based on the function information (S32).

Next, with reference to the job management section 132, the touch panel control section 136 confirms a job reception status (S33) and determines a display position of the job icon concerning the newly received job (S34).

When the type of the job icon to be displayed is determined in this manner, the touch panel control section 136 displays the job icon as a newly received job (S35) and subsequently sets a timer (S36). Thereafter, when a predetermined time period t1 passes (S37), the display manner of the job icon is changed to a normal display manner indicative of a standby state (S38).

Figure 40:
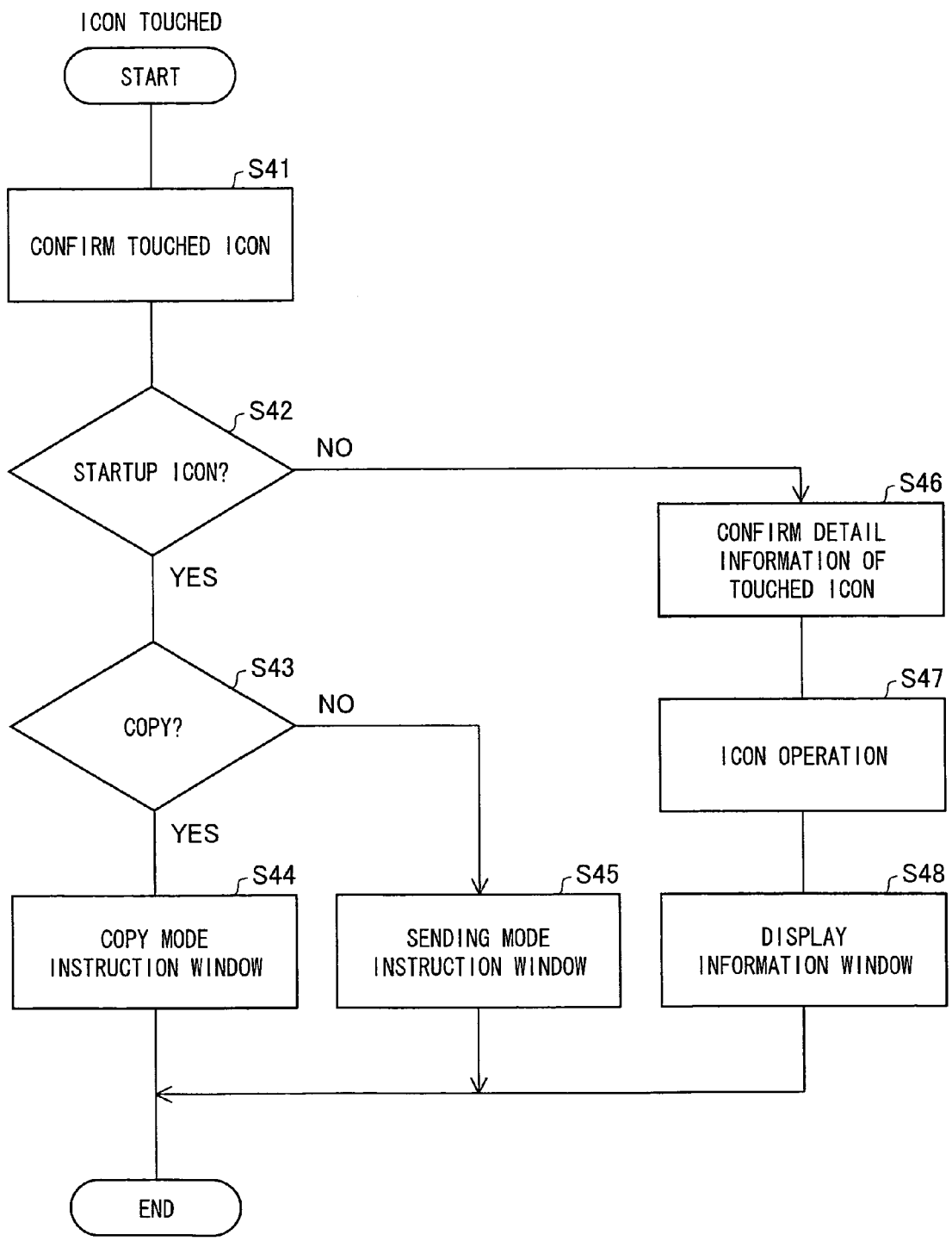
FIG. 40 is a flowchart illustrating a procedure in which the display control section of the multifunctional device displays an instruction window and an information window.

With reference to the flowchart of FIG. 40, the following explains a procedure in which a copy-mode instruction window 401, a sending-mode instruction window 402, and an information window are displayed.

If the operation detection section 138 detects that displayed icons are operated with startup icons 301 and 302 displayed in the touch panel 114c, the operation detection section 138 specifies the pushed icons and informs the touch panel control section 136 of the specified icon (S41). The touch panel control section 136 determines whether the operated icons are the startup icons 301 and 302 or not (S42). If it is determined that the operated icons are the startup icons 301 and 302, the touch panel control section 136 subsequently determines whether each of the icons is a copy-mode startup icon 301 or not (S43). Further, if it is determined that the icon is the copy-mode startup icon 301, the touch panel control section 136 displays a copy-mode instruction window 401 (S44). While, in case where it is determined that the icon is not the copy-mode icon 301, the sending-mode instruction window 402 is displayed (S45).

While, in case where it is determined that the operated icons are not the startup icons 301 and 302 in S42, the operated icons are job icons, so that the touch panel control section 136 confirms detail information of the job icon, having been pushed, with reference to the job management section 132 (S46). The operation detection section 138 subsequently detects whether an operation having been carried out is a sliding operation or a touching operation and sends the detection result to the touch panel control section 136 (S47). The touch panel control section 136 displays an information window of the operated job icon in accordance with the operation so as to provide detail information (S48).

As described above, the multifunctional device 100 of the present embodiment is arranged so that: a basic window for inputting an instruction concerning a job which can be internally generated in the apparatus is not displayed, and the image data generation section 20 is activated so as to cause the touch panel 114c to display a copy-mode job icon, startup icons 301 and 302 each of which allows generation of a sending-mode job, and job icons 1101 to 1107 each of which is indicative of the presence of a received job in case where the job receiving section 131 receives the job.

Thus, the user can find an image data processing function (processing mode), which can be used in the image data processing apparatus, through the displayed startup icons 301 and 302, and the user can find information of a job, which has been received by the apparatus and should be processed, by confirming the job icon.

As a result, the displaying ability of the limited display window of the operation section 114 is utilized to the maximum unlike the conventional apparatus in which a basic window concerning a job which can be internally generated in the apparatus is always displayed, so that more information concerning the job can be displayed without confusing the user.

Further, an operation carried out with respect to the startup icons 301 and 302 causes instruction windows 401 and 402 to be additionally displayed, so that it is possible to display the instruction windows 401 and 402 without confusing the used even though the basic window is not always displayed. Moreover, the instruction windows 401 and 402 are additionally displayed and do not transit to other window, so that the user can keep on operating without any confusion even when the instruction windows 401 and 402 are displayed.

Particularly in a digital multifunctional device having a plurality of modes, an instruction window whose processing mode is selected as a main mode is displayed in a basic window. Thus, in case where other processing mode different from the main mode is used, it is necessary to display an instruction window of a desired processing mode after deleting the displayed instruction window, so that the user who is not familiar with the operation is confused. However, according to the foregoing arrangement, only the instruction window of the desired mode is displayed, so that the user is free from the foregoing confusion.

As described above, an image data processing apparatus of the second present invention is arranged so that: a job receiving section communicates with an external device and receives image data and control data for carrying out a job processing with respect to the image data so as to receive a job, and an image data generation section generates image data, and a control data generation section generates control data for carrying out a job processing with respect to the image data so as to generate a job in the image data processing apparatus, and a job processing section executes the job received from the external device and the job generated in the image data processing apparatus, said image data processing apparatus comprising: a display input section for displaying information in a screen and for allowing the screen to be operated so as to input an instruction; and a display control section for causing the screen of the display input section to display one or more startup icons each of which activates the image data generation section and one or more job icons each of which is indicative of a presence of the job having been received by the job receiving section.

As a result, unlike a conventional image data processing apparatus arranged so that the basic window concerning the job which can be generated in the apparatus is always displayed, the display ability of the limited display area of the operation panel is maximized, so that it is possible to exhibit such an effect that much information concerning the job can be displayed without causing the user to be confused.

Further, it is possible to arrange the image data processing apparatus of the present invention so that: the display control section causes the startup icon to be always displayed, and the display control section causes additional display of an instruction window for causing the control data generation section to generate the control data and the image data generation section to generate the image data when the startup icon is operated.

According to the arrangement, the instruction window conventionally displayed in the basic window of the conventional apparatus is additionally displayed by operating the startup icon, so that the user can display the instruction window without any confusion even though the basic window is not always displayed. Moreover, the instruction window is additionally displayed and does not transit to another window, so that the user can keep on operating even when the instruction window is displayed.

Further, it is possible to arrange the image data processing apparatus of the present invention so that: when the job icon is operated, the display control section additionally displays an information window disclosing information concerning the job corresponding to the job icon having been operated.

According to the arrangement, when the job icon is operated, the information window disclosing information concerning the job corresponding to the operated job icon is additionally displayed without being switched to another window. Thus, the user can confirm detail information of the job in the screen displaying the job icon without transiting to another window.

Further, it is possible to arrange the image data processing apparatus of the present invention so that the display control section displays the instruction window when the startup icon is touched. The instruction window is conventionally displayed in the basic window of the conventional apparatus, so that it is better in view of the operability to touch the startup icon so that the instruction window is quickly displayed than to slide the startup icon so that the instruction window is gradually displayed.

Further, it is possible to arrange the image data processing apparatus of the present invention so that the display control section displays a job icon indicative of a presence of the job having been generated in the image data processing apparatus.

Not only the job icon corresponding to the job received from the external device but also the job icon corresponding to the job generated in the apparatus are displayed, so that information of the received jobs can be displayed more accurately.

Further, it is preferable to arrange the image data processing apparatus so that the display control section displays the startup icon and the job icon so that the startup icon and the job icon do not overlap each other.

As a result, the user can instantly and clearly find information of a processing mode usable in the apparatus and information of the number of jobs to be processed or similar information merely by watching the screen displaying these icons. Further, also in case of operating the icons or a similar case, the user can surely operate an icon which should be operated.

Further, it is possible to arrange the image data processing apparatus of the present invention so that the display control section displays the startup icon and the job icon so that the startup icon and the job icon are disposed along a diagonal line of the screen and displays the job icons in an order corresponding to an order in which jobs are received.

The startup icon and the job icon are displayed so as to be disposed along a diagonal line of the screen, so that it is possible to smoothly display the instruction window or the information window. Further, the job icons are displayed in an order corresponding to an order in which jobs are received, so that with reference to the arrangement of the job icons, the user can instantly and clearly find the order, in which jobs are received, merely by watching the screen displaying the icons.

It is possible to arrange the image data processing apparatus of the present invention so that the display control section causes a display manner of the job icon corresponding to the job having been received from the external device to be different from a display manner of the job icon corresponding to the job generated in the image data processing apparatus.

As a result, the user can easily find whether the job being received is a job received from the outside or a job generated in the apparatus merely by watching the screen displaying the icons.

It is possible to arrange the image data processing apparatus of the present invention so that: the job receiving section includes a plurality of job data receiving routes, and the display control section displays a job icon corresponding to each of the job data receiving routes.

It is possible to allocate a job function in accordance with the job receiving route. Thus, when a shape or the like of the icon is varied in accordance with the receiving route, the user can instantly and clearly find a function of the received job merely by watching the screen displaying the icons.

It is preferable to arrange the image data processing apparatus of the present invention so that the display control section displays the instruction window or the information window in a vicinity of the startup icon having been operated or the job icon having been operated.

As a result, unlike such an arrangement that the instruction window or the information window is displayed separately from the operated icon, the user can easily find a relation between the icon and the window.

Further, in displaying the window in the vicinity of the operated icon, the display control section displays an icon having the same shape as the startup icon having been operated or the job icon having been operated and displays the instruction window or the information window between these two icons. This makes it further easier to find the relation between the icon and the window.

Further, compared with such an arrangement that the startup icon or the job icon corresponding to a job being received are positioned behind the displayed information window, it is preferable to arrange the image data processing apparatus of the present invention so that: in case of displaying the instruction window or the information window, the display control section displays the instruction window or the information window and moves the startup icons or the job icons, being displayed, to a periphery of the instruction window with a positional relation of the startup icons kept.

Further, it is possible to arrange the image data processing apparatus of the present invention so as to serve as a digital multifunctional device which comprises as the image data generation section a document scanning section for scanning a document so as to generate the image data, said digital multifunctional device further comprising as the job processing section an image recording section for recording the image data onto a recording material and an image data sending section for communicating with the external device so as to send the image data to the external device, wherein the digital multifunctional device is capable of executing at least a copy mode, a facsimile mode, and a printer mode.

Further, it is preferable to arrange the multifunctional device so that the display control section displays a startup icon corresponding to a processing operation (processing mode) of the job processing section.

That is, in a conventional digital multifunctional device having a plurality of processing modes, an instruction window of a processing mode selected as a main mode is displayed in a basic window. Thus, in case where another processing mode different from the main mode is used in the conventional device, it is necessary to delete the displayed instruction window and to display an instruction window of a desired processing mode, so that the user who is not familiar with the operation is confused.

In contrast, according to the aforementioned arrangement, it is possible to display a desired instruction window by operating a startup icon of a desired processing mode, so that the operability is further improved.

(Embodiment According to a Third Present Invention)
[Embodiment 1]

With reference to FIG. 41 to FIG. 44, the following description explains an embodiment of the third present invention.

Note that, an entire arrangement of a digital multifunctional device (image forming apparatus) 200 of the present embodiment is substantially the same as that of the digital multifunctional device 100 of the embodiment according to the second present invention which has been described with reference to FIG. 19. Thus, descriptions of the digital multifunctional device 200 are omitted, and explanations are given by using the same reference numerals as necessary.

Hereinafter, an information display function which is a notable feature of the present multifunctional device 200 is described as follows. The present multifunctional device 200 detects its status, and in case where it is detected that the multifunctional device 200 is in a status where it should report an information concerning its status to the user, an icon corresponding to the status is displayed in a touch panel 114c. Further, when the touch panel 114c is operated with the status icon displayed, an information window concerning the detected status is additionally displayed.

Figure 41:
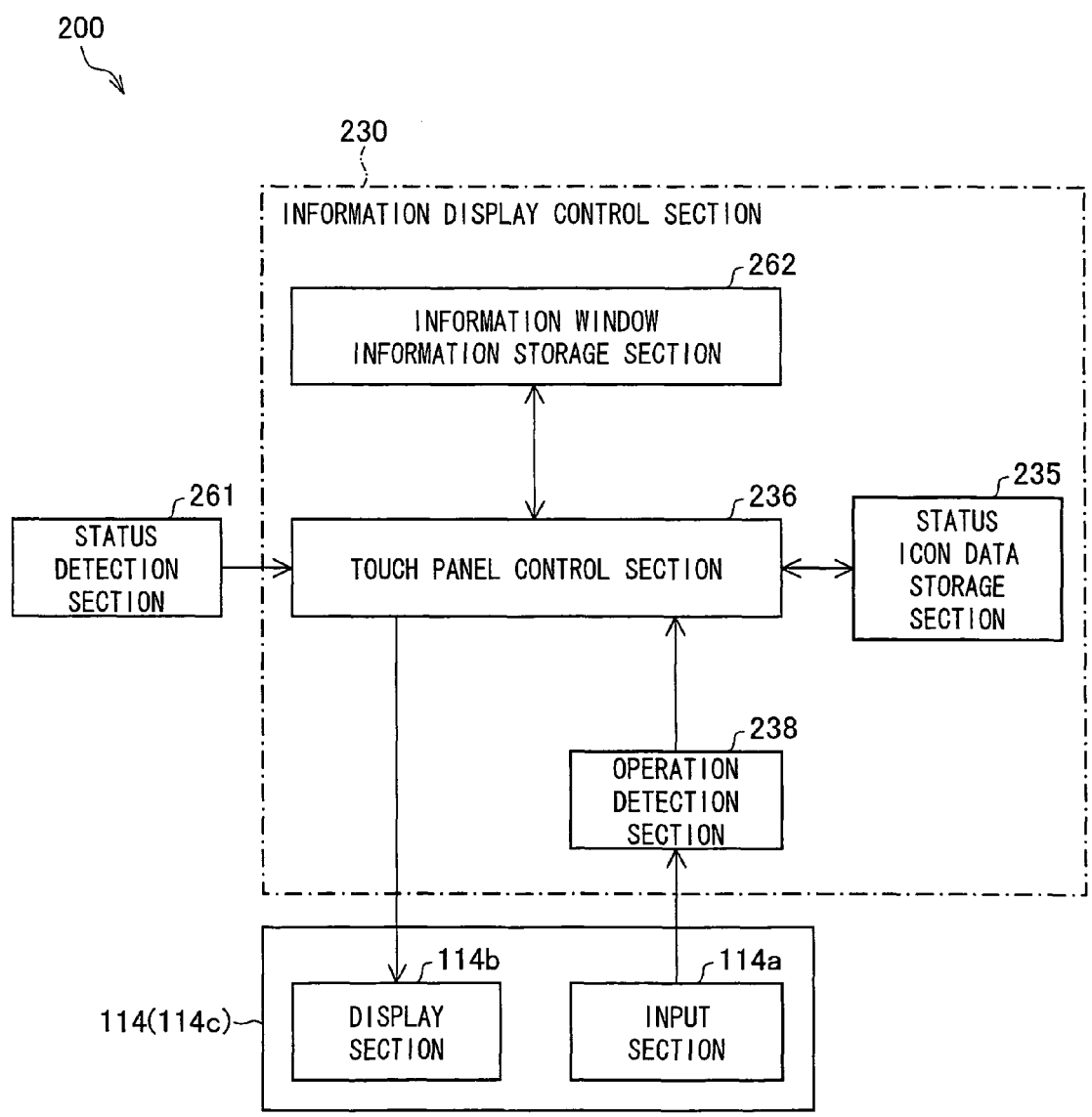
FIG. 41, showing an embodiment of the third present invention, is a functional block diagram illustrating essential portions for realizing an information display function of a multifunctional device.
Figure 42:
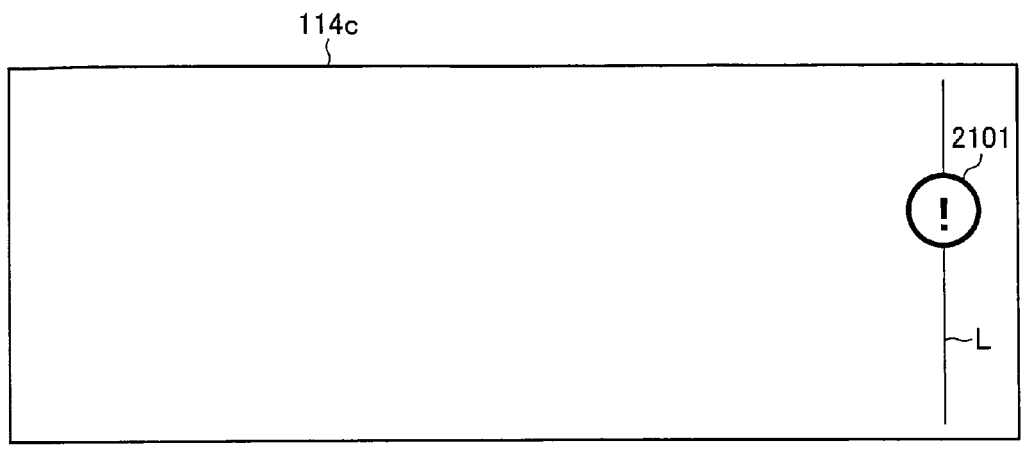
FIGS. 42(a) to 42(c) are drawings each of which illustrates an information display function of a display control section of the multifunctional device as an embodiment of the third present invention.
Figure 42:
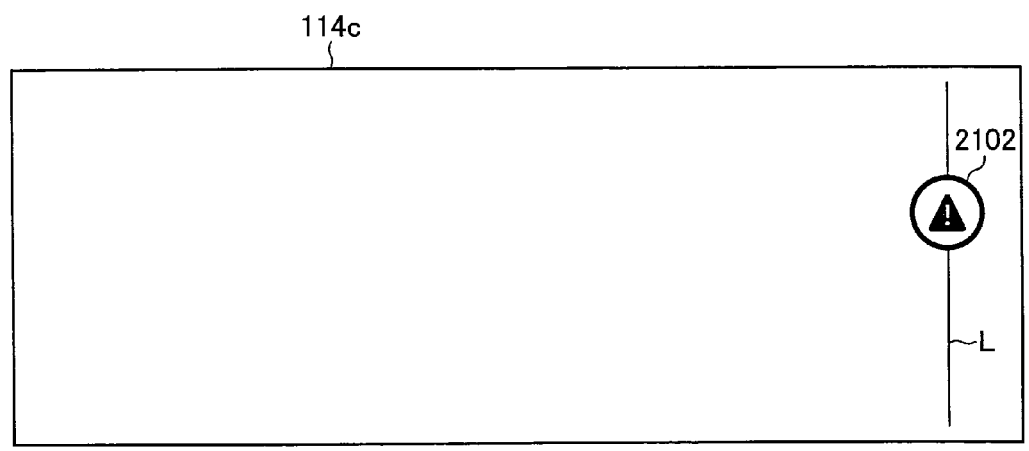
Figure 42:
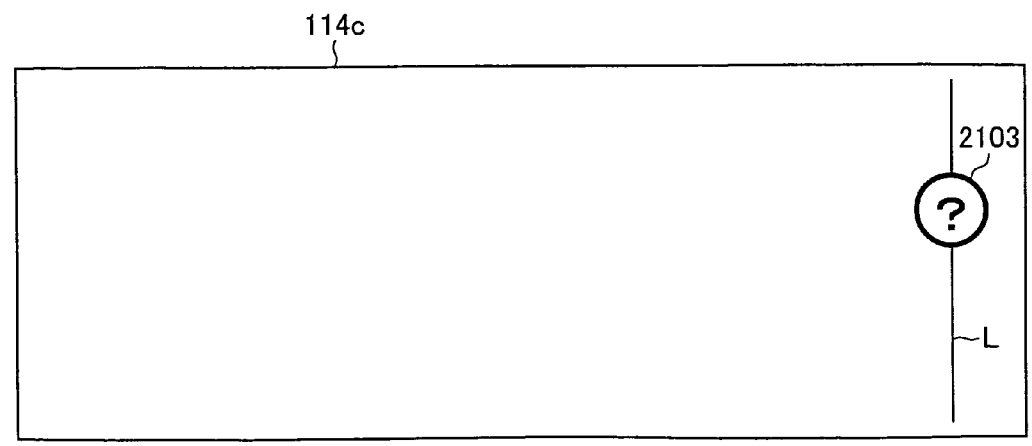
Figure 43:
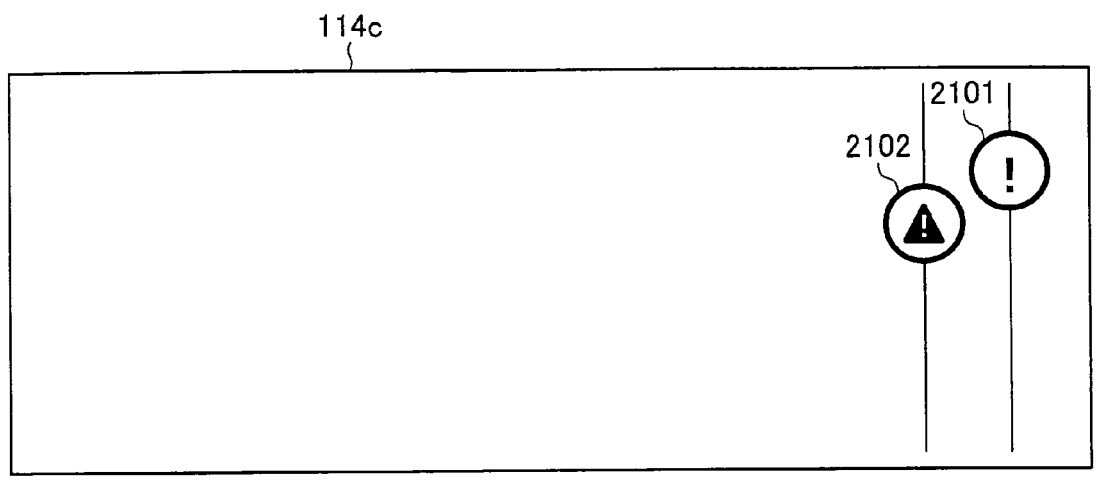
FIGS. 43(a) and 43(b) are drawings each of which illustrates an information display function of a display control section of the multifunctional device as an embodiment of the third present invention.
Figure 43:
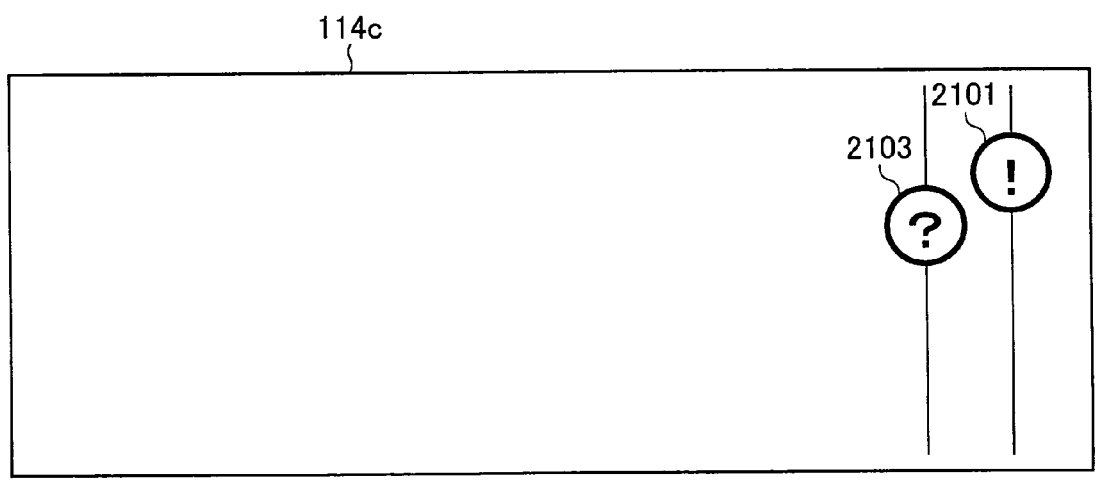

The information display function is realized by an operation section 114, a status detection section 261, and an information display control section (display control section) 230 which are illustrated in FIG. 41. FIG. 41 is a functional block diagram illustrating essential portions for realizing the information display function of the present multifunctional device 200.

The status detection section 261 detects that the multifunctional device 200 is in a status where it should report an information concerning its status to the user.

Examples of the status which should be informed to the user include: a status in which toner scarcely remains or completely runs out; a status in which recording materials stored in a recording material cassette scarcely remain or completely run out; a status in which jam of the recording materials occurs; a status in which the apparatus is out of order; and a similar status. Each of them shows that the multifunctional device 200 is in a status where it should report an information concerning its status to the user as attention or warning.

Further, the status detection section 261 also detects that the multifunctional device 200 is in a status where it should report an information concerning its status to the user as an advice or help. Examples thereof include: a case where a cover is not opened even when a predetermined time period passes after occurrence of jam; a case where the jam is not solved; and a similar case. Further, another example is a case where a start key is not pushed even when a predetermined time period passes with keys operated by the user at the time of normal operation.

When the status detection section 261 detects that the device is in such status, the information display control section 230 causes the touch panel 114c to display a status icon indicating that the status is detected by the status detection section 261, and in case where the screen is operated with the status icon displayed, the information display control section 230 causes the touch panel 114c to additionally display an information window disclosing information concerning the device status indicated by the displayed status icon. The information display control section 230 includes a management section 124 and a device control section 118.

The information display control section 230 includes a touch panel control section 236, a status icon data storage section 235, and an operation detection section 238.

The touch panel control section 236 controls a display section 4b so as to display the status icon indicating that the status detection section 261 detects that the device is in the status which should be informed to the user. In accordance with the detected status, the touch panel control section 236 extracts a status icon, which should be displayed, from the status icon data storage section 235 so as to display the status icon in the touch panel 114c. In the status icon data storage section 235, shape data of various status icons displayed in the touch panel 114c are stored.

Each of FIG. 42(a) to FIG. 42(c) illustrates an example where the status icon is displayed. In FIG. 42(a), a status icon whose reference numeral is 2101 and which has a circled shape indicative of "!" (exclamation mark) is an attention mark which calls attention to the user. The attention icon is displayed, for example, in case where an amount of remaining toner of specific color is small or in case where no recording sheet remains in a specific feeding cassette. In this manner, the attention icon indicates a status which can be easily treated by the user.

Further, FIG. 42(b) shows a status icon whose reference numeral is 2102 and which has a circled shape showing therein a triangle indicative of a white-colored "!" mark therein. This status icon is a warning icon which indicates a device status which requires treatment carried out by an administrator or person familiar with the device, e.g., a status which requires serviceman call, for example, a status in which toner runs out, a status in which the recording sheets are jammed, and a similar status.

FIG. 42(c) shows a status icon whose reference numeral is 2103 and which has a circled shape indicative of "?" (question mark). This status icon is a help icon indicating that the device is in such a status that it is necessary to give the user an advice or help information. The help icon indicates a device status in which the device can inform the user of an operation procedure, for example, in case where a cover is not opened within a predetermined time period after occurrence of the jam or in case where the jam is not solved. Further, in case where the start key is not pushed even when a predetermined time period passes with keys operated by the user at the time of normal operation, it is presumed that the user is not familiar with the operation and hence has a trouble in the operation, and a content of the operation which is to be carried out by the user is presumed in accordance with the operated key, thereby displaying the presumed operation content as a help function. The foregoing status icon indicates that the device can show the help function.

In FIG. 42(a) to FIG. 42(c), only one status icon is shown as an example, but the number of status icons corresponds to the number of statuses detected by the status detection section 261.

Each of FIG. 43(a) and FIG. 43(b) illustrates an example where a plurality of status icons are displayed. FIG. 43(a) illustrates such a condition that a status which requires a warning icon to be displayed is detected by the status detection section 261 and the warning icon 2102 is additionally displayed with the window of FIG. 42(a) displayed. FIG. 43(b) illustrates such a condition that a status which requires a help icon to be displayed is detected by the status detection section 261 and a help icon 2103 is additionally displayed with the window of FIG. 42(a) displayed.

Further, there are line sections L each of which vertically extends in the screen from each of the status icons 2101 to 2103. The line sections L emphasize a manner in which the icons are disposed, thereby allowing the user to watch the screen more easily.

In case of displaying a plurality of status icons in the screen, the touch panel control section 236 displays the plurality of status icons along a diagonal line of the screen so that the icons do not overlap each other. This makes it possible for the user to easily find the current status of the multifunctional device 200 and makes it possible to prevent the user from operating also an unnecessary icon in operating the status icon.

Further, when the screen is operated with the status icon displayed in the touch panel 114c, the touch panel control section 236 additionally displays an information window concerning the displayed status icon. For example, in case where toner runs out, an information window 2201 illustrated in FIG. 44(a) is displayed so as to require the user to replenish toner. Further, in case where the recording sheets run out, an information window 2202 illustrated in FIG. 44(c) is displayed so as to require the user to replenish recording sheets.

In the present multifunctional device 200, an operation carried out with respect to the status icon causes the touch panel control section 236 to display the information window, concerning the status indicated by the operated status icon, in the vicinity of the operated status icon. Note that, hereinafter, "to display the information window" is sometimes expressed as "to open the information window", and "to cause the information window not to be displayed" is sometimes expressed as "to close the window".

The operation detection section 238 specifies an operated status icon in accordance with a signal inputted via the touch panel 114c, and the operation detection section 238 detects an operation manner so as to send the detection result to the touch panel control section 236. In the present multifunctional device 200, as the operation manner for displaying the information window, there are two types of manners: a sliding operation and a touching operation. The display data of the information window is stored in the information window data storage section 262.

As in an operation carried out with respect to a status icon (warning icon) 2102 in FIG. 44(a), the touching operation is such that the status icon 2102 is pushed and is released right after the pushing. Further, the sliding operation is such that the status icon 2101 is moved in parallel with its pushed as in an operation carried out with respect to the status icon 2101 (attention icon) in FIG. 44(c). In case of the sliding operation, also an operation trail is sent to the touch panel control section 236.

Further, in the present embodiment, the display manner of the newly displayed status icon is made different from those of the status icons having been already displayed, so that the user can easily recognize that the status icon is a newly displayed status icon.

It is preferable that: when a predetermined period passes, the display manner showing that the status has been newly detected is changed into a normal display manner showing that the status icon has already been displayed. As a result, it is possible to avoid such disadvantage that the status icon is kept displayed endlessly as a newly detected status icon.

In varying the display manner of the status icon, the status icon may be made to flicker, or may be reversed, or may be rotated. Further, a color of the status icon may be changed or the status icon itself or a surrounding of the status icon or a surrounding line of the status icon may be illuminated or these portions may be entirely illuminated as long as the display section 4b of the touch panel 114c allows color display.

Herein, how the information display control section 230 displays the information window is described as follows with reference to FIG. 44(a) to FIG. 44(c).

As described above, in the present multifunctional device 200, the status icon displayed in the screen is subjected to a touching operation or a sliding operation, so that the information window concerning a status indicated by the operated status icon is displayed.

As illustrated in FIG. 44(c), if the status icon (attention icon) 2101 is slid, an information window 2202 is displayed so as to follow the sliding operation. More specifically, a satellite icon 2101' having the same shape as that of the status icon 2101 is displayed in parallel to the status icon 2101 as a pair so as to follow the sliding operation, and the information window 2202 is displayed between the two icons 2101 and 2101'.

At this time, in case where a status icon 2102 which exists on the left side of the status icon 2101 is horizontally moved to the left side position of the screen.

In the sliding operation, a size of a space between the two icons 2101 and 2101' which space serves as a display region of the information window 2202 changes according to an amount of the operation. Thus, also a display size of the information window 2202 is adjusted so that the display size corresponds to the region.

In this case, the display size of the information window 2201 can be increased or decreased. However, in the present multifunctional device 200, as illustrated in FIG. 44(b), the entire display size of the information window 2201 is not changed, and a size of a visible area of the information window 2201 is changed in accordance with a space (distance in a horizontal direction) between the two icons 2102 and 2102'.

As a result, the user may be able to find the content of the information disclosed in the information window 2201 merely by watching a part of the information window 2201 through the sliding operation carried out with respect to the status icon 2102, so that the foregoing arrangement is convenient in this case.

Herein, in moving the satellite icon 2102', it is preferable that a maximum display size of the information window 2201 is set and the movement of the satellite icon 2102' is restricted at a position which allows for display corresponding to the maximum display size.

Further, as illustrated in FIG. 44(a), in the case of carrying out the touching operation with respect to the status icon 2102, the information window 2201 is displayed with a maximum size at the same time as the touching operation. Also in this case, the information window 2201 is displayed between the operated status icon 2202 and the satellite icon 2202' having the same shape as that of the status icon 2202.

The information window can be deleted by carrying out the touching operation with respect to any one of the icons positioned at both sides of the information window. For example, the information window 2201 displayed between the icons 2102 and 2102' illustrated in FIG. 44(a) can be deleted by carrying out the touching operation with respect to any one of the icons 2102 and 2102' positioned at both sides of the information window 2201.

Further, a sliding operation is carried out so that the satellite icon 2102' overlaps the original status icon 2102, thereby deleting the information window 2201. In this case, the information window 2201 becomes smaller corresponding to an amount of the sliding operation and gradually disappears.

Further, even if the operation for deleting the information windows 2201 and 2202 is not carried out, the information windows 2201 and 2202 can be deleted when a predetermined time period passes after the information windows 2201 and 2202 are displayed. Further, each information window is automatically deleted also in case where a device status concerning the displayed information window is improved.

Further, as in the status icon 2102 of FIG. 44(c) for example, the icons having been displayed on the right side of the screen are returned to their original positions at the same time as or subsequently to deletion of the information window 2202 in order to secure the display region of the information window 2202.

As described above, in the multifunctional device 200 of the present embodiment, when a status of the device is detected by the status detection section 261 and it is detected that the device is in a status where it should report an information concerning its status, the information display control section 230 causes the touch panel 114c to display a status icon indicating that the status has been detected by the status detection section 261, and the information display control section 230 causes the touch panel 114c to additionally display an information window for disclosing information concerning the status indicated by the displayed status icon when the screen is operated with the status icon displayed.

Thus, the display window of the status icon is set as a standby window or a window for executing a job for example, so that the user first finds that a trouble occurs or it is necessary to request for maintenance or any advice is given from the device by watching the displayed status icon.

Further, a shape (display manner) of the status icon is set according to the status such as attention, warning, or advice, so that it is possible to find importance or a content of the status indicated by the status icon merely by watching the status icon.

Further, by operating the status icon as necessary, it is possible to display the information window, thereby obtaining useful information such as a message or the like concerning the status indicated by the status icon. The information window is additionally displayed, and the information window does not transit to another window. Thus, even when the information window is displayed, the user can keep on operating without any confusion.

Further, in case where the device is in such a state that a status icon should be displayed though the screen is not set as a standby window or a window for carrying out a process, the window may transit to another window which displays the status icon.

Anyway, the basic window or the like is not displayed in the screen which displays the status icon, so that the user does not carry out an unnecessary operation without caring occurrence of a trouble and the like.

As a result, the user can easily find a device status such as a trouble, request for maintenance, indication of advice, by effectively using a limited display area of the operation panel.

[Embodiment 2]

Figure 45:
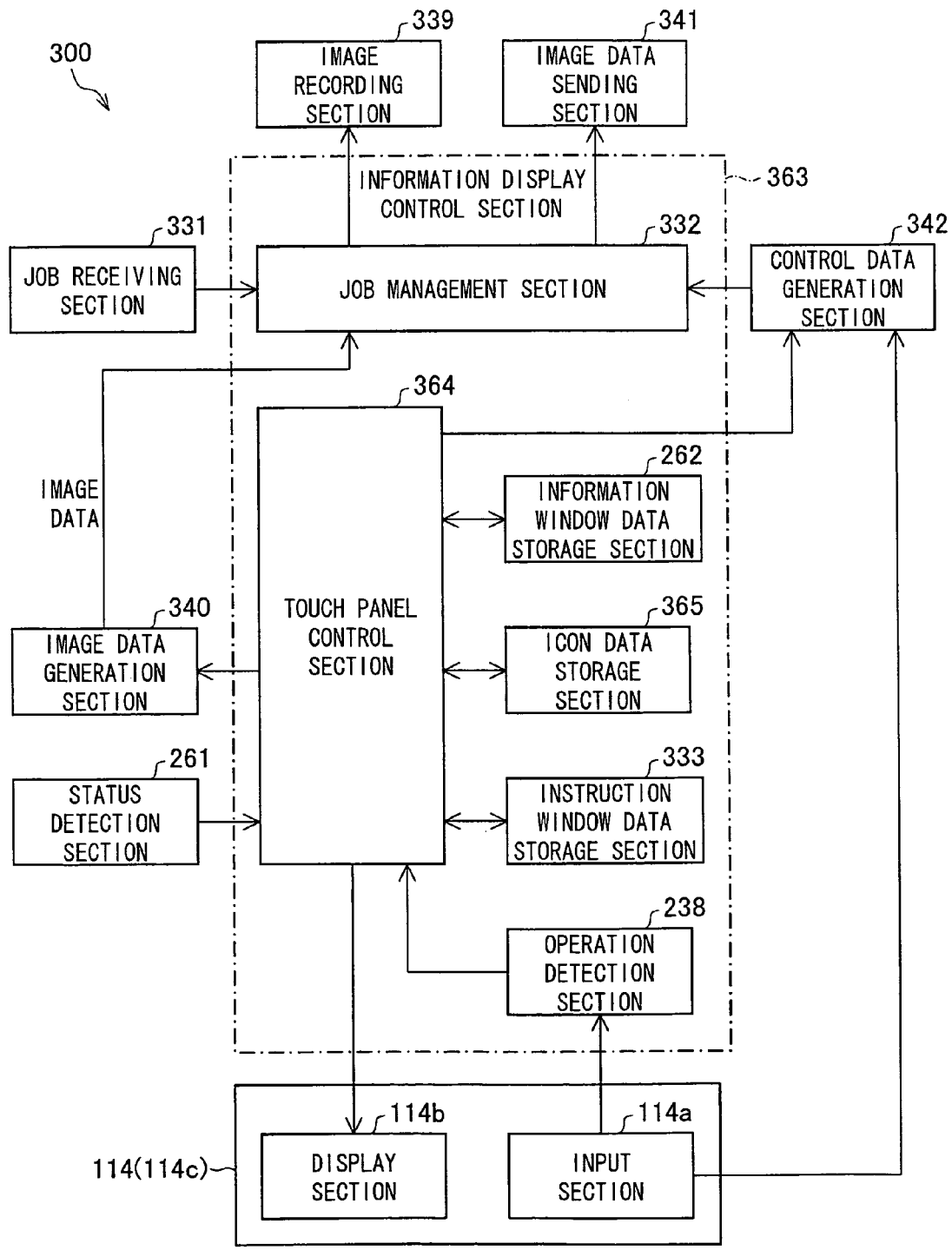
FIG. 45, showing another embodiment of the third present invention, is a functional block diagram illustrating essential portions for realizing an information display function of a multifunctional device.
Figure 46:
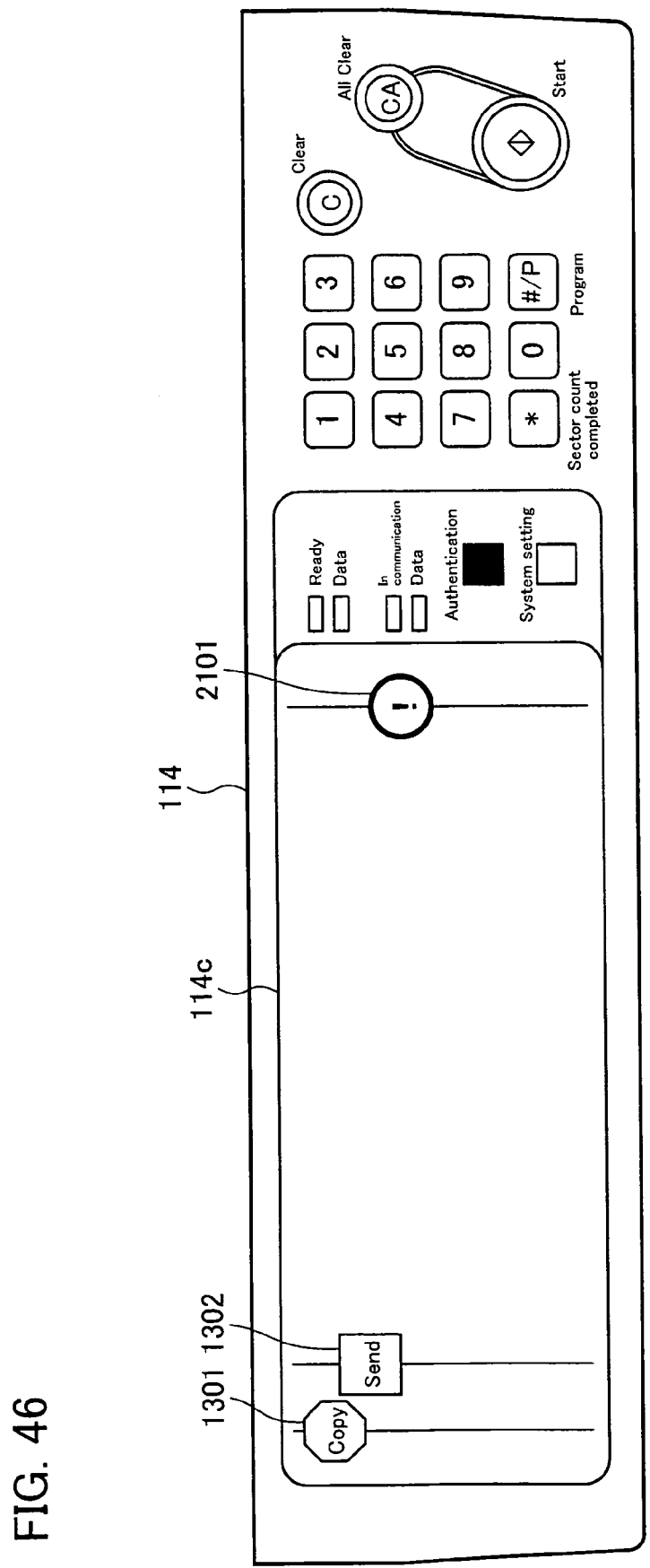
FIG. 46, showing another embodiment of the third present invention, is a drawing illustrating an operation panel provided on the multifunctional device.

With reference to FIG. 45 to FIG. 47, the following description explains another embodiment of the third present invention. Note that, for convenience in descriptions, the same reference numerals are given to members having the same functions as those of the members explained in Embodiment 1, and descriptions thereof are omitted.

In a multifunctional device 300 of the present embodiment, an instruction window which allows generation of a copy mode job and an instruction window which allows generation of a sending mode job are displayed in addition to the status icon window.

That is, in the present multifunctional device 300, the status icon display window in the touch panel 114c displays a startup icon for activating the image scanning section 2, and the displayed startup icon is operated, so that a startup icon instruction window is displayed.

Such a display function is realized by an operation section 114 and an information display control section 363 that are illustrated in FIG. 45.

In FIG. 45, a job receiving section 331 receives job data, sent from an external device, as a job to be processed. The job receiving section 331 includes: the communication section 110; the FAX modem 115; the communication interface 117; the device control section 118 controlling these sections; and the management section 124, all of which are illustrated in FIG. 19.

An image recording section (job processing section) 339 forms an image based on the image data onto a recording material and includes the image forming section 116, the device control section 118 for controlling these sections, and the management section 124.

An image data sending section (job processing section) 341 sends the image data in the sending mode of the facsimile mode and in the sending mode of the scanner mode. The image data sending section 341 includes the communication section 110, the FAX modem 115, and the communication interface 117 which are illustrated in FIG. 19.

An image data generation section 340 generates the image data in the device, and includes the image scanning section 2, the device control section 118 for controlling these sections, and the management section 124, all of which are illustrated in FIG. 19.

In response to an instruction given from the operation section 114, a control data generation section 342 generates control data for carrying out a job process with respect to the image data scanned by the image data generation section 340. In the copy mode, the control data generation section 342 generates control data for carrying out a printing process with respect to the image data. In the sending mode of the facsimile mode and the sending mode of the scanner mode, the control data generation section 342 generates control data for carrying out a sending process with respect to the image data.

The control data generation section 342 includes the device control section 118 and the management section 124 which are illustrated in FIG. 19. Note that, in FIG. 45, a signal input line from the touch panel control section 364 is used to transmit display information of a below-described instruction window displayed in the touch panel 114c. The control data is generated in accordance with a content of the instruction window. Further, an input signal line from the input section 114a is used to input an instruction given by operating any member other than the touch panel 114c, e.g., by operating a start key, a total cancel key, or the like. FIG. 46 is a plan view of the operation panel 114.

Further, a display control section 363 controls the touch panel 114c so as to display not only the aforementioned status icon and its information window but also a startup icon and its instruction window.

The information display control section 363 is different from the information display control section 230 of FIG. 41 in that: the information display control section 363 includes an instruction window data storage section 333 and a job management section 332 and also includes a touch panel control section 364 provided instead of the touch panel control section 236 and includes an icon data storage section 365 provided instead of the status icon data storage section 235.

The job management section 332 manages a process status of a job received by the job receiving section 331 from the outside and a process status of a job internally generated in the multifunctional device 300. Via the job receiving section 331, not only the job data having been received from the outside but also information indicative of a reception date or a reception route and similar information are inputted. Further, the image data having been scanned by the image scanning section 2 and the control data having been generated by the control data generation section 342 are inputted, and information indicative of a reception date (accrual date) and an input route or a similar information is inputted as job data of a job which occurs in the multifunctional device 300.

The job management section 332 manages a processing status so that jobs having been received from the outside and jobs which occurs in the multifunctional device 300 are processed in an order in which the jobs are inputted to the job management section 332.

Further, when an operation is carried out with respect to an instruction window with the instruction window displayed, the operation detection section 238 changes display information of the instruction window in accordance with a content of the operation. Note that, in operating the instruction window, the same function as in the conventional arrangement can be utilized.

The touch panel control section 364 is arranged in the same manner as the touch panel control section 236 in a function for displaying a status icon. As a new function, the touch panel control section 364 refers to the icon data storage section 365 and the instruction window data storage section 333 so as to cause the touch panel 114c to display a startup icon for activating the image data generation section 340 (image scanning section 2) and its instruction window. Note that, not only shape data of the status icon but also shape data of the startup icon are stored in the icon data storage section 365.

FIG. 46 illustrates an example where the startup icons are displayed. In FIG. 46, icons whose reference numerals are respectively 1301 and 1302 are startup icons, and an icon whose reference numeral is 2101 is a status icon. The startup icons 1301 and 1302 are displayed at the left side of the screen and the status icon is displayed at the right side of the screen.

Herein, the startup icon 1301 having a polygonal shape indicative of "Copy" shows that the present multifunctional device 300 has a copying function. Further, the startup icon 1302 having a square shape indicative of "Send" shows that the present multifunctional device 300 has a sending function for scanning image data so as to send the thus scanned image data.

These startup icons 1301 and 1302 are always displayed as long as the multifunctional device 300 is in a condition under which the copying function and the sending function can be executed. That is, in the multifunctional device 300, the touch panel 114c displays only the startup icons 1301 and 1302 in a standby state in which no job has been received.

When the user touches and operates the startup icon 1301 in the screen and the operation detection section 238 detects the operation, the touch panel control section 364 extracts display data from the instruction window information storage section 333 and causes an instruction window 1401 in the copy mode to be additionally displayed as illustrated in FIG. 47(a). In the instruction window data storage section 333, display data of the instruction window 1401 in the copy mode and display data of a below-described instruction window 1402 in a sending mode are stored.

The instruction window 1401 in the copy mode allows the user to input a detail instruction for carrying out a copy operation. In a conventional apparatus, the instruction window is generally displayed in a basic window in case where a copy mode is selected as a main mode. In the present embodiment, a satellite icon 1301' having the same shape as that of the operated startup icon 1301 is displayed in parallel to the startup icon 1301 as a pair, and the information window 1401 is displayed between the two icons 1301 and 1301'. At this time, in case where the startup icon 1302 positioned on the right side of the startup icon 1301 is horizontally moved, in a direction in which the instruction window 1401 is opened, with the arrangement of the icons kept.

When a start key of the operation section 114 illustrated in FIG. 46 is pushed with the instruction window 1401 in the copy mode displayed, the image data generation section 340 scans image data, and the control data generation section 342 generates control data, so that a printing job in the copy mode occurs. The printing job is sent to the job management section 332 so as to be newly managed.

The new job is stored in the job management section 332, so that the touch panel control section 364 deletes the instruction window 1401 and the satellite icon 301'.

Figure 47B:
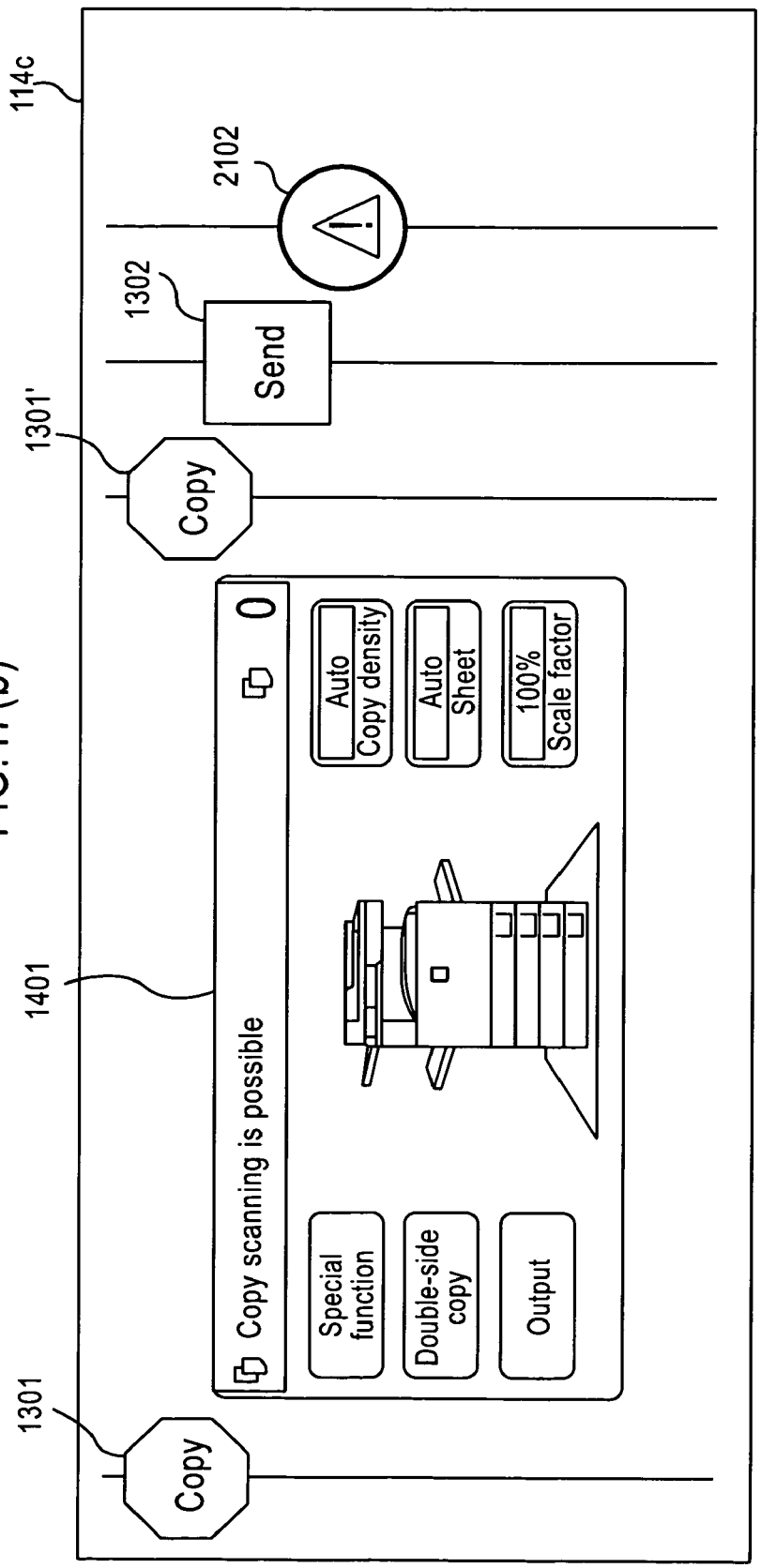

Note that, each of FIG. 47(b) and FIG. 47(c) illustrates a combination of startup icons 301 and 302, an instruction window 401 in a copy mode, and status icons 2102 and 2103.

Figure 48:
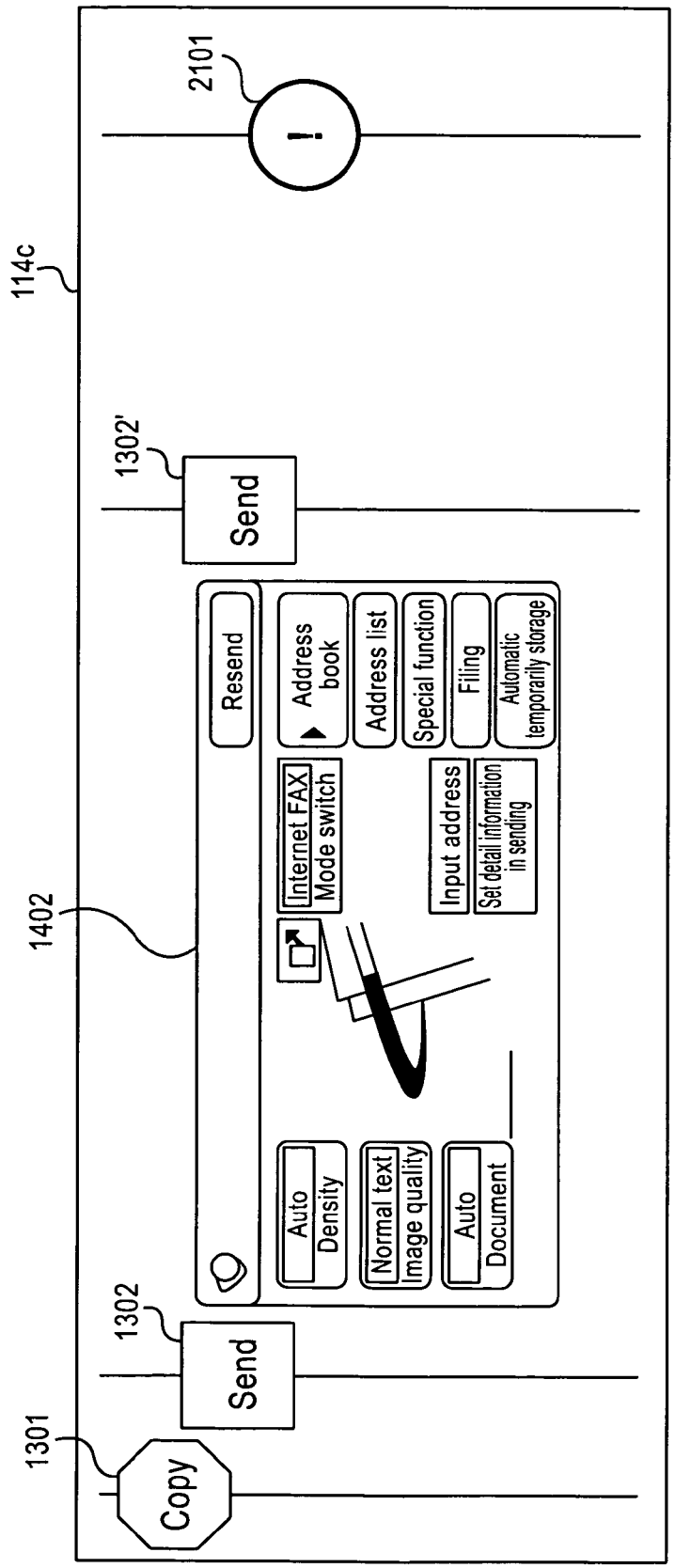
FIG. 48 is a drawing illustrating an information display function of a display control section of the multifunctional device of another embodiment of the third present invention.

While, in the screen illustrated in FIG. 46, when the user touches and operates the startup icon 1302 indicative of "Send", the touch panel control section 364 causes the instruction window 1402 in the sending mode to be additionally displayed as illustrated in FIG. 48.

The instruction window 1402 in the sending mode allows the user to input a detail instruction for carrying out a sending operation, and a conventional apparatus generally displays this instruction window in a basic window in case where the sending mode is selected as a main mode. For example, the user operates a mode switching key in the instruction window 1402, so that a sending mode, e.g., an iFAX mode in which data is sent from the communication section 110, a FAX mode in which data is sent from the FAX modem 115, or a mode in which data is sent from the communication interface 117 to the connected USB, can be selected.

Note that, in the same manner as in the instruction window 1401, the satellite icon 1302' is displayed and the instruction window 1402 is displayed between the startup icon 1302 and the satellite icon 1302'.

When the start key is pushed with the instruction window 1402 in the sending mode displayed, the image scanning section 2 scans image data, and the control data generation section 342 generates control data, so that a sending job in a facsimile mode, a scanner mode, a USB mode, or the like occurs. The sending job is sent to the job management section 332 so as to be newly managed. Further, the instruction window 1402 is deleted from the screen.

When an all clear key of the operation section 114 illustrated in FIG. 46 is operated or when a certain time period passes after displaying the instruction windows 1401 and 1402, the instruction windows 1401 and 1402 are automatically deleted.

Note that, it may be so arranged that the user can, as necessary, change information disclosed in the information window, a time period taken to automatically delete the information window or the instruction window after displaying the information window or the instruction window, a time period taken to change a display manner indicative of new reception into a general display manner indicative of a standby state, and similar information.

As described above, an image forming apparatus of the third present invention forms an image based on image data onto a recording material, said image forming apparatus comprising: a status detection section for detecting that the image forming apparatus is in a status where it should report an information concerning its status; a display input section for displaying information in a screen and for allowing a user to operate the screen so as to input an instruction; and a display control section for causing the display input section to display a status icon indicating that the status detection section detects the status and for causing the display input section to additionally display an information window, disclosing information concerning the status indicated by the status icon, when the screen is operated with the status icon displayed.

As a result, the limited display area of the operation panel is effectively used, so that the user can easily find a status of the apparatus, e.g., a trouble, request for maintenance, and display of an advice, as well as contents thereof.

Further, it is preferable to arrange the image forming apparatus of the present invention so that the status icon is set so as to correspond to the information which should be reported.

As described above, examples of the information which should be reported include: information which indicates occurrence of a trouble; information which indicates necessity to request for maintenance; and information which indicates that the apparatus can provide an advice. According to this arrangement, the status icon allows the notified information to be specified to some extent.

As a result, the limited display area of the operation panel is effectively used, so that the user can more easily find a status of the apparatus, e.g., a trouble, request for maintenance, and display of an advice, as well as contents thereof.

Further, it is possible to arrange the image forming apparatus of the present invention so that: in case of displaying a plurality of status icons, the display control section displays the status icons so that the status icons do not overlap each other.

As a result, the user can instantly and clearly find information from the apparatus merely by watching the screen displaying the status icon. Further, also in case of operating the status icon, the user can accurately operate the status icon which should be operated.

Further, it is possible to arrange the image forming apparatus of the present invention so that: in case of displaying a plurality of status icons, the display control section displays the status icons so that the status icons are disposed along a diagonal line of the screen. As a result, the user can easily watch the displayed status icons.

Further, it is possible to arrange the image forming apparatus of the present invention so that the display control section displays a new status icon so that a display manner of the new status icon is different from a display manner of the status icon having been displayed.

As a result, merely by watching the icon display window, the user can instantly and clearly find that it is newly detected that the apparatus is in a status where it should report an information concerning its status.

Further, in this case, it is preferable that: when a predetermined period passes, the display control section causes the display manner of the new status icon to be the same as the display manner of the status icon having been displayed.

As a result, it is possible to accurately notify the user that the status indicated by the status icon is a new status having been just displayed.

Further, it is possible to arrange the image forming apparatus of the present invention so that: when the status icon displayed in the screen is operated, the display control section displays an information window concerning the status indicated by the status icon having been operated.

According to the arrangement, when the status icon is operated, the information window disclosing information concerning the job corresponding to the operated status icon is additionally displayed. The information window allows the user to confirm detail information of the apparatus status without transition into another window.

Further, it is possible to arrange the image forming apparatus of the present invention so that the display control section displays the information window in a vicinity of the status icon having been operated.

As a result, unlike such an arrangement that the information window is displayed separately from the operated status icon, the user can easily find a relation between the status icon and the information window.

Further, in this case, the display control section displays an icon having the same shape as the status icon having been operated and displays the information window between these two icons. This makes it easier to find the relation between the status icon and the information window. In this case, the image forming apparatus can be arranged so that: when any one of the icons respectively displayed at both sides of the information window is touched so as to be operated with the information window displayed in the screen, the display control section deletes the information window.

Alternatively, the image forming apparatus can be arranged so that: when the status icon displayed in the screen is slid so as to be operated, the display control section displays an icon having the same shape as the status icon having been operated, so as to follow the sliding, and the display control section displays an information window in an area, which is provided between the two icons and whose width is changeable, so that the information window corresponds to the width. In this case, it is preferable that a size of a visible part of the information window changes according to the width between the two icons so that an entire size of the information window does not change.

As a result, by sliding the status icon and watching a part of the information window, the user may be able to find the content of the information disclosed in the information window, so that the foregoing arrangement is convenient in this case.

Further, it is preferable to arrange the image forming apparatus of the present invention: when a predetermined period passes after displaying the information window, the display control section deletes the information window.

Common Features of the Embodiments of the First to Third Present Inventions

Lastly, blocks of the printing apparatus 1, the digital multifunctional devices 100, 200, and 300 according to the first to third present inventions, particularly, the job information display control section 30, the display control section 130, and the information display control sections 230 and 363 may be constituted by hardware logic or may be realized by software with a CPU as follows.

That is, the printing apparatus 1 includes: a CPU (central processing unit) for executing a command of a control program realizing the functions; a ROM (read only memory) in which the program is stored; a RAM (random access memory) for developing the program; and a storage device (storage medium), such as a memory, in which the program and various kinds of data are stored. Further, the object of the present invention can be realized also in such a manner that: a storage medium which computer-readably stores a program code (an executable program, an intermediate code program, and a source program) of the control program of the printing apparatus 1, the digital multifunctional devices 100, 200, and 300 is supplied to the printing apparatus 1, and the computer (or a CPU or an MPU) reads out and executes the program code stored in the storage medium.

Examples of the storage medium include: tapes such as a magnetic tape and a cassette tape, discs such as a magnetic disc (e.g. a floppy disc or a hard disc) and an optical disc (e.g. CD-ROM/MO/MD/DVD/CD-R), cards such as an IC card (including a memory card) and an optical card, and a semiconductor memory such as a mask ROM, EPROM, EEPROM, and a flash ROM.

Further, each of the printing apparatus 1, the digital multifunctional devices 100, 200, and 300 is made connectable to communication networks, and the program code is supplied via the communication networks. The communication networks are not limited to a specific means. Specific examples of the communication network include Internet, intranet, extranet, LAN, ISDN, VAN, a CATV communication network, a virtual private network, a telephone line network, a mobile communication network, a satellite communication network, and the like. Further, a transmission medium constituting the communication network is not particularly limited. Specifically, it is possible to use a wired line such as a line in compliance with IEEE1394 standard, a USB line, a power line, a cable TV line, a telephone line, an ADSL line, and the like, as the transmission medium. Further, it is possible to use (i) a wireless line utilizing an infrared ray used in IrDA and a remote controller, (ii) a wireless line which is in compliance with Bluetooth standard (registered trademark) or IEEE802.11 wireless standard, and (iii) a wireless line utilizing HDR, a mobile phone network, a satellite line, a ground wave digital network, and the like, as the transmission medium. Note that, the present invention can be realized by a computer data signal which is realized by electronic transmission of the program code and which is embedded in a carrier wave.

In this manner, the image data processing apparatus or the image forming apparatus of the first to third present inventions may be realized by hardware or may be realized by causing a computer to execute the program.

Specifically, a program according to the first present invention is a program causing a computer to operate as the job information display control section, and the program is stored in the storage medium according to the first present invention. When the program is executed by the computer, the computer operates as the image data processing apparatus of the first present invention. Thus, it is possible to exhibit the same effect as in the image data processing apparatus.

Specifically, a program according to the second present invention is a program causing a computer to operate as the information display control section, and the program is stored in the storage medium according to the second present invention. When the program is executed by the computer, the computer operates as the image data processing apparatus of the second present invention. Thus, it is possible to exhibit the same effect as in the image data processing apparatus.

Specifically, a program according to the third present invention is a program causing a computer to operate as the display control section, and the program is stored in the storage medium according to the third present invention. When the program is executed by the computer, the computer operates as the image forming apparatus of the third present invention. Thus, it is possible to exhibit the same effect as in the image forming apparatus.

The embodiments and concrete examples of implementation discussed in the foregoing detailed explanation serve solely to illustrate the technical details of the present invention, which should not be narrowly interpreted within the limits of such embodiments and concrete examples, but rather may be applied in many variations within the spirit of the present invention, provided such variations do not exceed the scope of the patent claims set forth below.

What is claimed is:

1. An image data processing apparatus, in which a job receiving section communicates with an external device and receives image data and control data for carrying out a job processing with respect to the image data so as to receive a job and a job processing section executes the job received by the job receiving section, said image data processing apparatus comprising:

a display input section for displaying information in a screen and for allowing the screen to be operated so as to input an instruction;

a job management table for managing, for each job, function information indicative of at least a reception time of the job and a content of the job; and a job information display control section for causing, with reference to the management table, the screen of the display input section to display an icon indicative of the presence of the job having been received along with the content of the job and for causing the screen to additionally display an information window disclosing information concerning the job corresponding to the icon when the icon is operated with the icon displayed, wherein when the job receiving section receives the job, the job information display control section causes the icon indicative of presence of the job having been received to be displayed on the screen on which nothing other than the icon indicative of the presence of the job is displayed;

the job receiving section includes a plurality of job data receiving routes, the function information corresponding to each of the job data receiving routes is stored in the job management table, the job information display control section displays an icon of the function information corresponding to each of the job data receiving routes, and in a case of displaying the information window, the display control section displays the information window and moves the startup icons, being displayed, to a periphery of the information window with a positional relation of the startup icons kept.

2. The image data processing apparatus as set forth in claim 1, wherein:

in case of displaying a plurality of icons, the job information display control section displays the icons so that the icons do not overlap each other.

3. The image data processing apparatus as set forth in claim 1, wherein:
in case of displaying a plurality of icons, the job information control section displays the icons so that the icons are disposed along a diagonal line of the screen in order corresponding to an order in which jobs are received.

4. The image data processing apparatus as set forth in claim 1, wherein:
the job information display control section displays an icon corresponding to a newly received job in a display manner different from a display manner of the icon corresponding to the job having been received.

5. The image data processing apparatus as set forth in claim 4, wherein:
when a [predetermined period passes, the job information display section causes the display manner of the icon corresponding to the newly received job to be the same as the display manner of the icon of the job having been received.

6. The image data processing apparatus as set forth in claim 1, wherein:
the job information control section causes the display manner of an icon corresponding to a job being processed to be different from a display manner of an icon corresponding to a standby job.

7. The image processing apparatus as set forth in claim 1, wherein:
the job information display control section displays an icon having the same shape as the icon having been operated and displays the information window between these two icons.

8. The image data processing apparatus as set forth in claim 1, wherein:
when the icon displayed in the screen is slid so as to be operated, the job information control section displays an icon having the same shape as the icon having been operated, so as to follow the sliding, and the job information display control section displays an information window in an area, which is provided between the two icons and whose width is changeable, so that the information window corresponds to the width.

9. An image processing apparatus, in which:
a job receiving section communicates with an external device and receives image data and control data for carrying out a job processing with respect to the image data so as to receive a job, and an image data generation section generates image data, and a control data generation section generates control data for carrying out a job processing with respect to the image data so as to generate a job in the image data processing apparatus, and a job processing section executes the job received from the external device and the job generated in the image data processing apparatus, said image data processing apparatus comprising:
a display input section for displaying information in a screen and for allowing the screen to be operated so as to input an instruction;
a management table for managing, for each job received from the external device and each job generated in the image data processing apparatus, function information indicative of at
least a reception time or generation time of the job and a content of the job; and
a display control section for causing, with reference to the management table, the screen of the display input section to display one or more startup icons each of which activates the image data generation section and one or more job icons each of which is indicative of a presence of the job having been received by the job receiving section along with the content of the job, as long as the image data generation section is ready for activation, the display control section causing the startup icon to be always displayed on the screen on which nothing other than the startup icon is displayed,
wherein the display control section causes additional display of an instruction window for causing the control data generation section to generate the control data and
the image data generation section to generate the image data when the startup icon is operated,
when the job receiving section receives the job, the display control section causes the job icon of the job having been received to be displayed until job processing indicated by the job icon is finished, the job receiving section includes a plurality of job data receiving routes, the function information corresponding to each of the job data receiving routes is stored in the management table, the display control section displays a job icon of the function information corresponding to each of the job data receiving routes, and
in case of displaying the instruction window, the display control section displays the instruction window and moves the startup icons, being displayed, to a periphery of the instruction window with a positional relation of the startup icons kept.

10. The image data processing apparatus as set forth in claim 9, wherein:
when the job icon is operated, the display control section additionally displays an information window disclosing information concerning the job corresponding to the job icon having been operated.

11. The image data processing apparatus as set forth in claim 9, wherein:
the display control section displays the instruction window when the startup icon is touched.

12. The image data processing apparatus as set forth in claim 9, wherein:
the display control section displays a job icon indicative of the job having been generated in the image data processing apparatus.

13. The image data processing apparatus as set forth in claim 9, wherein:
the display control section displays the startup icon and the job icon so that the startup icon and the job icon are disposed along a diagonal line of the screen and displays the job icons in an order corresponding to an order in which the jobs were received.

14. The image data processing apparatus as set forth in claim 9, wherein:
the display control section causes a display manner of the job icon corresponding to the job having been received from the external device to be different from a display manner of the job icon corresponding to the apparatus.

15. The image data processing apparatus as set forth in claim 9, wherein:
the display control section displays an icon having the same shape as the startup icon having been operated and displays the instruction window between these two icons.

16. The image data processing apparatus as set forth in claim 9, serving as a digital multifunctional device which comprises as the image data generation section a document scanning section for scanning a document so as to generate the image data, said digital multifunctional device further comprising as the job processing section and image recording section for recording the image data onto a recording material and an image data sending section for communicating with the external device so as to send the image data to the external device, wherein:

the digital multifunctional device is capable of executing at least a copy mode, a facsimile mode, and a printer mode.

17. An image forming apparatus, forming an image based on image data onto a recording material, said image forming apparatus comprising:

a job receiving section that communicates with an external device and receives image data and control data for carrying out a lob processing with respect to the image data so as to receive a job;

a status detection section for detecting that the image forming apparatus is in a status where it should report an information concerning its status;

a display input section for displaying information in a screen and for allowing a user to operate the screen so as to input an instruction;

a management table for managing function information indicative of at least a reception time and content of an image, and a display control section for causing the display input section to display a status icon indicating that the status detection section detects the status and for causing the display input section to additionally display an information window, disclosing information concerning the status indicated by the status icon, when the screen is operated with the status icon displayed, wherein the display control section causes the status icon to be displayed on the screen of the display input section on which screen information of a basic window which allows an instruction for operating the image forming apparatus to be inputted is not displayed, the job receiving section includes a plurality of job data receiving routes, the function information corresponding to each of the job data receiving routes is stored in the management table, the display control section displays a job icon of the function information corresponding to each of the job data receiving routes, and in case of displaying the information window, the display control section displays the information window and moves the startup icons, being displayed, to a periphery of the information window with a positional relation of the startup icons kept.

18. The image forming apparatus as set forth in claim 17, wherein:

the status icon is set so as to correspond to the information which should be reported.

19. The image forming apparatus as set forth in claim 17, wherein:

when the status icon displayed in the screen is operated, the display control section displays an information window concerning the status indicated by the status icon having been operated.

20. The image forming apparatus as set forth in claim 19 wherein:

when the status icon displayed in the screen is slid so as to be operated, the display control section displays an icon having the same shape as the status icon having been operated, so as to follow the sliding, and the display control section displays an information window in an area, which is provided between the two icons and whose width is changeable, so that the information window corresponds to the width.

* * * * *